(12) United States Patent
Kuramoto

(10) Patent No.: US 10,642,622 B2
(45) Date of Patent: May 5, 2020

(54) ARITHMETIC PROCESSING DEVICE AND CONTROL METHOD OF THE ARITHMETIC PROCESSING DEVICE

(71) Applicant: FUJITSU LIMITED, Kawasaki-shi, Kanagawa (JP)

(72) Inventor: Masahiro Kuramoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 15/782,881

(22) Filed: Oct. 13, 2017

(65) Prior Publication Data

US 2018/0181406 A1  Jun. 28, 2018

(30) Foreign Application Priority Data

Dec. 27, 2016 (JP) ................................ 2016-254339

(51) Int. Cl.
| | | |
|---|---|---|
| *G06F 17/15* | (2006.01) | |
| *G06F 7/544* | (2006.01) | |
| *G06F 17/16* | (2006.01) | |
| *G06N 3/04* | (2006.01) | |
| *G06N 3/06* | (2006.01) | |
| *G06F 9/38* | (2018.01) | |

(Continued)

(52) U.S. Cl.
CPC .......... *G06F 9/3887* (2013.01); *G06F 7/5443* (2013.01); *G06F 9/3001* (2013.01); *G06F 9/30032* (2013.01); *G06F 9/30036* (2013.01); *G06F 9/3895* (2013.01); *G06F 15/8015* (2013.01); *G06F 17/15* (2013.01); *G06F 17/16* (2013.01); *G06N 3/04* (2013.01); *G06N 3/06* (2013.01); *G06N 3/063* (2013.01); *G06N 3/084* (2013.01)

(58) Field of Classification Search
CPC ............. G06F 17/15–153; G06F 17/16; G06F 7/5435; G06N 3/04; G06N 3/06; G06N 3/063

See application file for complete search history.

(56) References Cited

U.S. PATENT DOCUMENTS 5,226,171 A * 7/1993 Hall ........................ G06F 17/16
712/3
5,577,262 A * 11/1996 Pechanek ............ G06F 15/8023
712/11

(Continued)

FOREIGN PATENT DOCUMENTS

| JP | 2001-067338 | 3/2001 |
|---|---|---|
| JP | 2008-310700 | 12/2008 |

(Continued)

*Primary Examiner* — Matthew D Sandifer
(74) *Attorney, Agent, or Firm* — Fujitsu Patent Center

(57) ABSTRACT

Each of product-sum arithmetic units 501 to 503 acquires, from a register file 410, different pieces of first element data included in a first predetermined row of first data that forms a matrix; acquires, from a register file 420, same pieces of second element data included in a second predetermined row of second data that forms a matrix; performs a row portion operation that is an operation performed on the first data by an amount corresponding to a single row by performing a process of performing an operation using the acquired first element data and the second element data; and performs an operation by using the first data and the second data based on the result of the row portion operation.

5 Claims, 32 Drawing Sheets

(51) Int. Cl.
*G06F 9/30* (2018.01)
*G06F 15/80* (2006.01)
*G06N 3/08* (2006.01)
*G06N 3/063* (2006.01)

(56) References Cited

U.S. PATENT DOCUMENTS

| | | | |
|---|---|---|---|
| 6,401,106 B1* | 6/2002 | Juan | G06F 17/15 |
| | | | 708/422 |
| 9,135,553 B2* | 9/2015 | Kato | G06F 17/15 |
| 10,248,384 B2* | 4/2019 | Komagata | G06F 9/46 |
| 2007/0271325 A1* | 11/2007 | Juffa | G06F 17/16 |
| | | | 708/607 |
| 2010/0223219 A1 | 9/2010 | Kato et al. | |
| 2014/0337262 A1 | 11/2014 | Kato et al. | |
| 2015/0309961 A1 | 10/2015 | Ozaki et al. | |
| 2018/0046458 A1* | 2/2018 | Kuramoto | G06F 9/3001 |
| 2019/0004795 A1* | 1/2019 | Kuramoto | G06F 7/5443 |

FOREIGN PATENT DOCUMENTS

| | | |
|---|---|---|
| JP | 2010-134697 | 6/2010 |
| JP | 2012-205298 | 10/2012 |
| JP | 2015-210709 | 11/2015 |

\* cited by examiner

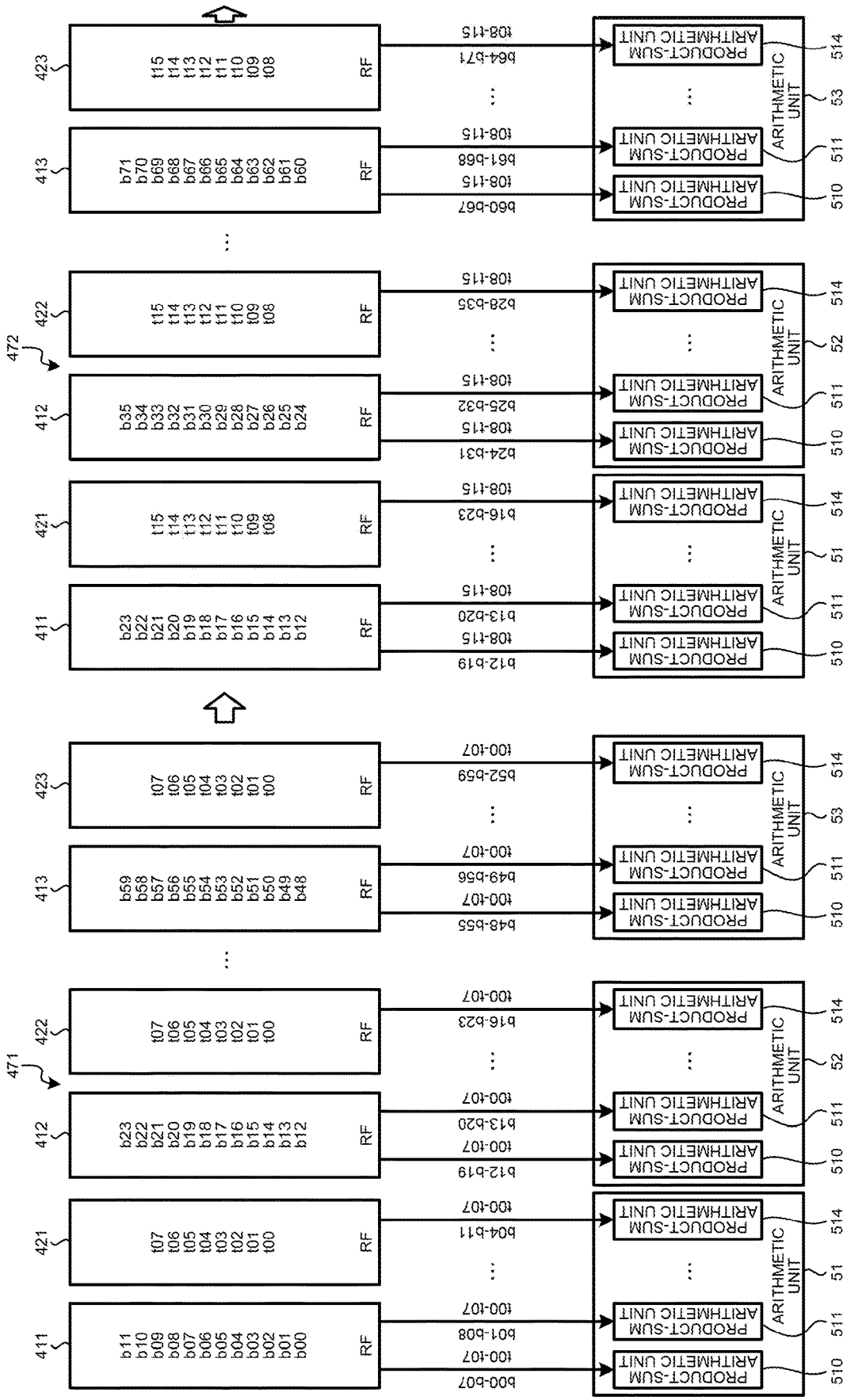

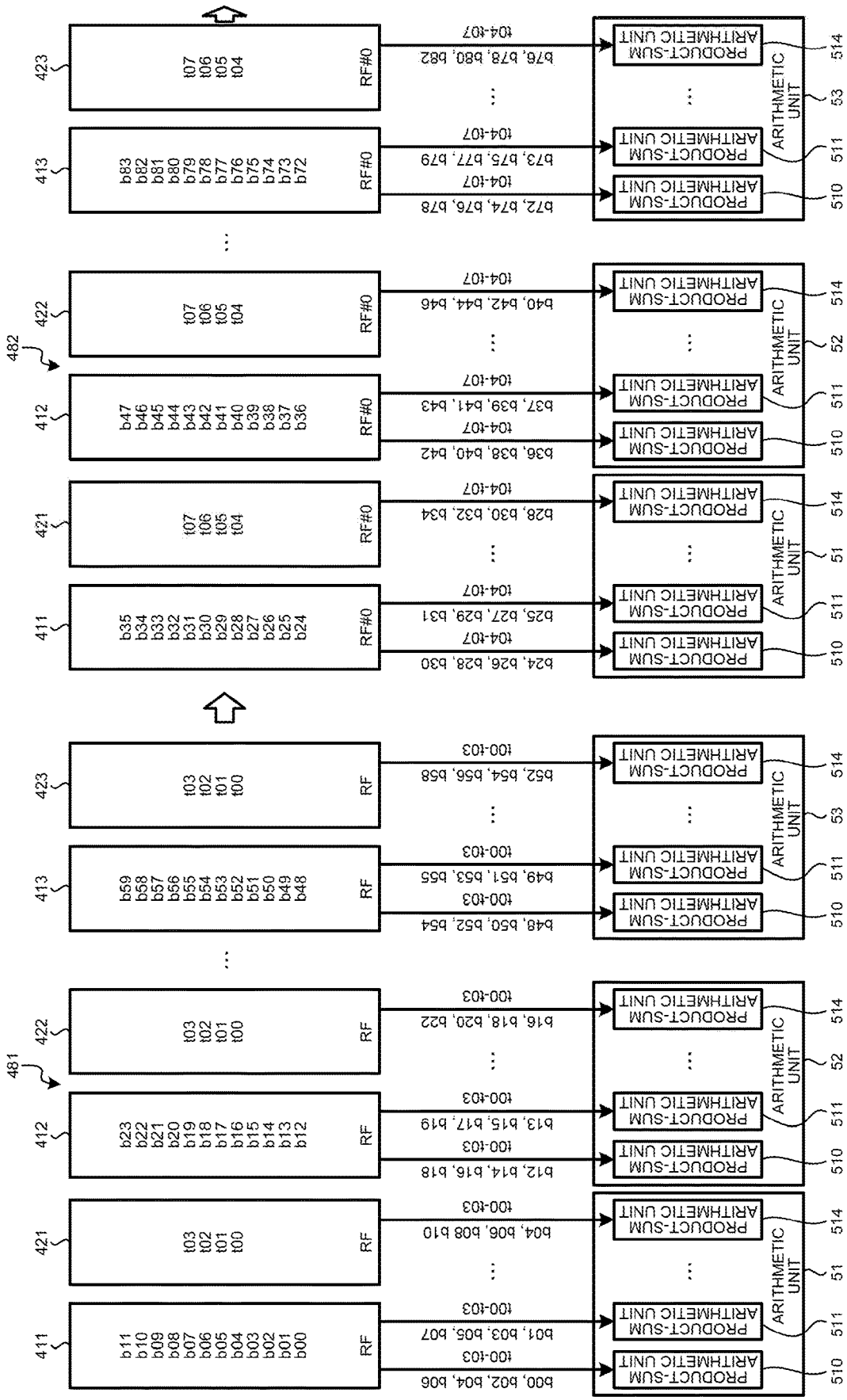

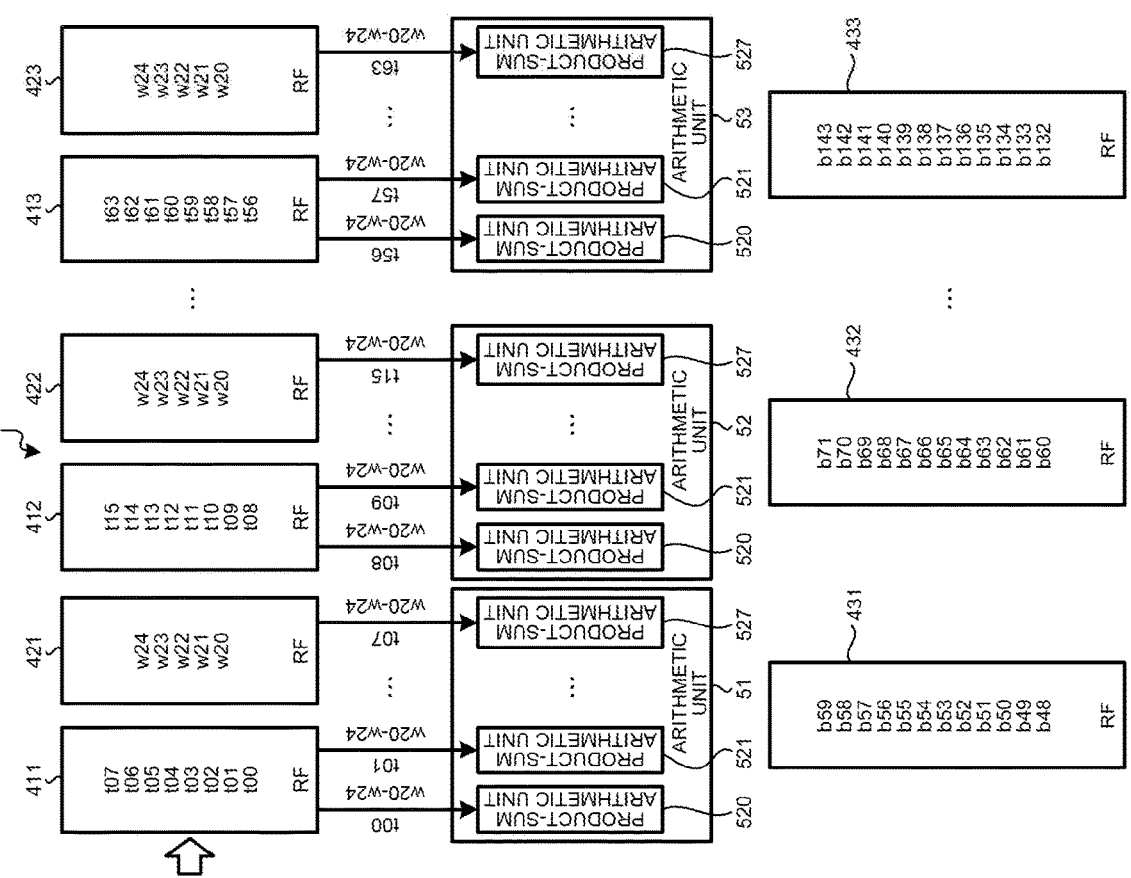

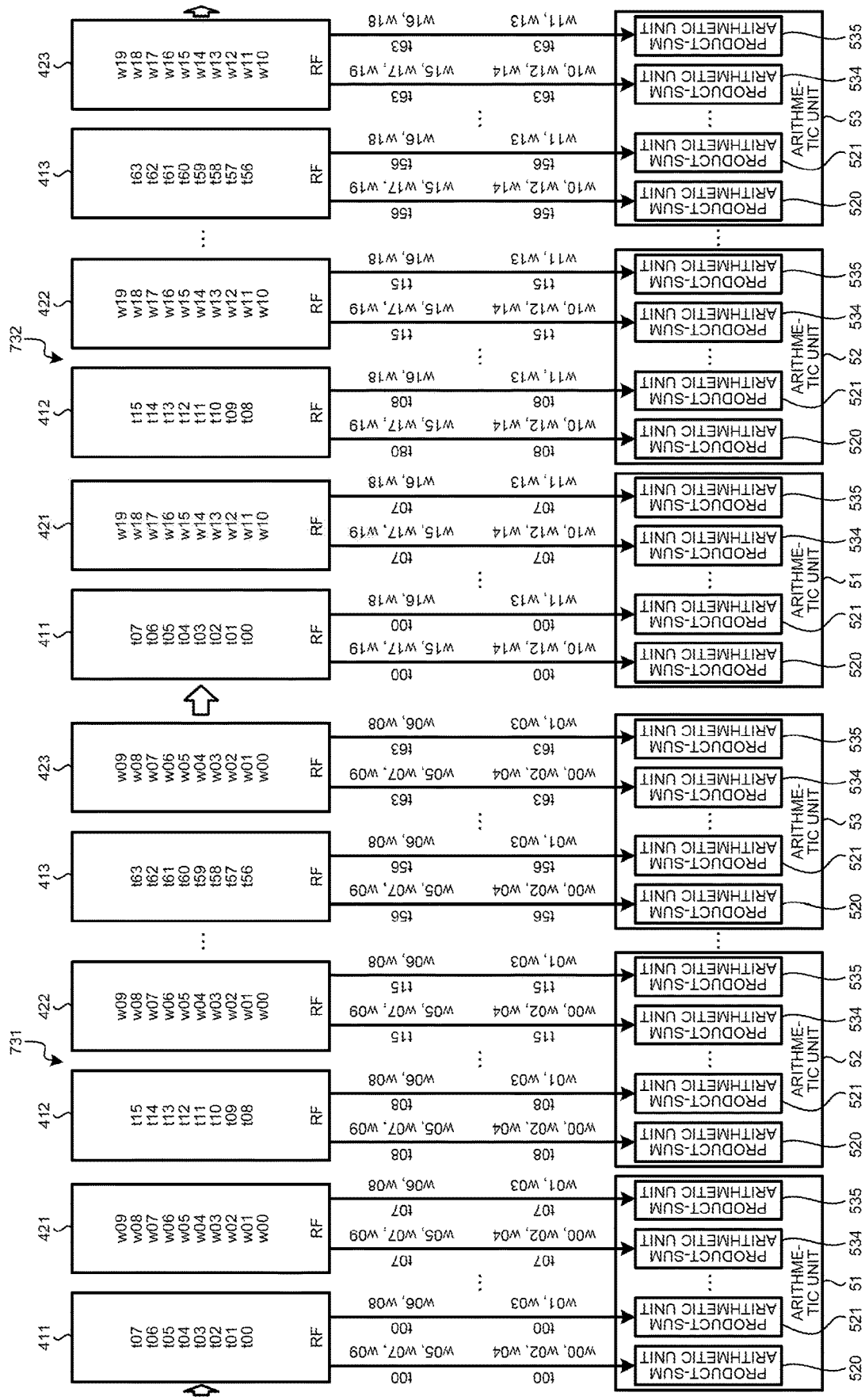

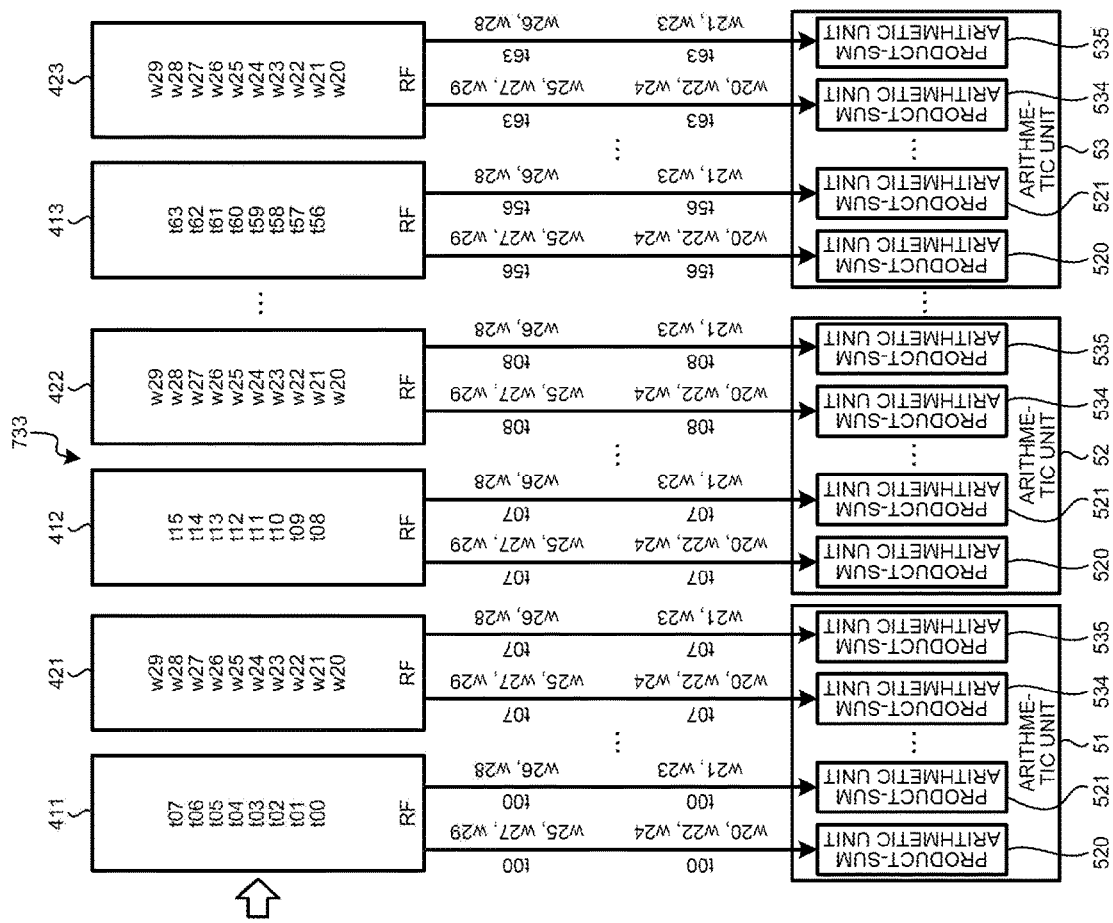

ARITHMETIC PROCESSING DEVICE AND CONTROL METHOD OF THE ARITHMETIC PROCESSING DEVICE

CROSS-REFERENCE TO RELATED APPLICATION

This application is based upon and claims the benefit of priority of the prior Japanese Patent Application No. 2016-254339, filed on Dec. 27, 2016, the entire contents of which are incorporated herein by reference.

FIELD

The embodiment discussed herein is related to an arithmetic processing device and a control method of the arithmetic processing device.

BACKGROUND

A graphics processing unit (GPU) used for an arithmetic processing device is originally a processor used for image processing; however, because the GPU includes a large number of floating-point product-sum computing units, which will be described later, and is optimized for matrix calculation, the GPU is often used as a processor that performs a process for machine learning. Furthermore, in general, the GPU is also used in a process of performing deep learning.

In deep learning, a process is usually performed by using neural networks. For example, in a case of deep learning in image recognition, there are two processes, i.e., a forward process of determining what the image provided is and a backward process of updating the parameters of the neural networks. The arithmetic processing device that performs deep learning performs the backward process by using a difference between each of the calculation results obtained in the forward process and an expected value and updates the parameters of the neural networks. Then, the arithmetic processing device improves the accuracy of the forward process by using the updated parameters.

The neural networks are constituted by a plurality of layers and, in each of the layers, an arithmetic operation process of, for example, extracting feature values is performed and the learning is repeated. In this way, neural networks have a multilayer structure in which a different arithmetic operation process is performed in each of the layers. Because of this structure, in order to update the parameters for each layer, learning is performed by obtaining a difference between the calculation result obtained in the last layer and an expected value, by propagating the difference to an immediately previous layer, and by further propagating the result of the calculated difference obtained from the subject layer. In a description here, immediately previous and immediately subsequent are described based on the forward direction of the forward process.

Furthermore, as the arithmetic operation process that is mainly used for image recognition in deep learning, there is a convolutional neural network. In the convolutional neural network, the operation referred to as convolution is frequently used. In a description below, this operation is called a "convolution operation". For example, if image recognition is performed, a weight frame that has, in an area in an input image, a previously set parameter that is used as each of the elements is arranged in the original image. Then, by summing the multiplication of each of the elements of the input image in which the weight frame is arranged and each of the elements of the weight frame, the feature values in the area in which the weight frame is arranged in the input image are calculated. The arrangement of the weight frame with respect to the original image is performed on the entire input image by using the predetermined movement width of the weight frame and the sum of the calculated feature values corresponds to an output image that is output as the result of the convolution operation. The weight frame is sometimes referred to as a "filter".

For example, consider, as an input image, an image having 8×8 elements, i.e., an image with 8×8-bit grayscale. In the following, this image is referred to as an 8×8 input image. Furthermore, a description will be given of a case of using a filter that has 4×4 elements and a case in which the filter is shifted for each column or each row in the input image. In the following, this filter is referred to as a 4×4 filter. Furthermore, in the following, the direction in which a row extends is referred to as "in the row direction" and the direction in which a column extends is referred to as "in the column direction". In this case, if the 4×4 filter arranged at one of the corners of the 8×8 input image in the row direction is moved 5 (=8−3) times in the row direction, the 4×4 filter reaches the other corner. Namely, an output image has five elements in the row direction. Similarly, if the 4×4 filter arranged at one of the corners of the 8×8 input image in the column direction is moved 8−3 times in the column direction, the 4×4 filter reaches the other corner. Namely, the output image also has five elements in the column direction. Thus, the output image becomes a 5×5 image. Then, each of the elements in the output image corresponds to a total value of the multiplication of each of the elements included in the filter that is in the state of being arranged in the input image and each of the elements included in the input image associated with the respective elements in the filter.

When performing the operation of summing up the multiplied value described above, the arithmetic processing device usually uses an instruction called fused multiply add (FMA). The FMA is an instruction to a floating-point product-sum operation represented by the expression of (A×B)+C.

Furthermore, when performing such a convolution operation, in some cases, the single instruction multiple data (SIMD) method of simultaneously obtaining a plurality of outputs of operation results by simultaneously performing arithmetic operation processes on a plurality of pieces of data by executing a single instruction is used. For example, a description will be given of a case of operation that uses SIMD that processes, in parallel, four pieces of data. In the following, the SIMD that processes, in parallel, n pieces of data is referred to as n SIMD. Namely, the arithmetic operation process in this case can be referred to as a 4-way SIMD arithmetic operation process. Furthermore, in the following, the operation performed by using the SIMD is referred to as a SIMD operation.

In a case of convolution operation performed by using an 8×8 input image and a 4×4 filter described above, the arithmetic device can calculate, at a time, four values that are the results of the multiplication of one of the elements in the filter that is in each of the arrangement states in each of which the filter is shifted to each column four times and the associated element in the input images. Namely, when performing the 4-way SIMD operation, the arithmetic processing device can calculate, in parallel, the elements in the output image associated with the states of the filter arranged in the four different states.

When performing the arithmetic operation process using the SIMD described above, the arithmetic processing device stores, in registers that are used in the SIMD operation, the data used in the operation from among the pieces of the data on the input image stored in a memory that functions as a storage device and then performs a single operation. By repeating this process, the arithmetic processing device can perform the convolution operation. For example, in a case of the 4-way SIMD arithmetic operation process, the number of registers used for a single SIMD operation is four. When, in the SIMD operation, the arithmetic processing device stores data in the registers, the arithmetic processing device stores, at a time, the data in all of the registers included in the SIMD registers by using a load instruction of the SIMD.

Here, in the convolution operation, when a single element in the output image is calculated, each of the elements in the filter and each of the associated elements in the input image are used. Furthermore, in the convolution operation performed by using the SIMD, because the operation is repeatedly performed by shifting the range of the filter, the same data is used many times in the convolution operation performed in parallel.

Conventionally, in the convolution operation, multiplication of each of the elements and summing the multiplication results are correctively obtained for each arrangement state of a single filter. Thus, when calculating, in parallel, a plurality of computing units, such as in a case of using the SIMD, in order to improve a processing speed, a method of avoiding the use of same data by adjusting the order of calculations or a method of simultaneously using the data by preparing a copy of the same data is used.

For example, as a technology related to the convolution operation, there is a conventional technology that provides a multiplier for each line, that provides shift registers that store therein the weight of each line, that sequentially performs multiplication by shifting a value, and that adds the multiplication results. Furthermore, there is a conventional technology that provides a multiplier by being associated with each line such that the adjacent lines commonly use the multiplier and that performs the convolution operation. Furthermore, there is a conventional technology that divides line data in a memory into an area used for storing the data and an area used for storing weight data and that performs an operation by circulating the memory area. Furthermore, there is a conventional technology that performs an operation by passing an output of a multiplier to another multiplier. Furthermore, there is a conventional technology that eliminates multipliers and adders by simplifying arithmetic expressions.

Patent Document 1: Japanese Laid-open Patent Publication No. 2010-134697
Patent Document 2: Japanese Laid-open Patent Publication No. 2015-210709
Patent Document 3: Japanese Laid-open Patent Publication No. 2008-310700
Patent Document 4: Japanese Laid-open Patent Publication No. 2012-205298
Patent Document 5: Japanese Laid-open Patent Publication No. 2001-67338

However, when adjusting the order of calculations in order to avoid reading of the same data, multiplications or divisions are used to decide the data to be used. Because the multiplications or divisions consume a great number of cycles due to the operation when compared with the additions or subtractions, a calculation cost is high. Furthermore, during the operation of multiplications or divisions, there may be a case in which the computing units are not able to be operated for each cycle. Consequently, adjustment of the calculation order may possibly decrease the processing speed of the operation. Furthermore, when preparing a copy of data in order to avoid the reading of the same data, a sort order of pieces of data that are not probably used at the same time possibly becomes complicated or the number of pieces of data to be copied may possibly be increased. For example, if a moving distance of the filter at a time is equal to or greater than two columns and two rows, the data to be read varies in each of the computing units; therefore, the problem described above occurs. Namely, when using a processing method of correctively performing the operation for each arrangement state of a single filter, a calculation cost may possibly become high in order to improve the processing speed.

Furthermore, in also a case of using different data, depending on a method of moving data to the registers, there may be a state in which data is not able to be read from the registers. For example, if two computing units attempt to read data from the same register at the same timing, it may possibly be difficult to read the data. Thus, the processing speed of the operation may possibly be decreased.

Furthermore, in the backward process, because the size of input data is small and the number of pieces of the output data is great, the number of operations performed by using the same data is great. Thus, it is possible to efficiently perform the process by using a large number of computing units; however, if an operation is performed by using a conventional method by simply increasing the number of computing units, it is difficult to efficiently supply data to a large number of computing units.

SUMMARY

According to an aspect of an embodiment, an arithmetic processing device includes: a data storage unit that stores first data and second data each of which has pieces of element data included in a matrix;

a plurality of arithmetic units; a first storage unit that is arranged for each of the arithmetic units and that stores a first predetermined row of the first data that is stored in the data storage unit; a second storage unit that is arranged for each of the arithmetic units and that stores a second predetermined row of the second data that is stored in the data storage unit; and product-sum arithmetic units, which are arranged in each of the arithmetic units, each of which acquires different pieces of first element data included in the first predetermined row from the first storage unit, each of which acquires same pieces of second element data included in the second predetermined row from the second storage unit, and each of which performs, by performing a process of an operation using the acquired first element data and the acquired second element data a predetermined number of times, an operation by using the first data and the second data based on results of a row portion operation that is an operation performed on the first data corresponding to a single row.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7A is a schematic diagram illustrating the transition of element data stored when the number of strides in the convolution backward weight difference operation is 1;

FIG. 8A is a schematic diagram illustrating the transition of element data stored when the number of strides in the convolution backward weight difference operation is 2;

FIG. 13C is a schematic diagram illustrating the transition of element data stored when the number of strides in the convolution backward bottom difference operation is 1;

FIG. 14A is a schematic diagram illustrating the transition of element data stored when the number of strides in the convolution backward bottom difference operation is 2;

FIG. 14B is a schematic diagram illustrating the transition of element data stored when the number of strides in the convolution backward bottom difference operation is 2;

DESCRIPTION OF EMBODIMENTS

Preferred embodiments of the present invention will be explained with reference to accompanying drawings. Furthermore, the arithmetic processing device and the control method of the arithmetic processing device disclosed in the present invention are not limited to the embodiments described below.

Figure 1:
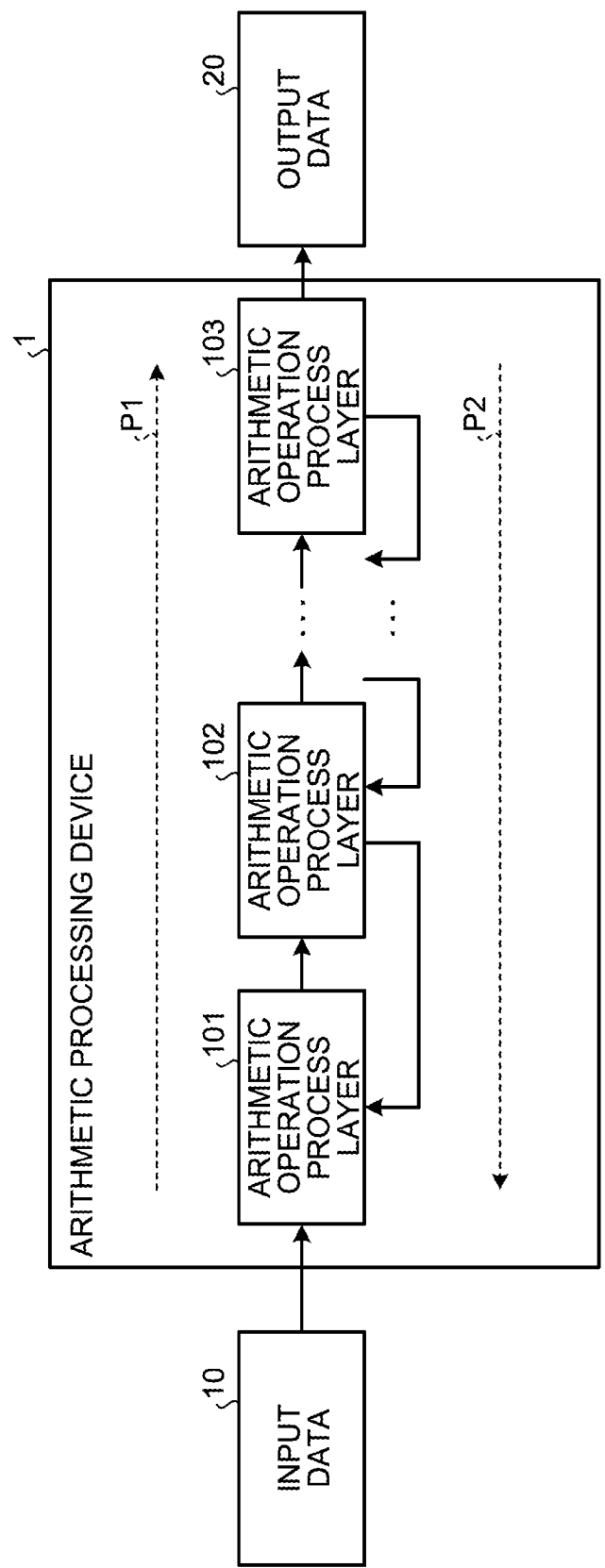
FIG. 1 is a schematic diagram illustrating the overall flow of deep learning.

FIG. 1 is a schematic diagram illustrating the overall flow of deep learning. Here, in the embodiment, deep learning for image recognition will be described. In the following, a description will be given of the convolution operation as an example; however, an operation other than the convolution operation may also be used by the operation performed in each layer in the neural network.

As illustrated in FIG. 1, an arithmetic processing device 1 receives an input of input data 10. Then, the arithmetic processing device 1 has a plurality of arithmetic operation process layers. In each of the arithmetic operation process layers, an arithmetic operation process of, for example, extracting different feature points is performed. The arithmetic processing device 1 uses weight data and performs the convolution operation on the acquired input data 10 in an arithmetic operation process layer 101 that is a first layer. Here, the weight data corresponds to a filter. Then, the arithmetic processing device 1 performs, by using the weight data, the convolution operation on output data 20, which is also the feature value from the arithmetic operation process layer 101, in an arithmetic operation process layer 102 that is a second layer. The arithmetic processing device 1 sequentially performs the arithmetic operation process in each of the layers and then outputs the operation results, as the output data 20 that is also the feature value, of the convolution operation that is performed by using the weight data and that is performed in an arithmetic operation process layer 103 that is the $n^{th}$ layer. In this way, for example, if the input data 10 is assumed to be an input image, the output data 20 in each of the layers can be acquired as the feature values used for the image recognition and, by performing deep learning that repeatedly updates the parameter by using the feature values acquired in each of the layers, the accuracy of the image recognition is improved and the arithmetic processing device 1 can perform the image recognition. Furthermore, for example, in a case of voice recognition, the input data 10 becomes audio data and, in a case of text mining, the input data 10 becomes a word. The arithmetic operation process performed, by the arithmetic processing device 1, in the convolution operation in the direction of an arrow P1 is sometimes referred to as a "convolution forward operation".

Furthermore, in order to improve the accuracy of extracting the feature points in each of the layers, the arithmetic processing device 1 changes the weight data by using a difference with an expected value. For example, the arithmetic processing device 1 has a predetermined expected value and compares the expected value with the output data 20 that is output from the arithmetic operation process layer 103 that corresponds to an $n^{th}$ layer. Then, the arithmetic processing device 1 obtains a difference between the output data 20 and the expected value and obtains a difference with the expected value of the weight data by using the obtained difference and the input data 10 received from an $n-1^{th}$ layer. Furthermore, the arithmetic processing device 1 corrects the weight data by using the obtained difference with the expected value of the weight data. Then, by using the corrected weight data and by using the difference between the output data 20 and the expected value, the arithmetic processing device 1 obtains top difference data that is the data used to correct the weight data in the $n-1^{th}$ layer. Then, the arithmetic processing device 1 corrects, with respect to the input data 10 received from an $n-2^{th}$ layer, the weight data in the $n-1^{th}$ layer by using the obtained difference between the output data 20 in the $n-1^{th}$ layer and the output expected value in the $n-1^{th}$ layer.

Here, if the direction of the arrow P1 is the alignment direction of each of the layers, in the arithmetic operation process layer that is immediately previous to a specific arithmetic operation process layer, the arithmetic processing device 1 calculates the top difference data included in the specific arithmetic operation process layer. Then, by using both the calculated top difference data in the specific arithmetic operation process layer and the output data 20 output from the immediately previous arithmetic operation process layer, the arithmetic processing device 1 obtains a difference with the expected value of the weight data in the specific arithmetic operation process layer. Furthermore, the arithmetic processing device 1 corrects the weight data by using the obtained difference with the expected value of the weight data in the specific arithmetic operation process layer. Then, by using the corrected weight data in the specific arithmetic operation process layer and by using the difference between the output data 20 in the specific arithmetic operation process layer and the expected value, the arithmetic processing device 1 calculates the top difference data in the arithmetic operation process layer that is immediately previous to the specific arithmetic operation process layer.

The arithmetic processing device 1 sequentially repeats the correction of the weight data in each of the arithmetic operation process layers and sequentially repeats the calculation of the top difference data in the immediately previous arithmetic operation process layer. Consequently, the arithmetic processing device 1 can correct the weight data in all of the layers, i.e., the arithmetic operation process layers 101 to 103, in an associated manner with the expected value of the output data 20 in the arithmetic operation process layer 103. The arithmetic operation process of correcting the weight data in each of the arithmetic operation process layers in the direction of the arrow P2 performed by the arithmetic processing device 1 described above is sometimes referred to as a "convolution backward operation".

In the following, the input data used for the convolution forward operation in a specific arithmetic operation process layer is referred to as "bottom data". The bottom data corresponds to the output data output from the arithmetic operation process layer that is immediately previous to the specific arithmetic operation process layer. Furthermore, the data of a difference with the expected value of the weight data in the specific arithmetic operation process layer is referred to as "weight difference data". Furthermore, the data of the operation result of the convolution backward operation in the specific arithmetic operation process layer is referred to as "bottom difference data". Furthermore, the original data that is used for correcting the weight data in the convolution backward operation in the specific arithmetic operation process layer is referred to as "top difference data". Here, the calculation result of the convolution backward operation obtained in the specific arithmetic operation process layer is used as the original data of the convolution backward operation performed in the arithmetic operation process layer that is immediately previous to the specific arithmetic operation process layer. Namely, the bottom difference data calculated in the specific arithmetic operation process layer corresponds to the top difference data in the arithmetic operation process layer that is immediately previous to the specific arithmetic operation process layer.

Furthermore, in the convolution backward operation, the operation of obtaining the weight difference data by using both the top difference data and the bottom data is referred to as a "convolution backward weight difference operation". Furthermore, the operation of calculating the bottom difference data by using the corrected weight data and the top difference data is referred to as a "convolution backward bottom difference operation".

Furthermore, in the embodiment, a description will be given of a case in which each of the bottom data and the weight data has elements aligned as a square matrix. Accordingly, in a description below, the number of rows and the number of columns of the weight data are referred to as the "number of kernels" or the "kernel size" as a unit that is in accordance with the number of kernels. However, each of the bottom data and the weight data may also be a rectangle. Furthermore, an amount of movement of the weight data in the convolution forward operation at a time and an amount of movement of top difference data and an amount of movement of the weight data at a time in the convolution backward operation are sometimes referred to as "the number of strides". Furthermore, a single movement by an amount corresponding to the number of strides is performed in both the row direction and the column direction.

Figure 2:
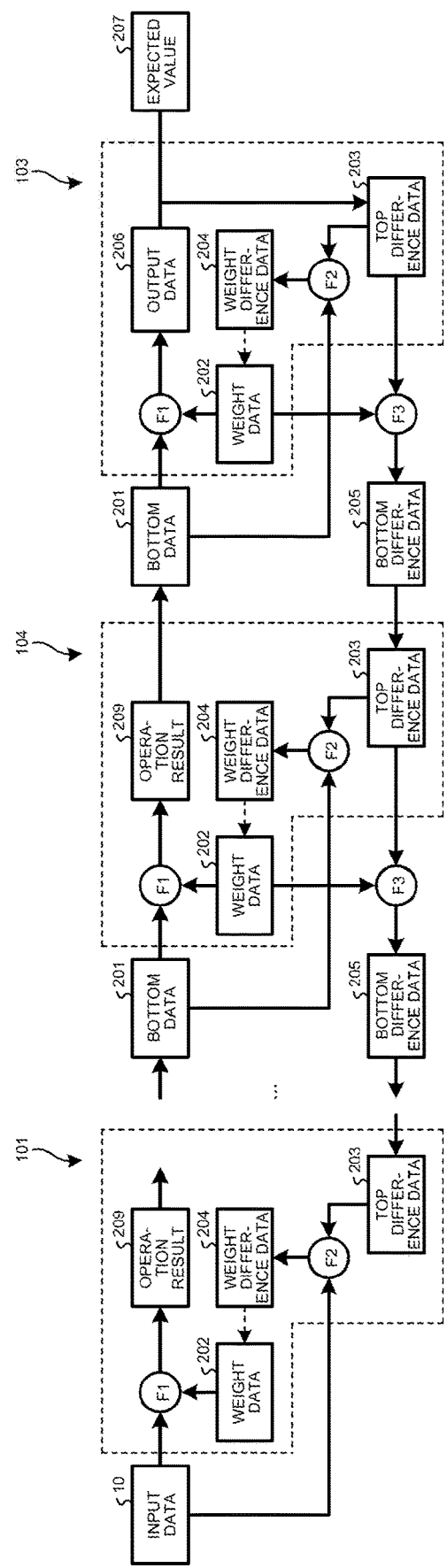
FIG. 2 is a schematic diagram illustrating a convolution forward operation and a convolution backward operation.

FIG. 2 is a schematic diagram illustrating the convolution forward operation and the convolution backward operation. FIG. 2 illustrates layers from the first layer in which the arithmetic operation process performed by using the input data 10 is started up to the $n^{th}$ layer in which top difference data 203 is created from output data 206 and an expected value 207. Here, FIG. 2 illustrates, as an example, the operation performed in each of the arithmetic operation process layers 101 to 104 up to the $n^{th}$ layer by using the arithmetic operation process layer 101 as the first layer, an arithmetic operation process layer 104 as the $n-1^{th}$ layer, and the arithmetic operation process layer 103 as the $n^{th}$ layer. Furthermore, the processes illustrated by the circles in FIG. 2 represent the arithmetic operation processes. An arithmetic operation process F1 represents a convolution forward operation. An arithmetic operation process F2 represents a convolution backward weight difference operation. Furthermore, an arithmetic operation process F3 represents a convolution backward bottom difference operation.

The arithmetic processing device 1 performs, in the arithmetic operation process layer 101, the convolution forward operation represented by the arithmetic operation process F1 on the input data 10 and on weight data 202 in the first layer and then calculates an operation result 209. Then, although not illustrated, in a similar manner in the subsequent second layer, the arithmetic processing device 1 similarly performs the convolution forward operation represented by the arithmetic operation process F1 on the operation result 209 obtained in the previous layer and on the weight data 202 in the second layer. Furthermore, by repeatedly performing this operation, the arithmetic operation process layer 103 that is the last $n^{th}$ layer similarly performs the convolution forward operation represented by the arithmetic operation process F1 on bottom data 201 acquired from the operation result 209 obtained in the arithmetic operation process layer 104 and on the weight data 202 in the $n^{th}$ layer. Furthermore, the arithmetic operation process layer 103 compares the output data 206 with the expected value 207 and calculates the top difference data 203. Here, because the input data 10 corresponds to the bottom data 201 in the second layer to the $n^{th}$ layer, in a description below, the input data 10 is treated as the bottom data 201 in the first layer. Furthermore, the output data 20 in the $n^{th}$ layer corresponds to the operation result 209 in one of the first layer to the $n-1^{th}$ layer.

Subsequently, the backward operation will be described. The arithmetic processing device 1 performs, in the arithmetic operation process layer 103, a convolution backward weight difference operation represented by an arithmetic operation process F2 on the top difference data 203 and on the bottom data 201 and then calculates weight difference data 204. Furthermore, the arithmetic processing device 1 updates the weight data 202 by using the weight difference data 204. Here, the arrows with the dashed lines illustrated in FIG. 2 represent the process of updating the weight data 202. Specifically, the arithmetic processing device 1 multiplies a learning rate by the weight difference data 204 and calculates the new weight data 202.

Furthermore, the arithmetic processing device 1 performs the convolution backward bottom difference operation represented by an arithmetic operation process F3 on the weight data 202 that was used in the forward operation and on the top difference data 203 and then calculates bottom difference data 205.

Here, FIG. 2 illustrates, as an example, the arithmetic operation process layer 103 that is the last layer; however, in also the other layers, the same operation is performed. However, in the other layers, the arithmetic processing device 1 uses the bottom difference data 205 that has been calculated as the top difference data 203 in the layer immediately subsequent to the subject layer.

Figure 3:
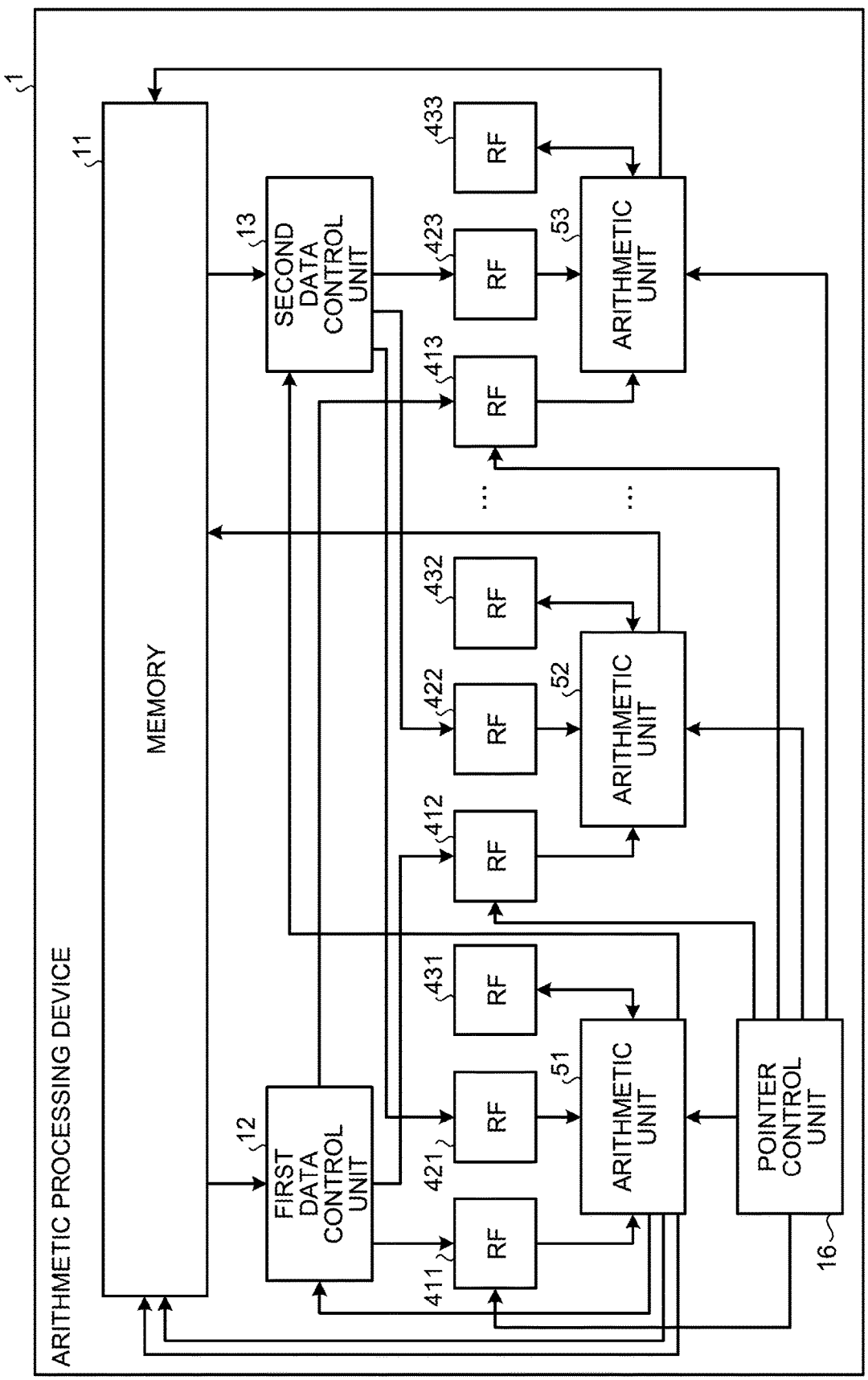
FIG. 3 is a block diagram illustrating an arithmetic processing device according to a first embodiment.

In the following, the arithmetic processing device 1 will be described in detail with reference to FIG. 3. FIG. 3 is a block diagram illustrating the arithmetic processing device. As illustrated in FIG. 3, the arithmetic processing device 1 includes a memory 11 functioning as a storage device, a first data control unit 12, a second data control unit 13, register files (RF) 411 to 413, 421 to 423, and 431 to 433. Furthermore, the arithmetic processing device 1 includes arithmetic units 51 to 53 and a pointer control unit 16.

Here, the register files 411 to 413 have the same function. Thus, in a description below, if the register files 411 to 413 are not distinguished, the register files 411 to 413 are referred to as "register files 410". Furthermore, the register files 421 to 423 have the same function. Thus, in a description below, if the register files 421 to 423 are not distinguished, the register files 421 to 423 are referred to as "register files 420". Furthermore, the register files 431 to 433 have the same function. Thus, in a description below, if the register files 431 to 433 are not distinguished, the register files 431 to 433 are referred to as "register files 430". Furthermore, the arithmetic units 51 to 53 have the same function. Thus, in a description below, if the arithmetic units 51 to 53 are not distinguished, the arithmetic units 51 to 53 are referred to as "arithmetic units 50".

The memory 11 is a storage unit that stores therein various kinds of data used for calculation. For example, the memory 11 stores therein the bottom data 201 and the weight data 202. Furthermore, the memory 11 also stores therein the top difference data 203 and the weight difference data 204 calculated by the arithmetic units 51 to 53, which will be described later.

The register files 410, 420, and 430 are storage units in each of which data used for an operation is temporarily stored at the time of the operation. The register files 410, 420, and 430 are allocated, in the embodiment, to each of the arithmetic units 50.

The register files 410 store therein the data used by one of the convolution forward operation, the convolution backward weight difference operation, and the convolution backward bottom difference operation. Furthermore, the register files 420 store therein the other one of the data used by the convolution forward operation, the convolution backward weight difference operation, and the convolution backward bottom difference operation. Furthermore, the register files 430 store therein the operation results obtained by the convolution forward operation, the convolution backward weight difference operation, and the convolution backward bottom difference operation.

When the first data control unit 12 performs the convolution forward operation, the convolution backward weight difference operation, and the convolution backward operation, the first data control unit 12 reads data from the memory 11 for each predetermined row and stores the read data in the register files 410 associated with the respective arithmetic units 50.

In a case of the convolution forward operation, the first data control unit 12 reads the element data in the bottom data 201 used for the operation from the memory 11 and stores the read element data in the register files 410 associated with the respective arithmetic units 50.

In a case of the convolution backward weight difference operation, the first data control unit 12 receives a designation of the top position of the row in which the reading is started. Then, the first data control unit 12 reads, from the memory 11 for each row, the element data in the bottom data 201 from the designated top position and stores the read element data in the register files 410 associated with the respective arithmetic units 50.

Here, when performing the convolution backward operation, the top difference data 203 is moved by an amount corresponding to the number of strides at a time in the row direction from the position in which a single row and a single column of the top difference data 203 is aligned with the position of a single row and a single column of the bottom data 201. Hereinafter, the aligned position of a single row and a single column is referred to as an initial position. Then, the top difference data 203 is moved by an amount corresponding to the number of strides at a time in the row direction from the initial position of the bottom data 201 to the position indicated by the number used for an integral multiple obtained in a case of the number that is obtained by adding an integral multiple of the number of strides to the number of kernels, that is greater than the number of rows of the bottom data 201, and that is the minimum number. In the following, the number used for an integral multiple obtained in a case of the number that is obtained by adding an integral multiple of the number of strides to the number of kernels, that is greater than the number of rows of the bottom data 201, and that is the minimum number is referred to as the "maximum number of movements".

The first data control unit 12 repeats the reading of the element data in the bottom data 201 performed for each row and the storing of the element data in the register files 410 until the number of processes reaches the number of the register files 410. However, if the number of the register files 410 is equal to or greater than the maximum number of movements, the first data control unit 12 ends the reading of the element data and the storing of the element data in the register files 410 after having performed the process the number of times corresponding to the maximum number of movements.

Then, after the completion of the operation performed by using the element data stored in the register files 410, the first data control unit 12 receives a notification of the end of the row portion operation from the arithmetic unit 50. Then, the first data control unit 12 moves the top position by an amount corresponding to the number of strides in the column direction and performs the reading of the element data in the bottom data 201 from the memory 11 for each row and the storing of the element data in the register files 410. When the bottom data 201 and the top difference data 203 are square, if the top difference data 203 is moved from the initial position by an amount corresponding to the number of strides in the column direction and if the moving is performed by the number of times corresponding to the maximum number of movements, the top difference data 203 overflows from the bottom data 201, the number of times corresponding to the maximum number of movements. Thus, the first data control unit 12 repeats the reading of the element data in the bottom data 201 for each row and the storing of the element data in the register files 410 the number of times corresponding to the maximum number of movements.

If the reading of the element data in the bottom data 201 for each row and the storing of the element data in the register files 410 have not been completed the number of times corresponding to the maximum number of movements, the first data control unit 12 repeats the same process until the number of processes reaches the maximum number of movements.

Furthermore, in a case of the convolution backward bottom difference operation, the first data control unit 12 receives a designation of the top position of the row in which the reading is started. Then, the first data control unit 12 reads the element data in the top difference data 203 for each row and stores the element data in the register files 410 associated with the respective arithmetic units 50.

The first data control unit 12 repeats the reading of the element data in the top difference data 203 for each row and the storing of the element data in the register files 410 by the number of times corresponding to the number of the register files 410. However, if the number of the register files 410 is equal to or greater than the number of rows of the top difference data 203, the first data control unit 12 ends the reading of the element data and storing of the element data in the register files 410 after having performed the process the number of times corresponding to the number of rows.

Then, after the completion of the operation performed by using the element data stored in the register files 410, the first data control unit 12 receives a notification of the end of the row portion operation from the arithmetic unit 50. Then, the first data control unit 12 moves the top position to the row immediately below by one and performs the reading of the element data in the top difference data 203 from the memory 11 for each row and the storing of the element data in the register files 410. The first data control unit 12 repeats the reading of the element data in the top difference data 203 for each row and the storing of the element data in the register files 410 the number of times corresponding to the number of rows of the weight data 202.

If the reading of the element data in the top difference data 203 for each row and the storing of the element data in the register files 410 have not been completed the number of times corresponding to the maximum number of movements, the first data control unit 12 repeats the same process until the number of processes reaches the maximum number of movements.

When the second data control unit 13 performs the convolution forward operation, the convolution backward weight difference operation, and the convolution backward, the second data control unit 13 reads data from the memory 11 for each predetermined row and stores the data in the register files 420 associated with the respective arithmetic units 50.

In a case of the convolution forward operation, the second data control unit 13 reads the element data stored in the weight data 202 used for the operation from the memory 11 by an amount corresponding to the number of the arranged register files 420. Then, the second data control unit 13 stores the read element data in the register files 420 associated with the respective arithmetic units 50.

Furthermore, in a case of the convolution backward weight difference operation, the second data control unit 13 receives a designation of the top of the top difference data 203 as the top position of the reading of the element data. Then, the second data control unit 13 reads, from the memory 11, the element data in the top difference data 203 by an amount corresponding to a single row from the designated top position the number of times corresponding to the number of the arranged register files 420. Then, the second data control unit 13 reads the read element data in the register files 420 associated with the respective arithmetic units 50. Namely, the second data control unit 13 stores the same element data in all of the register files 420 associated with the respective arithmetic units 50.

After the end of the operation performed by using the element data stored in the register files 420, the second data control unit 13 receives a notification of the end of the row portion operation from the arithmetic unit 50. Then, the second data control unit 13 downwardly moves the top position of the reading performed in the top difference data 203 to the top in the row that is present immediately below. Then, the second data control unit 13 reads, from the memory 11, the element data in the top difference data 203 by an amount corresponding to a single row from the top position the number of times up to corresponding to the number of the arranged register files 420 and stores the read element data in the register files 420. The second data control unit 13 repeats the reading of the element data by an amount corresponding to a single row from the top position and the storing of the element data in the register files 420.

If the arithmetic operation process has not been ended when the reading of the element data and the storing of element data in the register files 420 have been completed the number of times corresponding to the maximum number of movements, the second data control unit 13 moves the top position of the reading performed in the top difference data 203 to the top of the top difference data 203. Then, the second data control unit 13 repeats the same process until the arithmetic operation process is ended.

Furthermore, in a case of the convolution backward bottom difference operation, the second data control unit 13 receives a designation of the top of the weight data 202 as the top position of the reading of the element data. Then, the second data control unit 13 reads, from the memory 11, the element data by an amount corresponding to a single row in the weight data 202 from the designated top position the number of times corresponding to the number of the arranged register files 420. Then, the second data control unit 13 stores the read element data in the register files 420 associated with the respective arithmetic units 50. Namely, the second data control unit 13 stores the same element data in all of the register files 420 associated with the respective arithmetic units 50.

After the end of the operation performed by using the element data stored in the register files 420, the second data control unit 13 receives a notification of the end of the row portion operation from the arithmetic unit 50. Then, the second data control unit 13 downwardly moves the top position of the reading performed in the weight data 202 to the top in the row that is present immediately below. Then, the second data control unit 13 reads, from the memory 11, the element data in the weight data 202 by an amount corresponding to a single row from the top position the number of times up to corresponding to the number of the arranged register files 420 and stores the read element data in the register files 420. The second data control unit 13 repeats the reading of the element data by an amount corresponding to a single row from the top position and storing of the element data in the register files 420.

If the arithmetic operation process has not been ended when the reading of the element data and the storing of the element data in the register files 420 have been completed the number of times corresponding to the maximum number of movements, the second data control unit 13 moves the top position of the reading performed in the weight data 202 to the top of the weight data 202. Then, the second data control unit 13 repeats the same process until the arithmetic operation process is ended.

Figure 4:
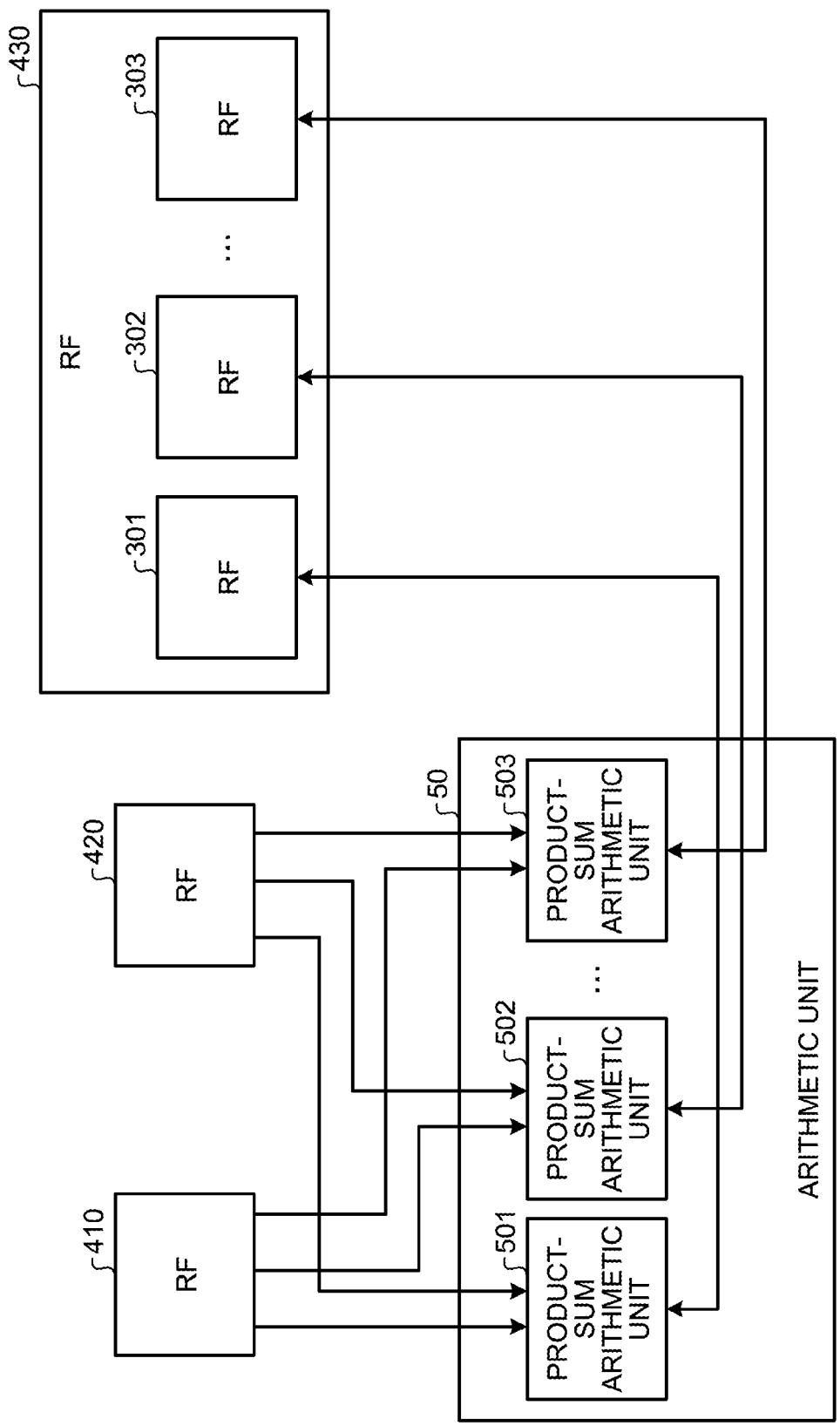
FIG. 4 is a block diagram illustrating an arithmetic unit in detail.

The arithmetic unit 50 performs the convolution forward operation, the convolution backward weight difference operation, and the convolution backward bottom difference operation by using the element data stored in the register files 410 and 420 and then stores the operation results in the register file 430. FIG. 4 is a block diagram illustrating the arithmetic unit in detail.

As illustrated in FIG. 4, the arithmetic unit 50 includes product-sum arithmetic units 501 to 503 that perform the FMA operation and that are arranged in parallel. Each of the product-sum arithmetic units 501 to 503 forms a different calculation path. The arithmetic unit 50 can change the number of the product-sum arithmetic units 501 to 503 to be used in accordance with the operation to be performed. Furthermore, the register file 430 includes register files 301 to 303 associated with the respective product-sum arithmetic units 501 to 503. In the following, the convolution backward weight difference operation and the convolution backward bottom difference operation performed by the arithmetic unit 50 will be described in detail.

In a case of the convolution backward weight difference operation, the arithmetic unit 50 repeats the following operation by using the product-sum arithmetic units 501 to 503 the number of which corresponds to the number of kernels of the weight data 202 to be calculated. The product-sum arithmetic unit 503 is the product-sum arithmetic unit arranged at the position away from the position of the product-sum arithmetic unit 501 by an amount corresponding to the number of kernels of the weight data 202. In this case, in the register file 410, pieces of data by an amount corresponding to a single row of the bottom data 201 are sequentially stored from the top of the row. Furthermore, in the register file 420, pieces of data by an amount corresponding to a single row of the top difference data 203 are sequentially stored from the top of the row.

The arithmetic unit 50 receives, from the pointer control unit 16, a designation of the position of the top pointer in the bottom data 201 stored in the register file 410. More specifically, first, the arithmetic unit 50 receives, from the pointer control unit 16, an input of the position of the top pointer that designates the top element data in the row in the bottom data 201 stored in the register file 410. Then, every time the arithmetic unit 50 calculates a single product-sum operation, the arithmetic unit 50 sequentially receives, from the pointer control unit 16, an input of the position of the top pointer that designates the element data that is in the row in the bottom data 201 stored in the register file 410 and that moves forward by an amount corresponding to the number of strides. The arithmetic unit 50 receives the input of the position of the updated top pointer from the pointer control unit 16 until the top pointer reaches the last position that is present before the number of kernels from the element data, that is present at the furthest position in the row, and that does not exceeds the element data.

The product-sum arithmetic unit 501 reads the element data in the bottom data 201 at the position of the top pointer designated by the pointer control unit 16 in the register file 410. Subsequently, each of the product-sum arithmetic units 502 and 503 sequentially reads the element data in the bottom data 201 at the position that is obtained by sequentially moving forward from the top pointer by 1. Specifically, furthermore, the product-sum arithmetic unit 502 reads the element data in the bottom data 201 at the position that is obtained by moving forward by 1 from the position of the top pointer. Furthermore, the product-sum arithmetic unit 503 reads the element data in the bottom data 201 at the position moved forward by an amount corresponding to the number of kernels from the position of the top pointer.

Furthermore, the arithmetic unit 50 receives, from the pointer control unit 16, a designation of the position of the top pointer in the top difference data 203 stored in the register file 420. More specifically, first, the arithmetic unit 50 receives, from the pointer control unit 16, an input of the position of the top pointer that designates the element data at the top in the row in the top difference data 203 stored in the register file 420. Then, every time the arithmetic unit 50 calculates a single product-sum operation, the arithmetic unit 50 sequentially receives, from the pointer control unit 16, an input of the position of the top pointer that designates the element data that is in the row in the top difference data 203 stored in the register file 420 and that is moved forward by an amount corresponding to the number of strides. The arithmetic unit 50 receives an input of the position of the updated top pointer from the pointer control unit 16 until the top pointer reaches the furthest position that does not exceeds the last element data in the row.

The product-sum arithmetic units 501 to 503 read the element data in the top difference data 203 that is present at the position of the top pointer designated by the pointer control unit 16 and that is stored in the register file 420. Namely, the product-sum arithmetic units 501 to 503 read the same element data in the top difference data 203.

Then, the product-sum arithmetic units 501 to 503 multiply the read element data in the bottom data 201 by the element data in the top difference data 203. Then, the product-sum arithmetic units 501 to 503 read the data stored in the associated register files 311 to 313. Then, the product-sum arithmetic units 501 to 503 add the read data to the multiplication results and store the results in the associated register files 311 to 313. Here, the register files 311 to 313 store therein 0 as the initial value. The product-sum arithmetic unit 501 repeats the calculation until the top pointer reaches the last position.

The value stored in each of the register files 311 to 313 corresponds to the median value of the calculation of the values in each of a single row in the weight difference data 204.

Based on this calculation, the arithmetic unit 50 can perform the product-sum operation that superimposes the top of the top difference data 203 onto to a single row in the bottom data 201 and that sums the product of each of the pieces of superimposed element data by sequentially shifting the row by an amount corresponding to the number of slides and can perform the row portion operation that obtains the sum of the results of each of the product-sum operations. If the row portion operation has been completed, the arithmetic unit 50 sends the completion of the row portion operation to the first data control unit 12 and the second data control unit 13. Then, the arithmetic unit 50 repeats the weight difference product-sum operation by using the element data that is newly stored in the register files 410 and 420. Here, in a period of time in which the arithmetic unit 50 performs the convolution backward weight difference operation by an amount corresponding to the maximum number of movements, the arithmetic unit 50 sequentially adds the results of the weight difference product-sum operation, which is performed by using the element data in each row at the same position from the top, to the value at the same position in the register file 430. By repeating the convolution backward weight difference operation by the number of times corresponding to the maximum number of movements, values are sequentially added to the median values stored in each of the register files 311 to 313 and, finally, the value by an amount corresponding to a single row in the weight difference data 204 is calculated.

If the convolution backward weight difference operation is performed by the number of times corresponding to the maximum number of movements, the arithmetic unit 50 stores the operation result in the weight difference data 204 included in the memory 11. Then, if the calculation of all of the pieces of the weight difference data 204 has not been performed, the arithmetic unit 50 repeats the same process as the calculation of the new element data in the weight difference data 204.

Furthermore, in a case of the convolution backward bottom difference operation, the arithmetic unit 50 repeats the following operation by using the product-sum arithmetic units 501 to 503 by an amount corresponding to the number of columns in the top difference data 203. The product-sum arithmetic unit 503 is the product-sum arithmetic unit that is present at the position subsequent to the position of the product-sum arithmetic unit 501 by an amount corresponding to the number of columns in the top difference data 203. Furthermore, the arithmetic unit 50 uses the same number of the register files 301 to 303 as the number of rows in the bottom difference data 205 to be calculated in the register file 430.

In the register file 410, the pieces of data by an amount corresponding to a single row in the top difference data 203 are sequentially stored from the top of the row. Furthermore, in the register file 420, the pieces of data by an amount corresponding to a single row in the weight data 202 are sequentially stored from the top of the row.

The arithmetic unit 50 receives, from the pointer control unit 16, a designation of the top pointer that indicates the element data that is sequentially moved forward by an amount corresponding to the number of strides for each calculation from the element data at the top in the row in the weight data 202 stored in the register file 420. Furthermore, the arithmetic unit 50 receives, from the pointer control unit 16, a designation of the pointer that indicates the element data that is sequentially moved forward by an amount corresponding to the number of strides for each calculation from the top in the row in the bottom difference data 205 stored in the register file 431.

The product-sum arithmetic units 501 to 503 sequentially read the element data from the position indicated by the pointer in the top difference data 203 stored in the register file 410. Namely, the product-sum arithmetic units 501 to 503 each store a different value in the top difference data 203 by an amount corresponding to a single row.

Furthermore, from among the product-sum arithmetic units 501 to 503, the product-sum arithmetic unit located at the top position and the product-sum arithmetic unit located at the position away from the position of the product-sum arithmetic unit 501 by an amount corresponding to the number of strides from the top repeatedly read the element data at the position that is moved forward by an amount corresponding to the number of strides for each calculation from the top of the row in the weight data 202 stored in the register file 420. Furthermore, from among the product-sum arithmetic units 501 to 503, the product-sum arithmetic unit located at a predetermined position within the number of strides from the top and the product-sum arithmetic unit located at the position away from the position of that product-sum arithmetic unit by an amount corresponding to the number of strides repeat, for each calculation, the reading of the element data that is made to move forward by an amount corresponding to the number of strides for each calculation from the position of the top pointer in the row in the weight data 202. In this way, the product-sum arithmetic units 501 to 503 read the pieces of element data that are shifted by one until the product-sum arithmetic unit at the position immediately previous to the position that is away from the top by an amount corresponding to the number of strides reads the element data.

Then, the product-sum arithmetic units 501 to 503 each multiply the read element data in the top difference data 203 by the weight data 202. Then, the product-sum arithmetic units 501 to 503 each acquire data that is made to move forward by an amount corresponding to the number of strides from the register files 301 to 303 for each calculation from the top pointer that is set in the register files 301 to 303 included in the register file 430. In other words, from among the register files 301 to 303 associated with the own product-sum arithmetic units 501 to 503, the product-sum arithmetic units 501 to 503 acquire the values of the register files 301 to 303 at the position away from the position of the register file 301 by an amount corresponding to the value obtained by multiplying the number of strides by the value that is obtained by subtracting 1 from the number of times of calculations, add the multiplication result, and store the values in the acquisition source of the values. However, if the number representing the register files 301 to 303 that store therein the value exceeds the number of the arranged register files 301 to 303, i.e., exceeds the number of columns in the bottom difference data 205, the product-sum arithmetic units 501 to 503 read and store the values of the register files 301 to 303 that are located at the position away from the position of the register file 301 by an amount corresponding to the exceeded number.

For example, the product-sum arithmetic unit 501 is associated with the first register file 301. Thus, if the number of strides is 1, the product-sum arithmetic unit 501 acquires, in the first calculation, the value of the register file 301 and again stores the value obtained by adding the multiplication result. In the second calculation, the product-sum arithmetic unit 501 acquires the value of the register file 302 and again stores the value obtained by adding the multiplication result. Furthermore, if the number of strides is 2, the first calculation is the same; however, in the second calculation, the product-sum arithmetic unit 501 acquires the third value of the register files 301 and 302 and again stores the value obtained by adding the multiplication result.

The product-sum arithmetic units 501 to 503 performs the row portion operation by repeating the same process until the weight difference product-sum operation has been completed on all of the pieces of element data corresponding to a single row in the top difference data 203 stored in the register file 420.

If this row portion operation is performed by the number of times corresponding to the number of rows in the weight data 202, the arithmetic unit 50 stores the operation results in the bottom difference data 205 that is included in the memory 11. Then, if the calculation of all of the pieces of the bottom difference data 205 has not been ended, the arithmetic unit 50 repeats the same process as the calculation of the new element data in the bottom difference data 205.

Furthermore, in a case of the arithmetic operation process layer 103 that is the $n^{th}$ layer corresponding to the last layer illustrated in FIG. 1, the arithmetic unit 50 outputs the output data to an output device (not illustrated), such as a monitor, or the like, and provides the operation result to a user. For example, in a case of image recognition, the arithmetic unit 50 outputs the recognition result to the output device.

In a case of the convolution backward weight difference operation, the pointer control unit 16 firstly sets the top pointer in the register file 410 to the top of the bottom data 201 stored in the register file 410. Furthermore, the pointer control unit 16 firstly sets the pointer in the register file 420 to the top of the top difference data stored in the register file 420.

Every time the pointer control unit 16 receives a notification of the completion of a single operation, the pointer control unit 16 sets the top pointer in the register file 410 to the position that is moved by an amount corresponding to the number of strides in the row in the top difference data 203. Furthermore, the pointer control unit 16 sets the pointer in the register file 420 to the position that is moved by one. Then, if the moving of the top pointer in the register file 410 has been performed by an amount corresponding to the number of movements in the row direction in the bottom data 201, the pointer control unit 16 returns the top pointer to the top of the register file 410. Namely, the top pointer in the register file 410 is set to the top in the subsequent row in the bottom data 201. Furthermore, the pointer control unit 16 returns the pointer in the register file 420 to the top of the register file 420. Namely, the pointer in the register file 420 is set to the top in the subsequent row in the top difference data 203. The pointer control unit 16 repeats the same process until the convolution backward weight difference operation performed by the arithmetic unit 50 is ended.

Furthermore, in a case of the convolution backward bottom difference operation, the pointer control unit 16 firstly sets the pointer in the register file 420 to the top of the row in the weight data 202 stored in the register file 420.

Every time the pointer control unit 16 receives a notification of the completion of a single operation, the pointer control unit 16 sets the top pointer in the register file 420 to the position that is moved by an amount corresponding to the number of strides in the row in the weight data 202. Then, if the pointer control unit 16 moves the top pointer in the register file 420 by the number of times corresponding to the number of movements in the row direction in the weight data 202, the pointer control unit 16 returns the top pointer to the top of the register file 420. Namely, the top pointer in the register file 420 is set at the top in the subsequent row in the weight data 202. The pointer control unit 16 repeats the same process until the convolution backward bottom difference operation performed by the arithmetic unit 50 is ended.

Furthermore, the convolution backward weight difference operation and the convolution backward bottom difference operation will be described in detail.

Figure 5:
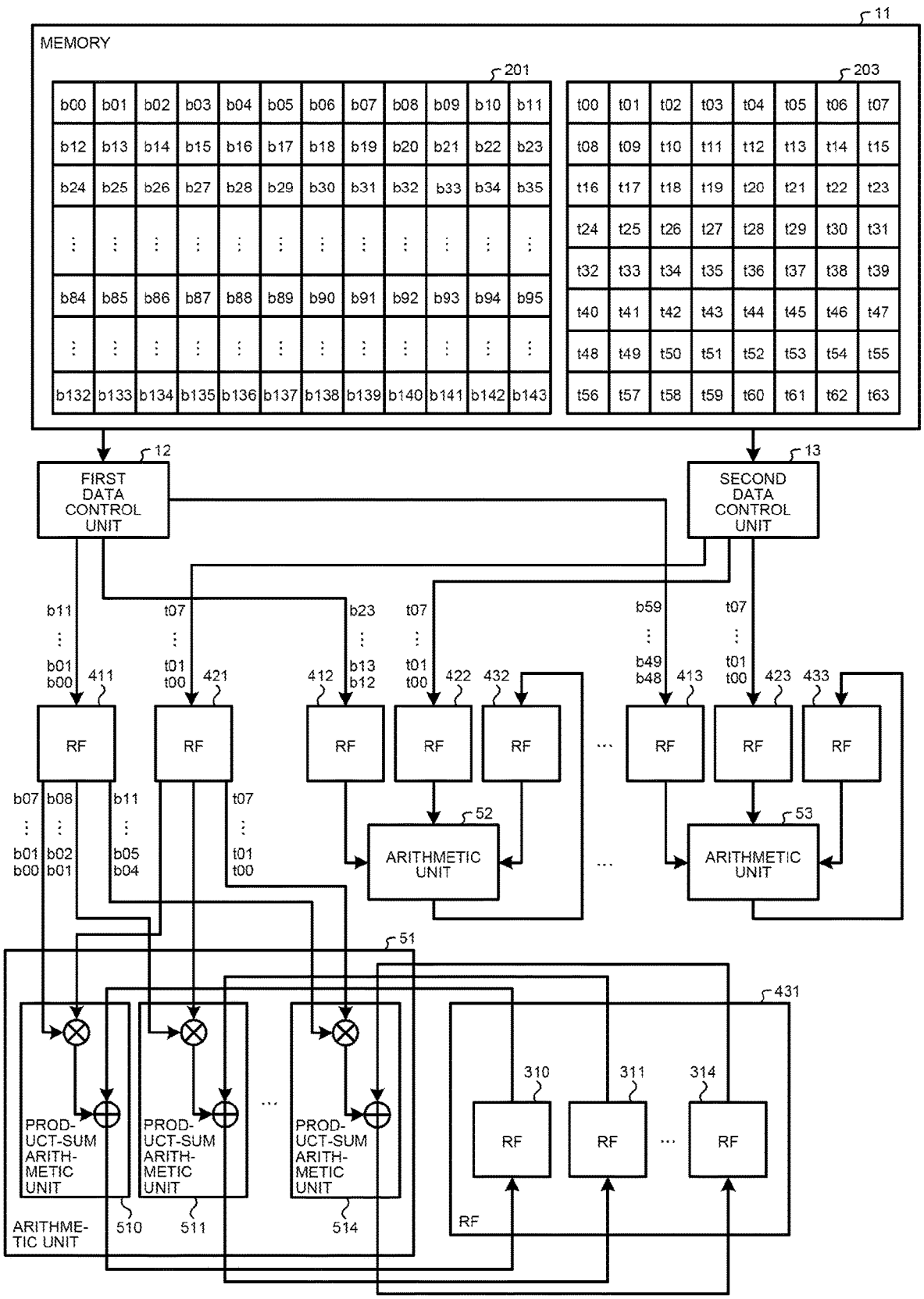
FIG. 5 is a schematic diagram illustrating the state of storing data in the register files at the time of a convolution backward weight difference operation.

First, a case of performing the convolution backward weight difference operation will be described with reference to FIG. 5. FIG. 5 is a schematic diagram illustrating the state of storing data in the register files at the time of the convolution backward weight difference operation. In FIG. 5, the arithmetic processing device 1 uses the bottom data 201 in which the element data is arranged in 12 rows and 12 columns and the top difference data 203 in which the element data is arranged in 8 rows and 8 columns. The bottom data 201 includes pieces of element data b00 to b143. Furthermore, the top difference data 203 is assumed to be obtained by using both the bottom data 201 and the weight data 202 that has five rows and five columns when the number of strides is 1 and includes pieces of element data t00 to t63. Furthermore, the weight difference data 204 becomes a matrix with five rows and five columns and each of the pieces of the element data in the weight difference data 204 are represented by w00 to w24.

Furthermore, in the embodiment, the same number of the arithmetic units 50 as the number of rows of the weight difference data 204 is used. Consequently, by moving in the row direction, the arithmetic unit 50 can perform the convolution backward weight difference operation on all of the pieces of the bottom data 201. For example, in FIG. 5, the five arithmetic units 51 to 53 are used. Furthermore, in the embodiment, each of the arithmetic units 50 includes the five product-sum arithmetic units 510 to 514. The product-sum arithmetic units 510 to 514 correspond to the product-sum arithmetic units 501 to 503 illustrated in FIG. 4. Furthermore, the register files 431 to 433 each have therein five register files 310 to 314. The register files 310 to 314 correspond to the register files 301 to 303 illustrated in FIG. 4.

The first data control unit 12 previously stores therein the size of the bottom data 201 and the top difference data 203 that are used in the convolution backward weight difference operation. For example, the first data control unit 12 acquires and stores the size (or the number of kernels) of the bottom data 201 and the top difference data 203 based on the set value that is set by using a display device and an input device.

The first data control unit 12 reads, from the memory 11, the element data by an amount corresponding to a single row from the top position in the bottom data 201. For example, the first data control unit 12 reads the pieces of data of the element data b00 to b11. Then, the first data control unit 12 stores the pieces of the element data b00 to b11 in the register file 411 that is used to store the bottom data.

Furthermore, the first data control unit 12 reads, from the memory 11, the element data that is in the subsequent single row in the bottom data 201. Then, the first data control unit 12 stores the read element data in the register file 412 that is used to store the bottom data. For example, the first data control unit 12 stores the element data b12 to b23 in the register file 412 that is used to store the bottom data.

In this way, the first data control unit 12 repeats the reading of the element data for each row from the memory 11 the number of times corresponding to the number of rows of the weight difference data 204 and the storing of the read element data in the register files 411 to 413 that are used to store different pieces of bottom data (hereinafter, simply referred to as the register files 411, 412, and 413). For example, the first data control unit 12 stores the element data b48 to b59 in the register file 413.

Furthermore, the second data control unit 13 reads, from the memory 11, the element data by an amount corresponding to a single row from the top position of the top difference data 203. For example, the second data control unit 13 reads, from the memory 11, the element data t00 to t07 in the top difference data 203. Then, the second data control unit 13 stores the element data t00 to t07 in the register files 421 to 423.

Here, calculation performed by the arithmetic unit 50 will be described by using the arithmetic unit 51 as an example. The product-sum arithmetic units 510 to 514 sequentially read five different pieces of element data b00 to b04 from the element data that is indicated by the top pointer and that is present in a single row in the bottom data 201 stored in the register file 411. Here, the number of pieces of the element data to be read is the number of pieces of the weight difference data 204. Furthermore, the product-sum arithmetic units 510 to 514 read the element data t00 that is indicated by the top pointer and that is present in a single row in the top difference data 203 stored in the register file 421. Then, the product-sum arithmetic units 510 to 514 multiply the element data in the bottom data 201 by the element data in the top difference data 203. Furthermore, the product-sum arithmetic units 510 to 514 add each of the multiplication results to the values stored in the associated register files 310 to 314 in the register file 430.

Then, the top pointer in the register file 411 is moved by one. Furthermore, the top pointer in the register file 412 is moved by one. Then, the product-sum arithmetic units 510 to 514 read five pieces of the element data b01 to b05 from the element data that is indicated by the moved top pointer and that is present in a single row in the bottom data 201 stored in the register file 411. Furthermore, the product-sum arithmetic units 510 to 514 read the element data t01 that is indicated by the top pointer and that is updated in the single row in the top difference data 203 stored in the register file 421. Then, the product-sum arithmetic units 510 to 514 multiply the element data in the bottom data 201 by the element data in the top difference data. Furthermore, the product-sum arithmetic units 510 to 514 add each of the multiplication results to the values stored in the associated register files 310 to 314 in the register file 431.

In this way, the product-sum arithmetic units 510 to 514 repeat the reading of each of the five pieces of element data from the position of the top pointer that is moved one by one for each calculation performed in the register file 411. Furthermore, the product-sum arithmetic units 510 to 514 repeat the reading of the element data indicated by the top pointer that is moved one by one for each calculation performed in the register file 412. Then, the product-sum arithmetic units 510 to 514 repeatedly multiply the read element data and add the multiplication result to the associated register files 310 to 314.

By doing so, the product-sum arithmetic unit 510 calculates b00×t00+b01×t01+ . . . b07×t07. Similarly, the product-sum arithmetic unit 511 calculates b01×t00+b02×t01+ . . . b08×t07. The product-sum arithmetic unit 512 calculates b02×t00+b03×t01+ . . . b09×t07. Similarly, the product-sum arithmetic unit 513 calculates b03×t00+b04×t01+ . . . b10×t07. Then, the product-sum arithmetic unit 514 calculates b04×t00+b05×t01+ . . . b011×t07. In the register files 310 to 314, the median value of the element data w00 to w05 in the weight difference data 204 in the middle of the calculation is stored.

The arithmetic units 52 and 53 also perform the same weight difference product-sum operation as that performed by the arithmetic unit 51 and store the median value of w06 to 09, . . . , and w20 to w24 that are the operation result in each of the register files 432 and 433 that are used to store the operation results.

Then, due to the first data control unit 12, the element data b12 to b23 that is present in the row ahead by an amount corresponding to the number of strides is stored in the register file 411, the element data b24 to b35 that is present in the row ahead by an amount corresponding to the number of strides is stored in the register file 412, and the element data b36 to b47 is stored in the register file 413. Furthermore, the element data t08 to t15 is stored in the register files 421 to 423 by the second data control unit 13.

The arithmetic unit 51 performs, similarly to the first operation, the convolution backward weight difference operation by using the element data b12 to b23 stored in the register file 411 and the element data t08 to t15 stored in the register file 421. By sequentially adding the calculation result to the values stored in the associated register files 310 to 314, the product-sum arithmetic units 510 to 514 update the median value of the element data w00 to w05 in the weight difference data 204. The arithmetic units 52 and 53 also perform the same weight difference product-sum operation as that performed by the arithmetic unit 51 and sequentially add the operation results, thereby updating the median value of the element data w06 to 09, . . . , and w20 to w24, as the operation results, in the weight difference data 204 stored in the register file 432 and 433.

In this way, the first data control unit 12 sequentially stores, in the register file 410, the element data that is present in the row ahead by an amount corresponding to the number of strides from the top row in the bottom data 201. Furthermore, the second data control unit 13 sequentially stores, in the register file 420, the element data by an amount corresponding to a single row at a time from the top row of the top difference data 203. Similarly, the first data control unit 12 and the second data control unit 13 store each of the pieces of the element data in the register files 411 to 413 and 421 to 423 by setting the row slid by a single row at a time to the top. Then, the arithmetic units 51 to 53 perform the weight difference operation by using the element data stored in the register files 411 to 413 and 421 to 423. Consequently, the pieces of the element data w00 to w24 in the weight difference data 204 are stored in each of the register files 311 to 313 in the register files 431 to 433, respectively. Each of the arithmetic units 51 to 54 stores each of the calculated values in the register files 311 to 313 in the register files 431 to 433 in the memory 11 as the element data w00 to w24 in the weight difference data 204.

Figure 6:
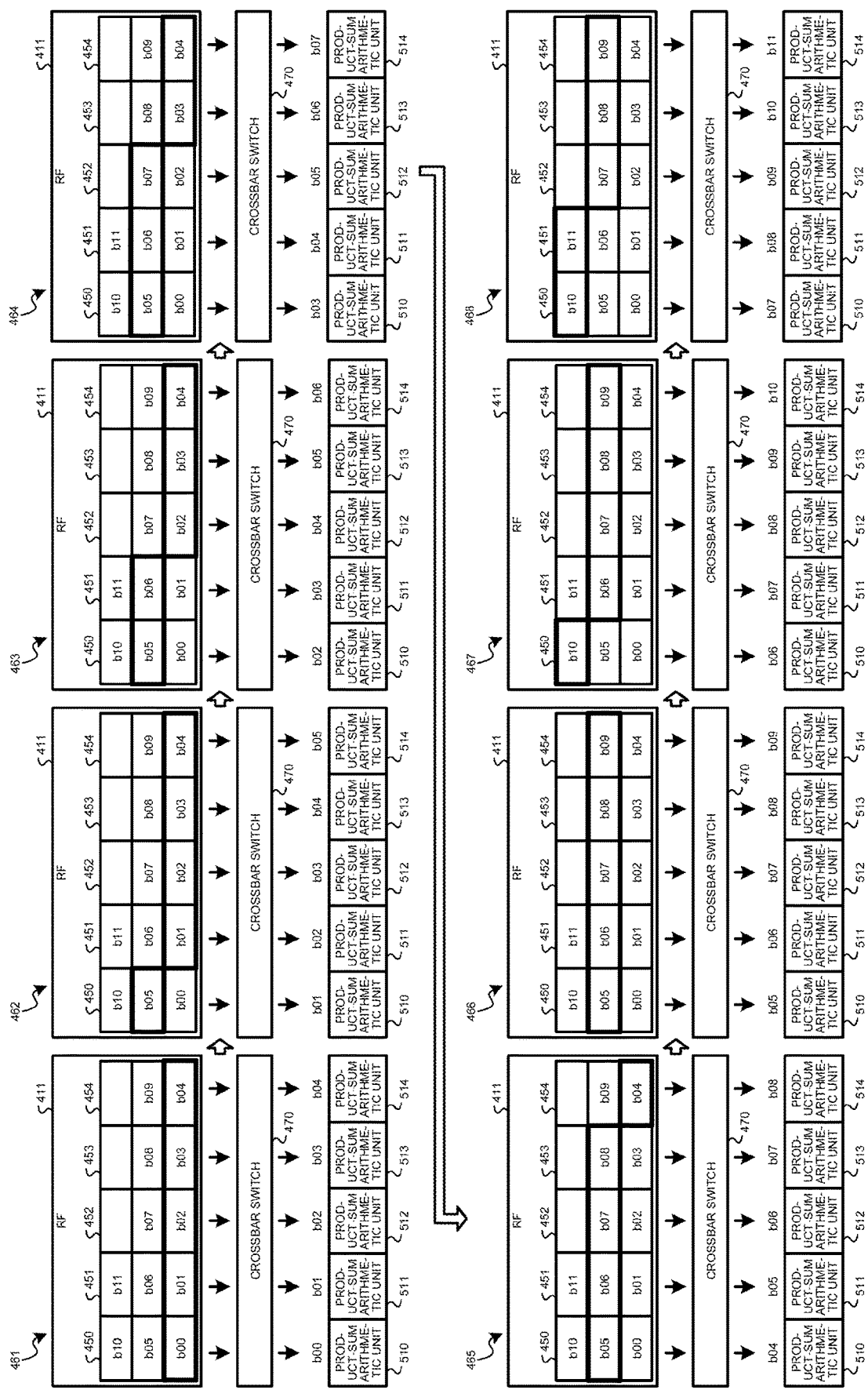
FIG. 6 is a schematic diagram illustrating reading of element data at the time of the convolution backward weight difference operation.

In the following, the reading of the element data from the register file 411 at the time of the convolution backward weight difference operation illustrated in FIG. 5 will be described with reference to FIG. 6. FIG. 6 is a schematic diagram illustrating the reading of the element data at the time of the convolution backward weight difference operation. States 461 to 468 represent the states at the time of a first to an eighth calculation, respectively, performed when the arithmetic unit 51 reads the first row of the bottom data 201. Here, as an example, the register file 411 has five arrays of arrays 450 to 454.

In order for the product-sum arithmetic units 510 to 514 to read desired element data from the register file 411, in practice, crossbar switches 470 illustrated in FIG. 6 are arranged. Then, the states 461 to 468 illustrated in FIG. 6 represent the states at the time of the first to the eighth calculation, respectively, performed when the element data b00 to b11 is stored in the register file 411.

In each of the states 461 to 468, the pointer control unit 16 places the top pointer at the top of the element data enclosed by the thick frame. Then, in each of the states 461 to 468, the element data enclosed by the thick frame become the element data to be read at the time of the subject calculation.

In the first calculation indicated by the state 461, the pointer control unit 16 places the top pointer on the element data b00. The product-sum arithmetic unit 510 acquires the element data b00 indicated by the top pointer from the array 450. The product-sum arithmetic unit 511 acquires, from the array 451, the element data b01 that is the second element data from the top pointer. The product-sum arithmetic unit 512 acquires, from the array 452, the element data b02 that is the third element data from the top pointer. The product-sum arithmetic unit 513 acquires, from the array 453, the element data b03 that is the fourth element data from the top pointer. The product-sum arithmetic unit 514 acquires, from the array 453, the element data b04 that is the fifth element data from the top pointer.

In the second calculation indicated by the state 462, the pointer control unit 16 moves the top pointer forward by one and places the top pointer on the element data b01. The product-sum arithmetic unit 510 acquires the element data b01 indicated by the top pointer from the array 451. The product-sum arithmetic unit 511 acquires, from the array 452, the element data b02 that is the second element data from the top pointer. The product-sum arithmetic unit 512 acquires, from the array 453, the element data b03 that is the third element data from the top pointer. The product-sum arithmetic unit 513 acquires, from the array 454, element data b04 that is the fourth element data from the top pointer. The product-sum arithmetic unit 514 acquires, from the array 450, the element data b05 that is the fifth element data from the top pointer.

In the third calculation indicated by the state 463, the pointer control unit 16 further moves the top pointer forward by one and places the top pointer on the element data b02. The product-sum arithmetic unit 510 acquires the element data b02 indicated by the top pointer from the array 452. The product-sum arithmetic unit 511 acquires, from the array 453, the element data b03 that is the second element data from the top pointer. The product-sum arithmetic unit 512 acquires, from the array 454, the element data b04 that is the third element data from the top pointer. The product-sum arithmetic unit 513 acquires, from the array 450, the element data b05 that is the fourth element data from the top pointer. The product-sum arithmetic unit 514 acquires, from the array 451, the element data b06 that is the fifth element data from the top pointer.

In the fourth calculation indicated by the state 464, the pointer control unit 16 further moves the top pointer forward by one and places the top pointer on the element data b03. The product-sum arithmetic unit 510 acquires the element data b03 indicated by the top pointer from the array 453. The product-sum arithmetic unit 511 acquires, from the array 454, the element data b04 that is the second element data from the top pointer. The product-sum arithmetic unit 512 acquires, from the array 450, the element data b05 that is the third element data from the top pointer. The product-sum arithmetic unit 513 acquires, from the array 451, the element data b06 that is the fourth element data from the top pointer. The product-sum arithmetic unit 514 acquires, from the array 452, the element data b07 that is the fifth element data from the top pointer.

In the fifth calculation indicated by the state 465, the pointer control unit 16 further moves the top pointer forward by one and places the top pointer on the element data b04. The product-sum arithmetic unit 510 acquires the element data b04 indicated by the top pointer from the array 454. The product-sum arithmetic unit 511 acquires, from the array 450, the element data b05 that is the second element data from the top pointer. The product-sum arithmetic unit 512 acquires, from the array 451, the element data b06 that is the third element data from the top pointer. The product-sum arithmetic unit 513 acquires, from the array 452, the element data b07 that is the fourth element data from the top pointer. The product-sum arithmetic unit 514 acquires, from the array 453, the element data b08 that is the fifth element data from the top pointer.

In the sixth calculation indicated by the state 466, the pointer control unit 16 further moves the top pointer forward by one and places the top pointer on the element data b05. The product-sum arithmetic unit 510 acquires the element data b05 indicated by the top pointer from the array 450. The product-sum arithmetic unit 511 acquires, from the array 451, the element data b06 that is the second element data from the top pointer. The product-sum arithmetic unit 512 acquires, from the array 452, the element data b07 that is the third element data from the top pointer. The product-sum arithmetic unit 513 acquires, from the array 453, the element data b08 that is the fourth element data from the top pointer. The product-sum arithmetic unit 514 acquires, from the array 454, the element data b09 that is the fifth element data from the top pointer.

In the seventh calculation indicated by the state 467, the pointer control unit 16 further moves the top pointer forward by one and places the top pointer on the element data b06. The product-sum arithmetic unit 510 acquires the element data b06 indicated by the top pointer from the array 451. The product-sum arithmetic unit 511 acquires, from the array 452, the element data b07 that is the second element data from the top pointer. The product-sum arithmetic unit 512 acquires, from the array 453, the element data b08 that is the third element data from the top pointer. The product-sum arithmetic unit 513 acquires, from the array 454, the element data b09 that is the fourth element data from the top pointer.

The product-sum arithmetic unit 514 acquires, from the array 450, the element data b10 that is the fifth element data from the top pointer.

In the eighth calculation indicated by the state 468, the pointer control unit 16 further moves the top pointer forward by one and places the top pointer on the element data b07. The product-sum arithmetic unit 510 acquires the element data b07 indicated by the top pointer from the array 452. The product-sum arithmetic unit 511 acquires, from the array 453, the element data b08 that is the second element data from the top pointer. The product-sum arithmetic unit 512 acquires, from the array 454, the element data b09 that is the third element data from the top pointer. The product-sum arithmetic unit 513 acquires, from the array 450, the element data b10 that is the fourth element data from the top pointer. The product-sum arithmetic unit 514 acquires, from the array 451, the element data b11 that is the fifth element data from the top pointer.

In this way, by using the five arrays 450 to 454, because the product-sum arithmetic units 510 to 514 read the element data from the different arrays 450 to 454, the product-sum arithmetic units 510 to 514 can read the element data without a conflict. Then, the product-sum arithmetic units 510 to 514 perform the product-sum operation by an amount corresponding to a single row by performing the product-sum operation by using the element data that is read in the states 461 to 468.

Figure 7B:
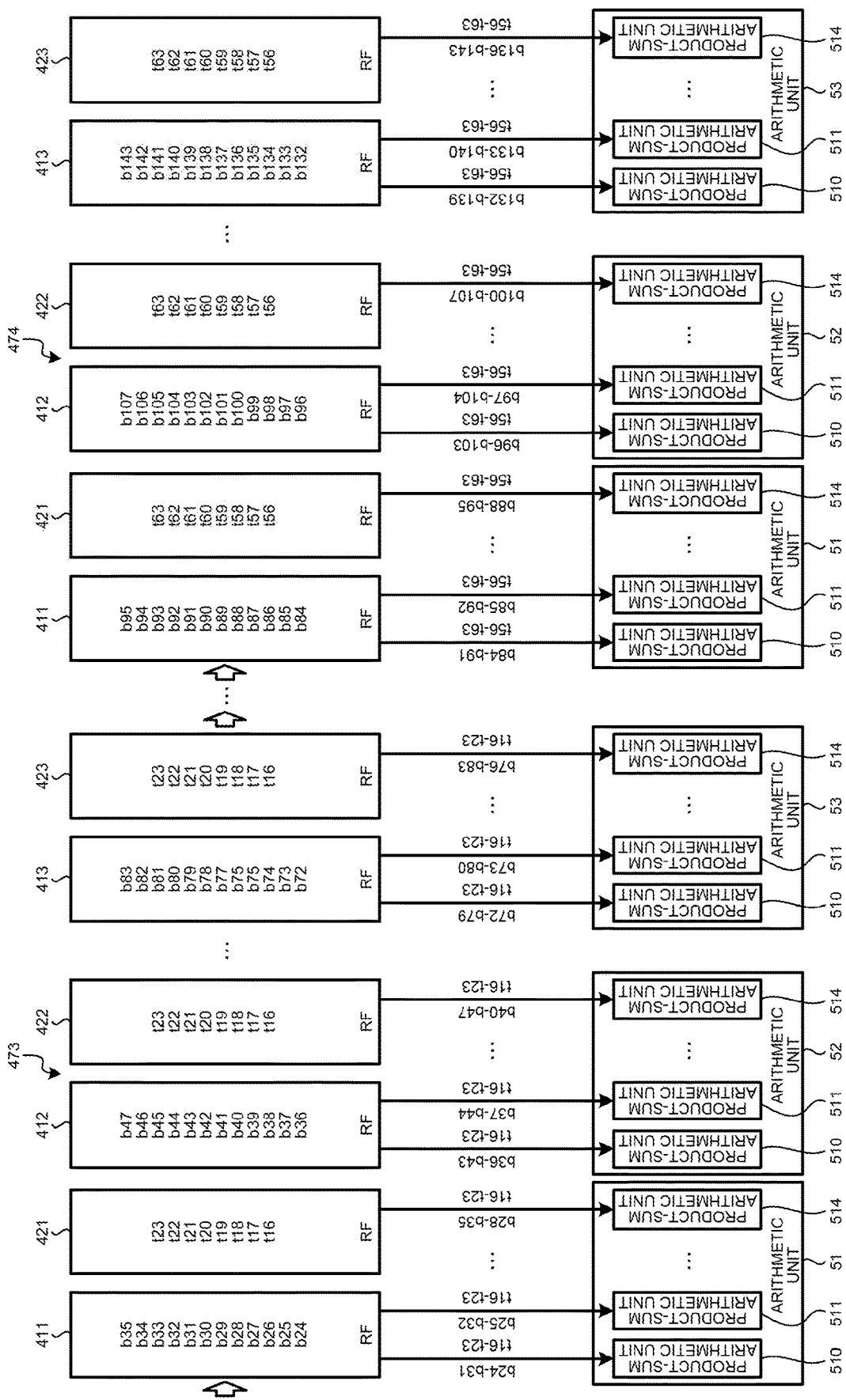
FIG. 7B is a schematic diagram illustrating the transition of element data stored when the number of strides in the convolution backward weight difference operation is 1.
Figure 8B:
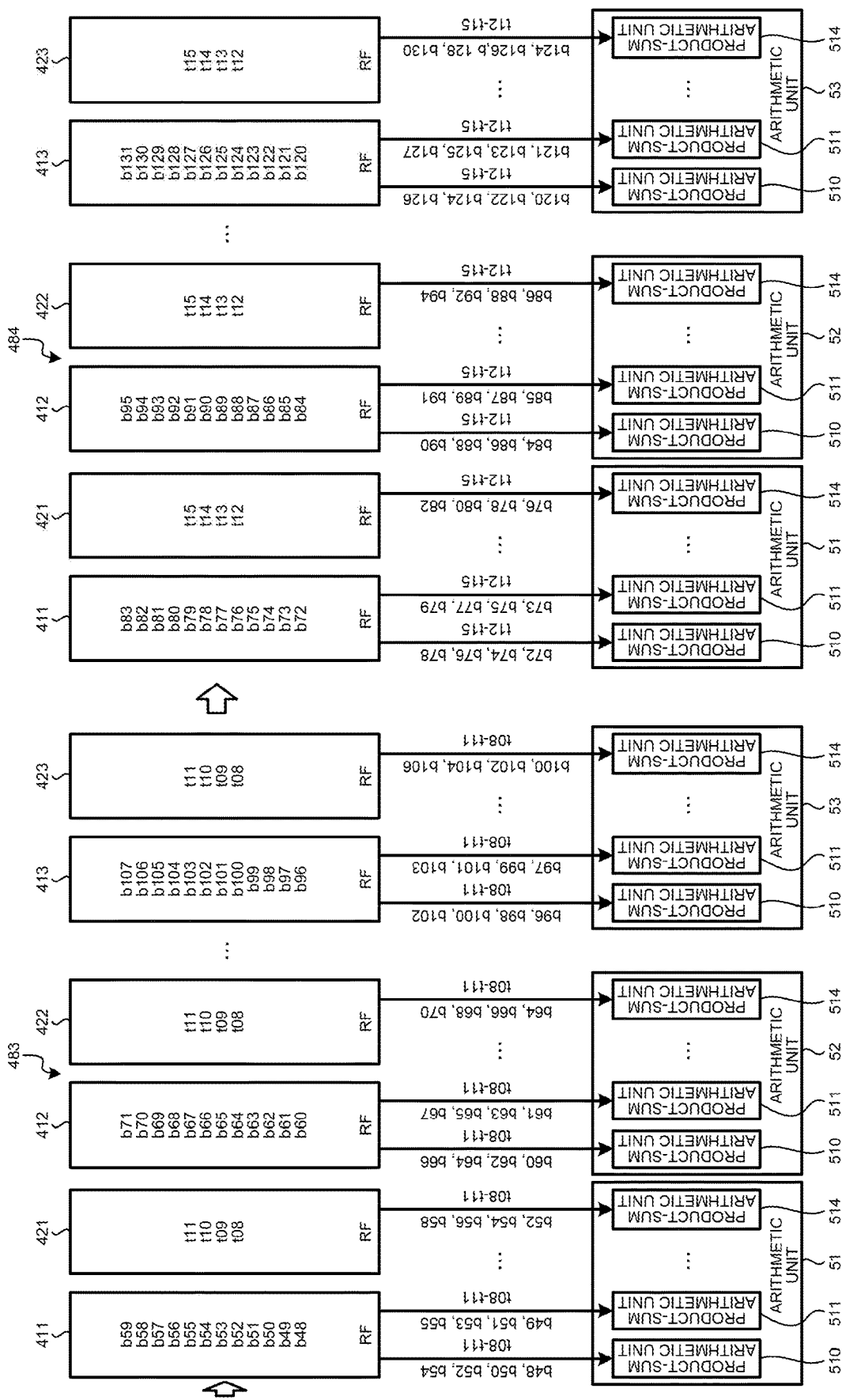
FIG. 8B is a schematic diagram illustrating the transition of element data stored when the number of strides in the convolution backward weight difference operation is 2.

In the following, the transition of the element data stored in the register files 410 and 420 will be described with reference to FIGS. 7A, 7B, 8A, and 8B. FIGS. 7A and 7B are schematic diagrams each illustrating the transition of the element data stored when the number of strides in the convolution backward weight difference operation is 1. Furthermore, FIGS. 8A and 8B are schematic diagrams each illustrating the transition of the element data to be stored when the number of strides in the convolution backward weight difference operation is 2. Here, a description will be given of a case in which the five arithmetic units 51 to 53 are present and each of the arithmetic units 51 to 53 include the five product-sum arithmetic units 510 to 514. It is assumed that the arithmetic unit 53 is the fifth arithmetic unit. Furthermore, a description will be given of a case in which the five register files 411 to 413 are present in association with the arithmetic units 51 to 53, respectively. It is assumed that the register file 413 is the fifth register file. This case also uses the top difference data 203 calculated by performing the convolution forward operation using the bottom data 201 having 12 rows and 12 columns and the weight data 202 having five rows and five columns.

If the number of strides is 1, first, as indicated by a state 471 illustrated in FIG. 7A, in the register file 411, the element data b00 to b11 is stored. Furthermore, in the register file 412, the element data b12 to b23 is stored. Furthermore, in the register file 413, the element data b48 to b59 is stored. Furthermore, in the register files 421 to 423, the element data t00 to t07 is stored.

The product-sum arithmetic unit 510 in the arithmetic unit 51 sequentially reads, for each calculation, the element data b00 to b07 from the register file 411. Furthermore, the product-sum arithmetic unit 511 in the arithmetic unit 51 sequentially reads, for each calculation, the element data b01 to b08 from the register file 411. Furthermore, the product-sum arithmetic unit 514 in the arithmetic unit 51 sequentially reads, for each calculation, the element data b04 to b11 from the register file 411. Each of the product-sum arithmetic units 510 to 514 in the arithmetic units 52 and 53 reads the element data from the associated register files 412 and 413. Furthermore, each of the product-sum arithmetic units 510 to 514 in the arithmetic units 51 to 53 sequentially reads, for each calculation, the element data t00 to t07 from the associated register files 421 to 423. Then, each of the product-sum arithmetic units 510 to 514 in the arithmetic units 51 to 53 multiplies both the pieces of the read element data and sequentially adds the multiplication results.

Then, after the operation indicated by the state 471 has been ended, as indicated by a state 472, in the register files 411 to 413, the element data with an amount corresponding to a single row subsequent to the row in which the pieces of the element data were stored in the state 471 is stored. Furthermore, as indicated by the state 472, in the register files 421 to 423, the element data with an amount corresponding to a single row subsequent to the row in which the pieces of the element data were stored in the state 471 is stored. Then, each of the product-sum arithmetic units 510 to 514 in the arithmetic units 51 to 53 sequentially read the element data, multiplies both the pieces of the read element data and sequentially adds the multiplication results to the calculation result in the state 471.

In this way, every time the operation is ended, the element data with an amount corresponding to a single row subsequent to the row in which the pieces of the element data were stored in the previous state is stored in the register files 411 to 413 and 421 to 423. Then, each of the product-sum arithmetic units 510 to 514 in the arithmetic units 51 to 53 sequentially reads the element data, multiplies both the pieces of the read element data, and sequentially adds the multiplication results to the immediately previous calculation results.

Because the top difference data 203 has eight rows and eight columns, the top difference data 203 can calculate a single piece of the weight difference data 204 by performing the operation using a single row in the top difference data 203 by an amount corresponding to eight rows. Thus, by performing the operation for eight times, the arithmetic units 51 to 53 can calculate all of the pieces of the element in the weight difference data 204. Thus, a state 474 represents the state at the time of the eighth calculation.

Here, similarly to the case of the bottom data 201 and the top difference data 203, it is assumed that each of the pieces of element data in the weight difference data 204 to be calculated is represented by w00 to w24 from the first row and the first column. The product-sum arithmetic unit 510 in the arithmetic unit 51 sequentially add the operation results of the eight operations indicated by the states 471 to 474, thereby calculating the element data w00 in the weight difference data 204 in that state in which the top difference data 203 is arranged in the initial position. Furthermore, the product-sum arithmetic unit 511 in the arithmetic unit 51 calculates the element data w01 in the weight difference data 204 that is arranged at the position in which the top difference data 203 is slid by a single column at a time from the initial position. Furthermore, the product-sum arithmetic unit 512 in the arithmetic unit 51 calculates the element data w02 in the weight difference data 204 that is arranged at the position in which the top difference data 203 is slid by two columns from the initial position. Furthermore, the product-sum arithmetic unit 513 in the arithmetic unit 51 calculates the element data w03 in the weight difference data 204 that is arranged at the position in which the top difference data 203 is slid by two columns from the initial position. Furthermore, the product-sum arithmetic unit 514 in the arithmetic unit 51 calculates the element data w04 in the weight difference data 204 that is arranged at the position in which the top difference data 203 is slid by four columns from the initial position. The position in which the top difference data 203 is slid by four columns from the initial position is, in other words, the position in which the eighth column in the top difference data 203 is matched with the 12$^{th}$ column in the bottom data 201. Based on the above, the arithmetic unit 51 calculates the element data w00 to w04 in the weight difference data 204 calculated by moving the top difference data 203 from the initial position to the row direction.

Similarly, the arithmetic unit 52 calculates the element data w05 to w09 in the weight difference data 204 calculated by moving the top difference data 203 in the column direction from the position that is present immediately below the initial position. Then, the arithmetic unit 53 calculates the element data w20 to w24 in the weight difference data 204 calculated by moving the top difference data 203 in the column direction from the position that is present four columns below the initial position. The position at four columns below the initial position is, in other words, the position in which the eighth row in the top difference data 203 matches the 12$^{th}$ row in the bottom data 201.

In this way, at the end of the operation in the states 471 to 474 illustrated in FIGS. 7A and 7B, the arithmetic units 51 to 53 end the calculation of all of the pieces of the element data w00 to w24 in the weight difference data 204 and complete the convolution backward weight difference operation.

Furthermore, when the number of strides is 2, if the bottom data 201 has 12 rows and 12 columns, the weight data 202 has five rows and five columns, and the kernel is five, the top difference data 203 has four rows and four columns.

In this case, first, as indicated by a state 481 illustrated in FIG. 8A, the element data b00 to b11 is stored in the register file 411. Furthermore, the element data b12 to b23 is stored in the register file 412. Furthermore, the element data b48 to b59 is stored in the register file 413. Furthermore, the element data t00 to t03 is stored in the register files 421 to 423.

Because the number of slides is 2, the product-sum arithmetic unit 510 in the arithmetic unit 51 sequentially reads, for each calculation from the register file 411, the element data b02, b04, and b06, such as every other element data, starting from the element data b00 that is indicated by the top pointer. Furthermore, the product-sum arithmetic unit 511 in the arithmetic unit 51 sequentially, for each calculation from the register file 411, the element data b03, b05, and b07, such as every other element data, starting from the element data b01 that is subsequent to the top pointer. Furthermore, the product-sum arithmetic unit 514 in the arithmetic unit 51 sequentially reads, for each calculation from the register file 411, the element data b04, b06, b08, and b10 that is present four pieces of element data ahead of the top pointer. Each of the product-sum arithmetic units 510 to 514 in the arithmetic units 52 and 53 similarly reads the element data from the associated register files 412 and 413. Furthermore, each of the product-sum arithmetic units 510 to 514 in the arithmetic units 51 to 53 sequentially reads, for each calculation, the element data t00 to t03 corresponding to an amount of a single row from the associated register files 421 to 423. Then, each of the product-sum arithmetic units 510 to 514 in the arithmetic units 51 to 53 sequentially multiplies both the pieces of the read element data and then adds the multiplication results.

Then, if the operation in the state 481 has been ended, as indicated by a state 482, in the register files 411 to 413, the element data that has an amount corresponding to a single row and that is present two strides ahead in the row that was used to store the element data in the state 481. Furthermore, as indicated by the state 482, in the register files 421 to 423, the element data that corresponds to an amount of a single row and that is present two strides ahead in the row that was used to store the element data in the state 481. Then, similarly to the state 481, each of the product-sum arithmetic units 510 to 514 in the arithmetic units 51 to 53 sequentially reads the element data, multiplies both the pieces of the read element data, and adds the multiplication results to the calculation results indicated by the state 481.

In this way, every time the operation is ended, the element data that corresponds to an amount of a single row and that is present two strides ahead in the row that was used to store the element data in the previous state is stored in the register files 411 to 413 and 421 to 423. Then, each of the product-sum arithmetic units 501 to 503 in the arithmetic units 51 to 53 sequentially reads the element data, multiplies both the pieces of the read element data, and adds the multiplication results to the immediately previous calculation results.

If the top difference data 203 has eight rows and eight columns and if the number of strides is 2, the arithmetic units 51 to 53 can calculate a single piece of the weight difference data 204 by performing the operation using a single row of the top difference data 203 the number of times corresponding to four rows. Thus, by performing the operation four times, the arithmetic units 51 to 53 can calculate all of the elements in the weight difference data 204.

Here, similarly to the bottom data 201 and the top difference data 203, it is assumed that the pieces of the element data in the weight difference data 204 to be calculated are represented by w00 to w24 in the order from the first row and the first column. By sequentially adding the operation results of the four operations indicated by the states 481 to 484, the product-sum arithmetic unit 510 in the arithmetic unit 51 calculates the element data w00 in the weight difference data 204 in the state in which the top difference data 203 is arranged at the initial position. Furthermore, the product-sum arithmetic unit 511 in the arithmetic unit 51 calculates the element data w01 in the weight difference data 204 that is in the state in which the top difference data 203 is arranged at the position that is shifted from the initial position by an amount corresponding to a single count of the number of strides. Furthermore, the product-sum arithmetic unit 512 in the arithmetic unit 51 calculates the element data w02 in the weight difference data 204 that is in the state in which the top difference data 203 is arranged at the position that is shifted from the initial position by an amount corresponding to two counts of the number of strides. Furthermore, the product-sum arithmetic unit 513 in the arithmetic unit 51 calculates the element data w03 in the weight difference data 204 that is in the state in which the top difference data 203 is arranged at the position that is shifted from the initial position by an amount corresponding to three counts of the number of strides. Furthermore, the product-sum arithmetic unit 514 in the arithmetic unit 51 calculates the element data w04 in the weight difference data 204 that is in the state in which the top difference data 203 is arranged at the position that is shifted from the initial position by an amount corresponding to four counts of the number of strides. Based on the above, the arithmetic unit 51 calculates the element data w00 to w04 in the weight difference data 204 calculated by moving the top difference data 203 from the initial position to the row direction.

Similarly, the arithmetic unit 52 calculates the element data w05 to w09 in the weight difference data 204 calculated by moving the top difference data 203 in the column direction from the position that is shifted from the initial position by an amount corresponding to a single count of the number of strides. Then, the arithmetic unit 53 calculates the element data w20 to w24 in the weight difference data 204 calculated by moving the top difference data 203 in the column direction from the position that is shifted from the initial position by an amount corresponding to four counts of the number of strides. Here, if the top difference data 203 has four rows and four columns and if the number of strides is 2, the $12^{th}$ row and the $12^{th}$ column of the bottom data 201 having 12 rows and 12 columns are not used for the calculation.

In this way, at the end of the operation in the states 481 to 484 illustrated in FIGS. 8A and 8B, the arithmetic units 51 to 53 end the calculation of all of the pieces of the element data w00 to w24 in the weight difference data 204 and the convolution backward weight difference operation has been completed.

Figure 9:
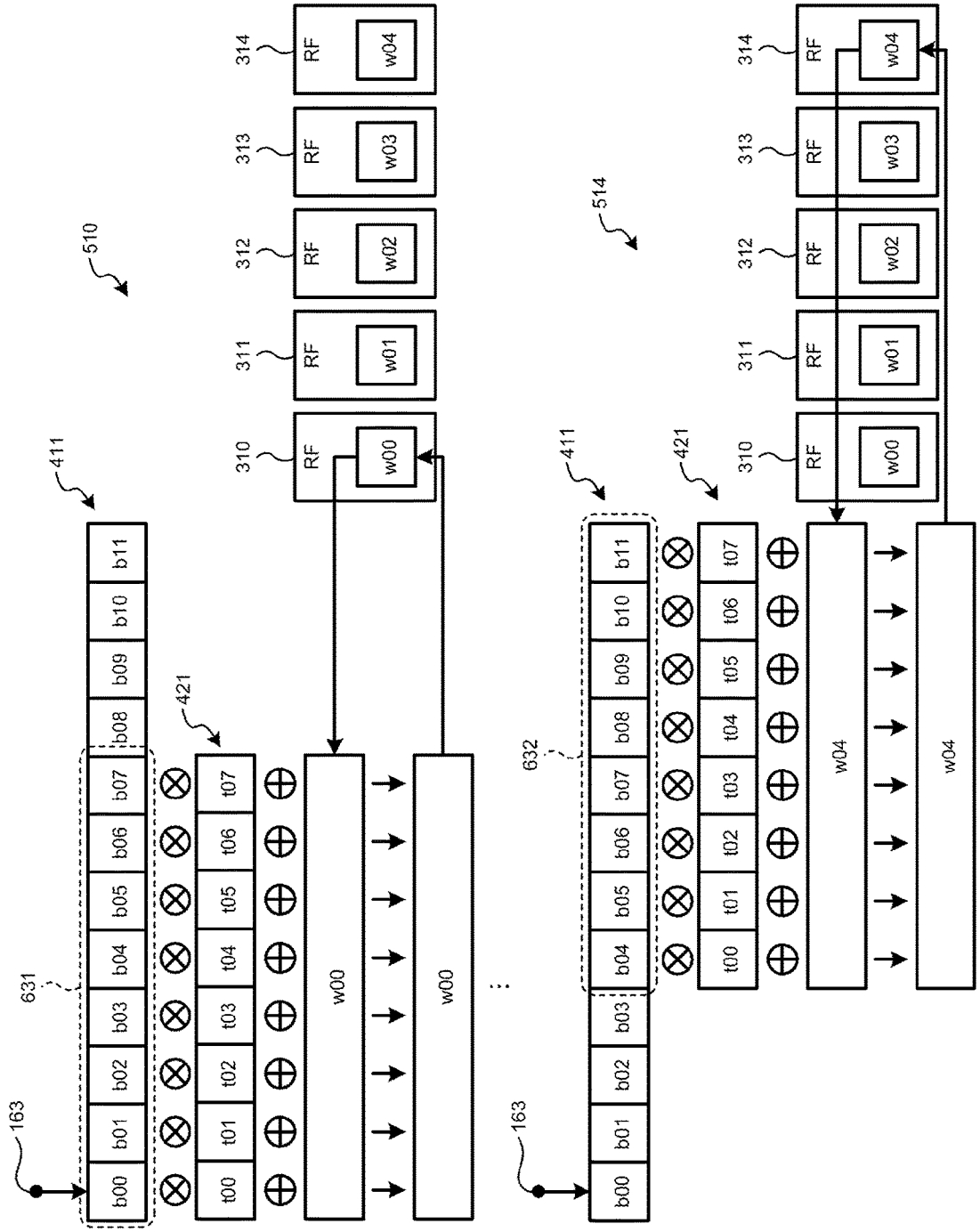
FIG. 9 is a schematic diagram illustrating the arithmetic unit at the time of first calculation of the convolution backward weight difference operation.
Figure 10:
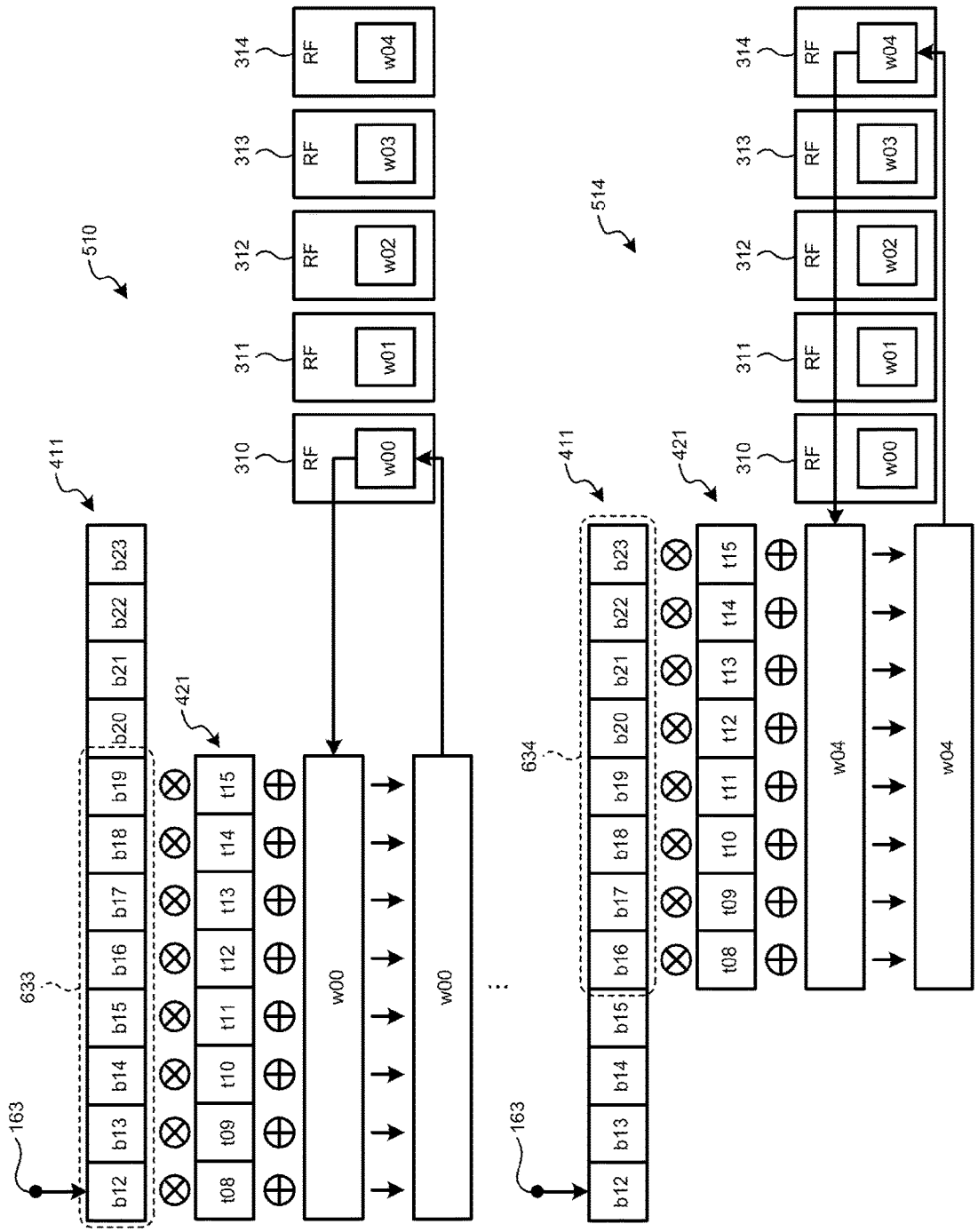
FIG. 10 is a schematic diagram illustrating the arithmetic unit at the time of second calculation of the convolution backward weight difference operation.

In the following, the convolution backward weight difference product-sum operation performed by the arithmetic unit 51 will be described in detail with reference to FIGS. 9 and 10. FIG. 9 is a schematic diagram illustrating the arithmetic unit at the time of the first calculation of the convolution backward weight difference operation. FIG. 10 is a schematic diagram illustrating the arithmetic unit at the time of the second calculation of the convolution backward weight difference operation.

First, when the convolution backward weight difference product-sum operation is started, the element data b00 to b11 is stored in the register file 411. Furthermore, the element data t00 to t07 in the top difference data 203 is stored in the register file 421.

The pointer control unit 16 sets a top pointer 163 in the register file 411 to the first element data b00 stored in the register file 411. Then, every time a single calculation of the product-sum arithmetic units 510 to 514 is ended, the pointer control unit 16 moves the top pointer 163 by one.

By sequentially acquiring the element data at the position of the top pointer 163 in the register file 411, the product-sum arithmetic unit 510 in the arithmetic unit 51 sequentially acquires the element data b00 to b07 that is present in the portion enclosed by a dotted line 631. Furthermore, the product-sum arithmetic unit 510 in the arithmetic unit 51 sequentially acquires the element data t00 to t07 from the top of the register file 421 for each calculation. Then, the product-sum arithmetic unit 510 in the arithmetic unit 51 multiplies the acquired element data b00 to b07 by the element data t00 to t07, respectively. Then, the product-sum arithmetic unit 510 in the arithmetic unit 51 acquires the value of the element data w00 in the weight difference data 204 stored in the register file 310. Here, the initial value of the element data w00 is 0. Then, the product-sum arithmetic unit 510 in the arithmetic unit 51 sums each of the multiplication results and the value of the element data w00 stored in the register file 310 and stores the calculation result in the register file 310.

By sequentially acquiring the element data that is present four pieces of element data ahead from the top pointer 163 in the register file 411, the product-sum arithmetic unit 514 in the arithmetic unit 51 sequentially acquires, for each calculation, the element data b04 to b11 that is present in the portion enclosed by a dotted line 632. Furthermore, the product-sum arithmetic unit 514 in the arithmetic unit 51 sequentially acquires, for each calculation, the element data t00 to t07 from the top of the register file 421. Then, the product-sum arithmetic unit 514 in the arithmetic unit 51 multiplies the acquired element data b04 to b11 by the element data t00 to t07, respectively. Then, the product-sum arithmetic unit 514 in the arithmetic unit 51 acquires the value of the element data w04 in the weight difference data 204 that is stored in the register file 314. Here, the initial value of the element data w04 is 0. Then, the product-sum arithmetic unit 514 in the arithmetic unit 51 sums the value of each of the multiplication results and the value of the element data w04 stored in the register file 314 and stores the calculation result in the register file 314.

Then, the pointer control unit 16 moves the top pointer 163 to the top in the row that is present immediately below and obtains the state illustrated in FIG. 10. Then, the pointer control unit 16 sets the top pointer 163 in the register file 411 to the element data b12 stored in the register file 411. Then, every time a single calculation performed by the product-sum arithmetic units 510 to 514 is ended, the pointer control unit 16 moves the pointer by one.

By sequentially acquiring the element data at the position of the top pointer 163 in the register file 411, the product-sum arithmetic unit 510 in the arithmetic unit 51 sequentially acquires, for each calculation, the element data b12 to b19 that is present in the portion enclosed by a dotted line 633. Furthermore, the product-sum arithmetic unit 510 in the arithmetic unit 51 sequentially acquires, for each calculation, the element data t08 to t15 from the top of the register file 421. Then, the product-sum arithmetic unit 510 in the arithmetic unit 5 multiplies the acquired element data b12 to b19 by the element data t08 to t15, respectively. Then, the product-sum arithmetic unit 510 in the arithmetic unit 51 acquires the value of the element data w00 in the weight difference data 204 stored in the register file 310. Here, before the second calculation, in the element data w00, the calculation results of the first calculation are stored. Then, the product-sum arithmetic unit 510 in the arithmetic unit 51 sums each of the multiplication results and the value of the element data w00 stored in the register file 310 and stores the calculation result in the register file 310.

By sequentially acquiring the element data that is present four pieces of element data ahead from the top pointer 163 in the register file 411, the product-sum arithmetic unit 514 in the arithmetic unit 51 sequentially acquires, for each calculation, the element data b16 to b23 that is present in the portion enclosed by a dotted line 634. Furthermore, the product-sum arithmetic unit 514 in the arithmetic unit 51 sequentially acquires, for each calculation, the element data t08 to t15 from the top of the register file 421. Then, the product-sum arithmetic unit 514 in the arithmetic unit 51 multiplies the acquired element data b16 to b23 by the element data t08 to t15, respectively. Then, the product-sum arithmetic unit 514 in the arithmetic unit 51 acquires the value of the element data w04 in the weight difference data 204 stored in the register file 314. Here, before the second calculation, in the element data w04, the calculation result of the first calculation is stored. Then, the product-sum arithmetic unit 514 in the arithmetic unit 51 sums each of the multiplication results and the value of the element data w04 stored in the register file 314 and stores the calculation result in the register file 314.

Thereafter, the pointer control unit 16 repeats the moving of the top pointer 163 by an amount corresponding to the number of strides six times and ends the calculation of the element data w01 to w04 in the weight difference data 204 performed in the convolution backward weight difference product-sum operation.

Figure 11:
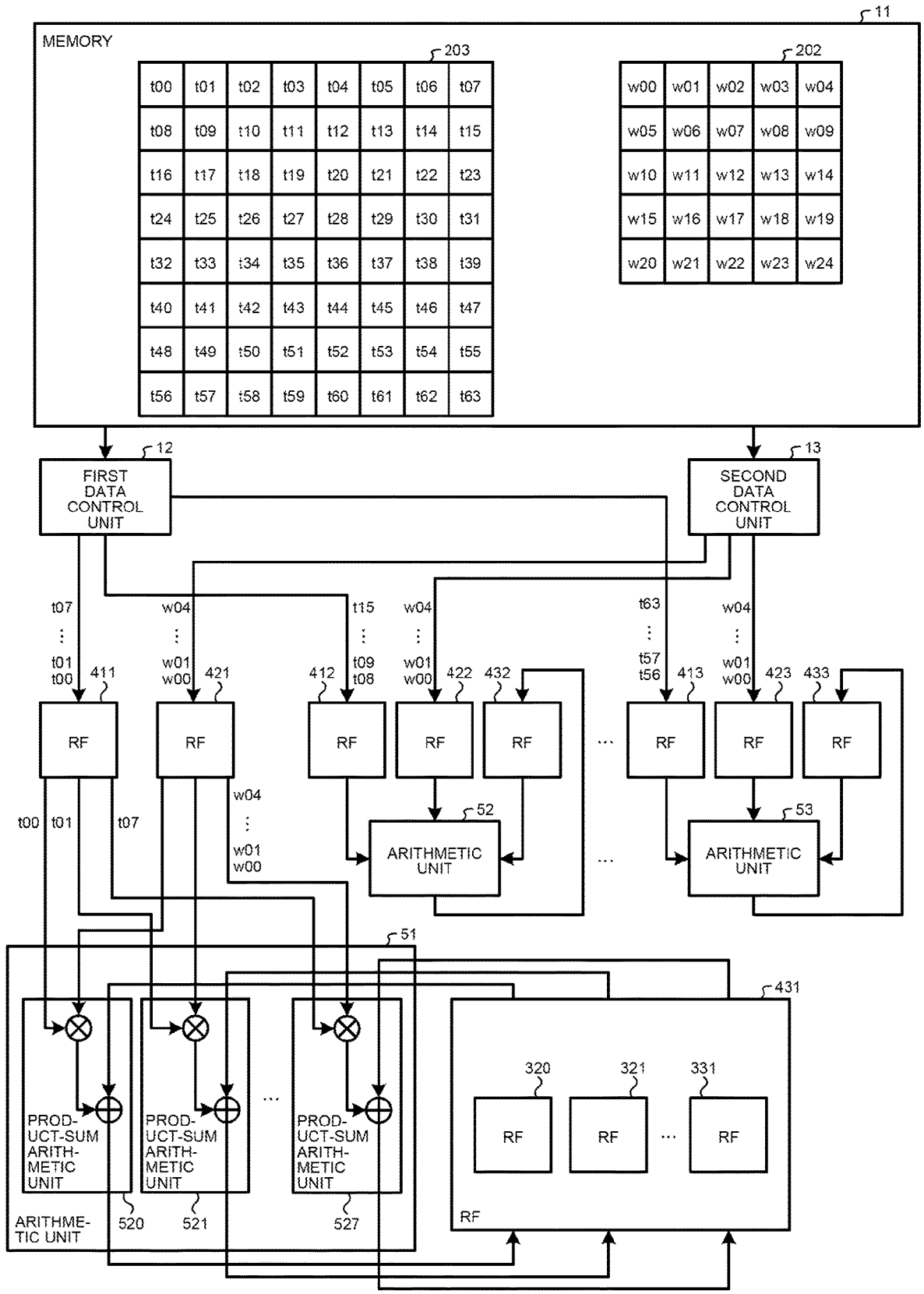
FIG. 11 is a schematic diagram illustrating the state of storing data into the register files at the time of a convolution backward bottom difference operation.

In the following, a case in which the convolution backward bottom difference operation is performed will be described with reference to FIG. 11. FIG. 11 is a schematic diagram illustrating the state of storing data into the register files at the time of the convolution backward bottom difference operation. In FIG. 11, the arithmetic processing device 1 uses the top difference data 203 in which the pieces of the element data are arranged in eight rows and eight columns and uses the weight data 202 in which the pieces of the element data are arranged in five rows and five columns. The weight data 202 includes the element data w00 to w24. Furthermore, the top difference data 203 is obtained by using the bottom data 201 having 12 rows and 12 columns and using the weight data 202 when the number of strides is 1 and includes the element data t00 to t63.

Furthermore, in the embodiment, the same number of the arithmetic units 51 to 53 as the number of rows of the top difference data 203 is used. Consequently, the arithmetic units 51 to 53 can perform the convolution backward bottom difference operation on all of the pieces of the bottom data 201 without replacing the data in the register files 411 to 413 that are used to store the top difference data. For example, in FIG. 11, the seven arithmetic units 51 to 53 are used. Here, it is assumed that the arithmetic unit 53 is the seventh arithmetic unit. Furthermore, each of the arithmetic units 51 to 53 includes, as the product-sum arithmetic units 501 to 503 illustrated in FIG. 4, the eight product-sum arithmetic units 520 to 527. Furthermore, each of the register files 431 to 433 includes, as the register files 301 to 303 illustrated in FIG. 4, 12 register files 320 to 331, the number of which is the same as the number of rows to be calculated in the bottom difference data 205. Furthermore, here, a description will be given with the assumption that the numbers 0 to 8 are sequentially assigned to the product-sum arithmetic units 520 to 527, respectively, and the numbers 0 to 11 are sequentially assigned to the register files 320 to 331.

The first data control unit 12 previously stores therein the size of the top difference data 203, the weight data 202, and the bottom data 201 that are used in the convolution backward weight difference operation. For example, based on an input of the set value that is previously set by using an display device and an input device, the first data control unit 12 acquires and stores therein the top difference data 203, the weight data 202, the size of the bottom data 201, and the size (or, the number of kernels) of the weight data 202.

The first data control unit 12 reads, from the memory 11, the element data with an amount corresponding to a single row from the top position in the top difference data 203. For example, the first data control unit 12 reads the data of the element data t00 to t07. Then, the first data control unit 12 stores the element data t00 to t07 in the register file 411.

Furthermore, the first data control unit 12 reads, from the memory 11, the element data that is present in the subsequent row in the top difference data 203. For example, the first data control unit 12 reads the data of the element data t08 to t15. Then, the first data control unit 12 stores the element data t08 to t15 in the register file 412.

The first data control unit 12 repeats the reading of the element data for each row from the memory 11 by an amount corresponding to the number of rows in the top difference data 203 and the storing of the read element data to the different register files 411 to 413. For example, the first data control unit 12 stores the element data t56 to t63 in the register file 413.

Furthermore, the second data control unit 13 reads, from the memory 11, the element data by an amount corresponding to a single row from the top position in the weight data 202. For example, the second data control unit 13 reads the element data w00 to w04 from the memory 11. Then, the second data control unit 13 stores the element data w00 to w04 in the register files 421 to 423.

The arithmetic unit 51 performs the bottom difference product-sum operation by using the element data t00 to t07 stored in the register file 411 and the element data w00 to w04 stored in the register file 421 and calculates the temporary values of the element data b00 to b11 in the bottom difference data 205. Then, the arithmetic unit 51 stores, in the register file 431 that is used to store the operation results, the element data b01 to b11 stored in the bottom difference data 205.

In the following, the product-sum operation performed by the product-sum arithmetic units 520 to 527 in the arithmetic unit 51 will be described in detail.

The product-sum arithmetic units 520 to 527 sequentially acquire each of the pieces of the element data t00 to t07 from the top of the element data t00 to t07 stored in the register file 411. Furthermore, the product-sum arithmetic units 520 to 527 acquire the element data w00 that is the top of the register file 421. Then, the product-sum arithmetic units 520 to 527 multiply the acquired element data t00 to t07 by the element data w00. Furthermore, the product-sum arithmetic units 520 to 527 acquire each of the pieces of the element data b00 to b07 from the register files 320 to 327 that have the same number as that of the product-sum arithmetic units 520 to 527. Here, the register files 320 to 331 store zero as the initial value. Then, the product-sum arithmetic units 520 to 527 add the multiplication results of each of the pieces of the element data t00 to t07 included in the product-sum arithmetic units 520 to 527 and the element data w00 to the pieces of the element data b00 to b07 that are acquired by each of the product-sum arithmetic units 520 to 527 and then stores the addition results in the register files 320 to 327 from which the element data b00 to b07 is acquired.

Then, the product-sum arithmetic units 520 to 527 hold the element data t00 to t07 acquired by each of the product-sum arithmetic units 520 to 527. Furthermore, the product-sum arithmetic units 520 to 527 acquires the element data w01 that is subsequent to the top element data in the register file 421. Then, the product-sum arithmetic units 520 to 527 multiply the held element data t00 to t07 by the element data w01. Furthermore, the product-sum arithmetic units 520 to 527 acquire each of the pieces of the element data b01 to b08 from the register files 321 to 328 each having the number subsequent to the same number as that of the own product-sum arithmetic unit. Then, the product-sum arithmetic units 520 to 527 add the multiplication result of the element data t00 to t07 stored in each of the product-sum arithmetic units 520 to 527 and the element data w01 to the element data b01 to b08 that is acquired by each of the product-sum arithmetic units 520 and then stores the addition results in the register files 321 to 328 from which the element data b01 to b08 is acquired.

In this way, in a case of the $k^{th}$ (k=1 to 5) calculation, the product-sum arithmetic units 520 to 527 acquire the element data w (00+k−1) at the position obtained by shifting the element data by k pieces of element data from the top of the register file 421. Then, the product-sum arithmetic units 520 to 527 multiply the held element data t00 to t07 by the acquired element data w (00+k). Furthermore, the product-sum arithmetic units 520 to 527 acquire each of the pieces of the element data b(00+k−1) to b(07+k−1) from the register files (320+k−1) to (327+k−1) having the number obtained by shifting by k from the same number as that of the own product-sum arithmetic units 520 to 527. Then, the product-sum arithmetic units 520 to 527 add the multiplication results to the element data b(00+k−1) to b(07+k−1)

acquired by each of the product-sum arithmetic units 520 to 527 and store the addition results in the register files (320+k−1) to (327+k−1) from which the element data b(00+k−1) to b(07+k−1) is acquired. Consequently, the product-sum arithmetic units 520 to 527 complete the calculation of the element data b01 to b11 in the bottom difference data 205.

The product-sum arithmetic units 520 to 527 in the arithmetic units 52 and 53 also perform the same bottom difference product-sum operation as that performed by the arithmetic unit 51 by using the element data stored in each of the register files 412, 413, 432, and 433. Then, the arithmetic units 52 and 53 store the temporary values of the element data b12 to b23, b24 to b35, . . . , and b84 to b95 that is the operation results in each of the register files 432 and 433.

Then, the register files 411 to 413 retain the data to be held. Furthermore, pieces of the element data w05 to w09 are stored in the register files 421 to 423 by the second data control unit 13.

Similarly to the last time, the arithmetic unit 51 performs the bottom difference product-sum operation by using both the element data t00 to t07 stored in the register file 411 and the element data w05 to w09 stored in the register file 421. The arithmetic unit 51 stores, in the register file 431, the values of the element data b12 to b23 in the bottom difference data 205 by sequentially adding the values in the bottom difference data 205 to the position indicated by the pointer in the register file 431. Then, the arithmetic unit 51 writes, in the memory 11, the value of the element data b12 to b23 in the bottom difference data 205 stored in the register file 431.

Similarly, the arithmetic unit 51 sequentially performs the bottom difference product-sum operation by using both the element data t00 to t07 stored in the register file 411 and the element data w10 to w24 stored in the register file 421. By sequentially adding the values in the bottom difference data 205 to the position indicated by the pointer in the register file 431, the arithmetic unit 51 calculates the values of the element data b24 to b35, b36 to b47, and b48 to b59 in the bottom difference data 205 and writes the calculation results in the memory 11. Here, the arithmetic unit 51 deletes the operation results written in the memory 11 from the register file 431.

Similarly, the arithmetic units 52 and 53 also perform the same weight difference product-sum operation as that performed by the arithmetic unit 51 and sequentially add the operation results to the values in the register files 432 and 433. Then, at the time of the operation performed in the state in which the element data w20 to w24 that is present in the last row in the weight data 202 is written in the register file 420, the arithmetic units 51 to 53 end the bottom difference product-sum operation and decide each of the values in the bottom difference data 205. Then, the arithmetic units 51 to 53 write the values of the decided bottom difference data 205 in the memory 11.

In this way, the first data control unit 12 sequentially stores, in the register files 411 to 413, the element data by an amount corresponding to a single row at a time from the top row of the top difference data 203. Furthermore, the second data control unit 13 stores, in the register files 421 to 423, the element data by sequentially shifting, for each operation, the element data by an amount corresponding to a single row at a time from the top row in the top difference data 203. Then, the arithmetic units 51 to 53 end the operation after having performed the operation by the number of times corresponding to the number of kernels.

Figure 12:
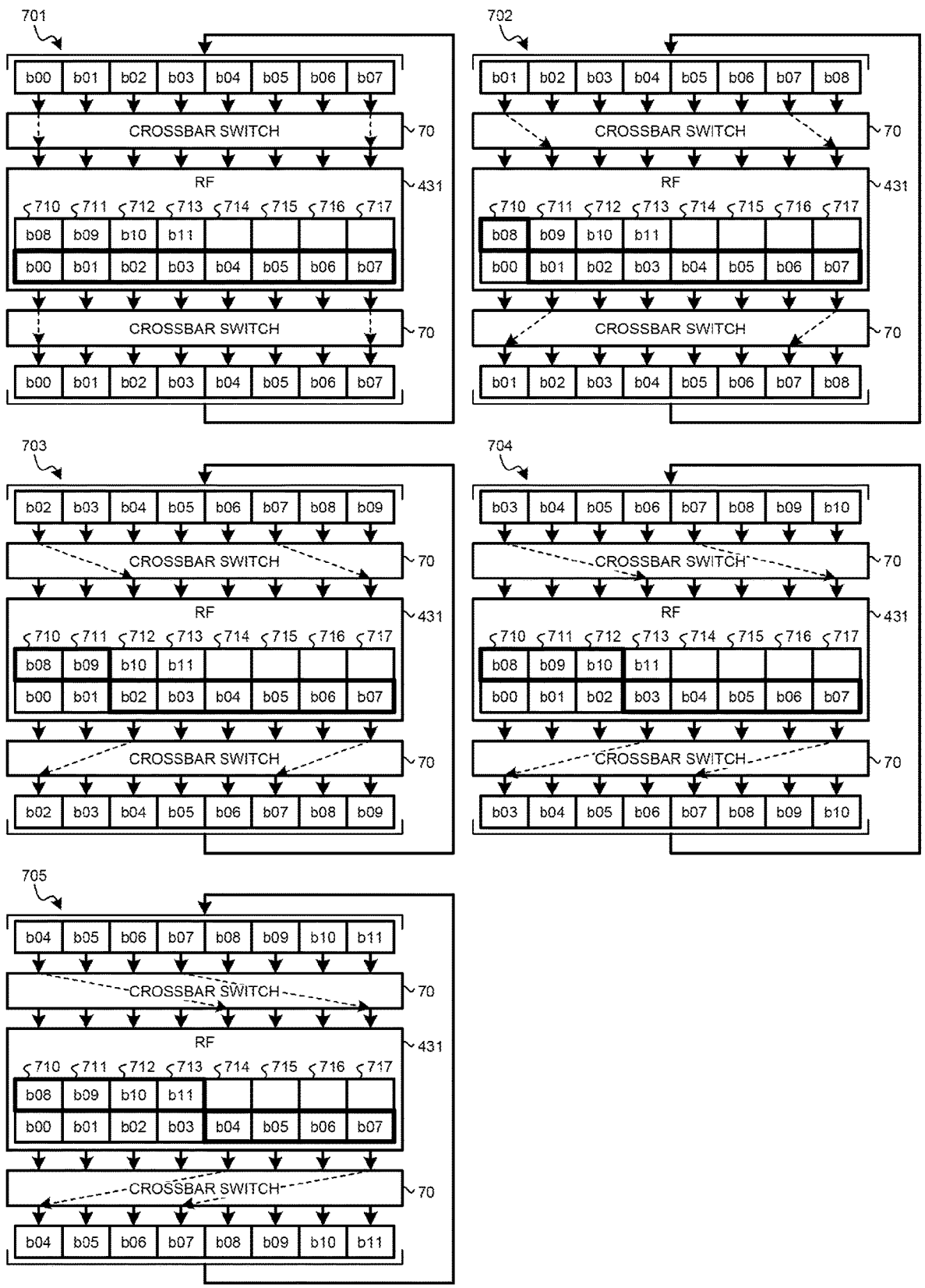
FIG. 12 is a schematic diagram illustrating reading and storing element data at the time of the convolution backward bottom difference operation.

In the following, the reading and the storing of the element data from and into the register file 413 at the time of the convolution backward bottom difference operation illustrated in FIG. 11 will be described in detail with reference to FIG. 12. FIG. 12 is a schematic diagram illustrating reading and storing element data at the time of the convolution backward bottom difference operation. States 701 to 705 indicates the states at the time of the first to the fifth calculations, respectively, performed by the arithmetic unit 51 reading the first row in the bottom data 201. Here, as an example, the register file 431 has arrays, such as arrays 710 to 717, with seven columns.

In order for the product-sum arithmetic units 520 to 527 to read and write desired element data from and in the register file 431, in practice, crossbar switches 70 illustrated in FIG. 12 are arranged. Then, the states 701 to 705 illustrated in FIG. 12 represent the states at the time of the first to the fifth calculation, respectively, performed when the element data b00 to b11 is stored in the register file 431.

In each of the states 701 to 705, the pointer control unit 16 places the top pointer 163 at the top of the element data enclosed by the thick frame. Then, in each of the states 701 to 705, the element data enclosed by the thick frame become the element data to be read at the time of the subject calculation. In the convolution backward bottom difference operation, the product-sum arithmetic units 520 to 527 read the element data b00 to b11 in the bottom difference data 205 from the register file 431. Then, the product-sum arithmetic units 520 to 527 add the multiplication results of the weight data 202 and the top difference data 203 to the element data b00 to b11 and again store the results at the position from which the reading was performed in the register file 431. In the following, each of the states 701 to 705 will be described in detail.

In the first calculation indicated by the state 701, the pointer control unit 16 places the top pointer on the element data b00. The product-sum arithmetic unit 520 acquires the element data b00 indicated by the top pointer from the array 710; updates the element data b00 by adding the acquired element data b00 to the multiplication result; and stores the updated element data b00 in the position indicated by the top pointer. The product-sum arithmetic unit 521 acquires the element data b01 that is the second element data from the top pointer from the array 711; updates by adding the acquired element data b01 to the multiplication result; and stores the updated element data b01 in the position indicated by the top pointer. The product-sum arithmetic unit 522 acquires the element data b02 that is the third element data from the top pointer from the array 712; updates by adding the acquired element data b02 to the multiplication result; and stores the updated element data b02 in the position indicated by the top pointer. The product-sum arithmetic unit 523 acquires the element data b03 that is the fourth element data from the top pointer from the array 713; updates by adding the acquired element data b03 to the multiplication result; and stores the updated element data b03 in the position indicated by the top pointer. The product-sum arithmetic unit 524 acquires the element data b04 that is the fifth element data from the top pointer from the array 714; updates by adding the acquired element data b04 to the multiplication result; and stores the updated element data b04 in the position indicated by the top pointer. The product-sum arithmetic unit 525 acquires the element data b05 that is the sixth element data from the top pointer from the array 715; updates by adding the acquired element data b05 to the multiplication result; and stores the updated element data b05 in the position indicated by the top pointer. The product-sum arithmetic unit 526 acquires the element data b06 that is the seventh element data from the top pointer from the array 716; updates by adding the acquired element data b06 to the multiplication result; and stores the updated element data b06 in the position indicated by the top pointer. The product-sum arithmetic unit 527 acquires the element data b07 that is the eighth element data from the top pointer from the array 717; updates by adding the acquired element data b07 to the multiplication result; and stores the updated element data b07 in the position indicated by the top pointer.

In the states 702 to 705, the pointer control unit 16 moves the top pointer one by one. The product-sum arithmetic unit 520 performs, as indicated by the broken line arrow, the reading and the storing of the data at the position indicated by the top pointer. The product-sum arithmetic unit 521 performs, as indicated by the broken line arrow, the reading and the storing of the second data from the top pointer. The product-sum arithmetic unit 522 performs, as indicated by the broken line arrow, the reading and the storing of the third data from the top pointer. The product-sum arithmetic unit 523 performs, as indicated by the broken line arrow, the reading and the storing of the fourth data from the top pointer. The product-sum arithmetic unit 524 performs, as indicated by the broken line arrow, the reading and the storing of the fifth data from the top pointer. The product-sum arithmetic unit 525 performs, as indicated by the broken line arrow, the reading and the storing of the sixth data from the top pointer. The product-sum arithmetic unit 526 performs, as indicated by the broken line arrow, the reading and the storing of the seventh data from the top pointer. The product-sum arithmetic unit 527 performs, as indicated by the broken line arrow, the reading and the storing of the eighth data from the top pointer.

In this way, by using seven arrays 710 to 717, the product-sum arithmetic units 520 to 527 read the element data from the different arrays 710 to 717; therefore, it is possible to avoid the occurrence of conflict at the time of reading and storing of the data.

Figure 13A:
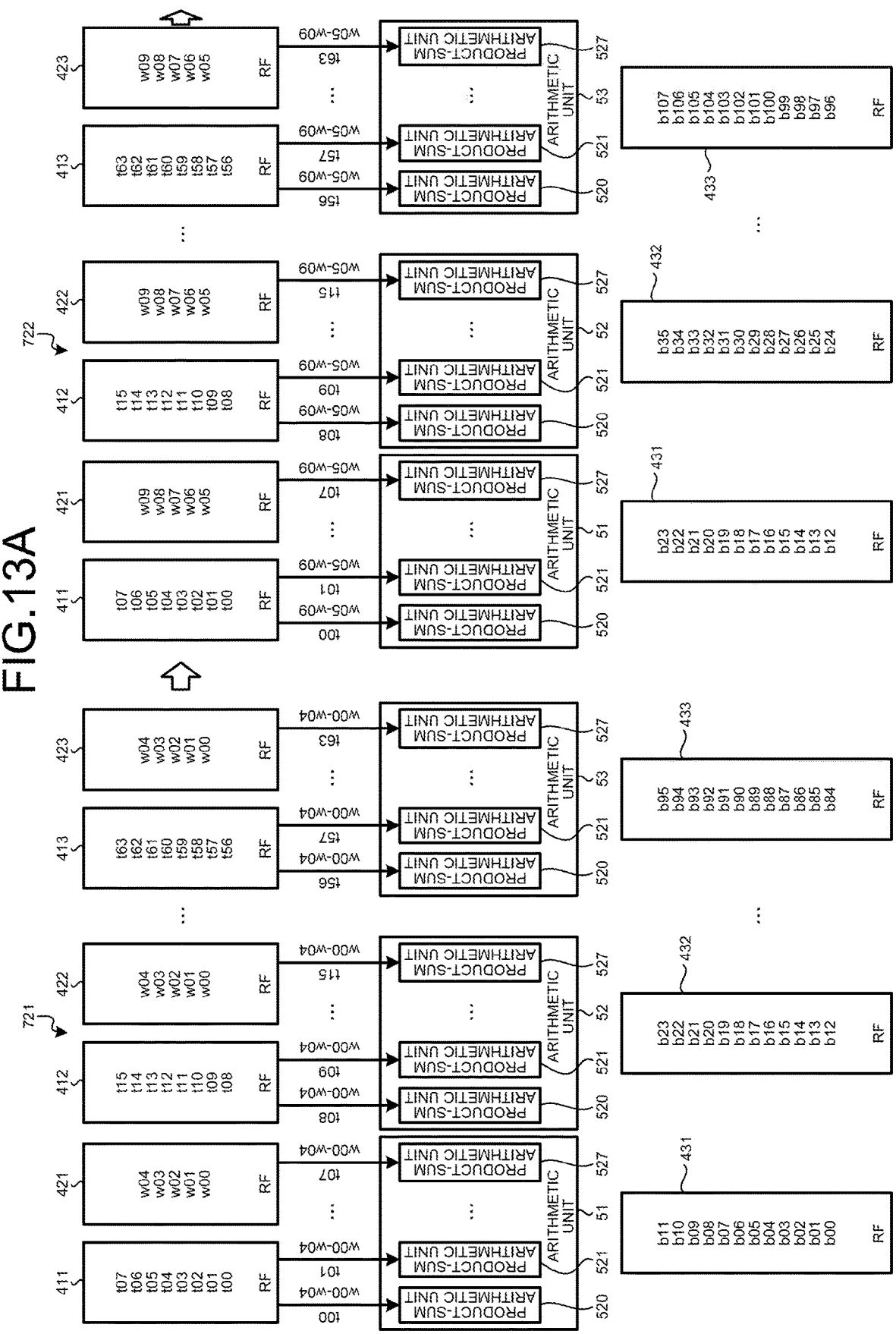
FIG. 13A is a schematic diagram illustrating the transition of element data stored when the number of strides in the convolution backward bottom difference operation is 1.
Figure 13B:
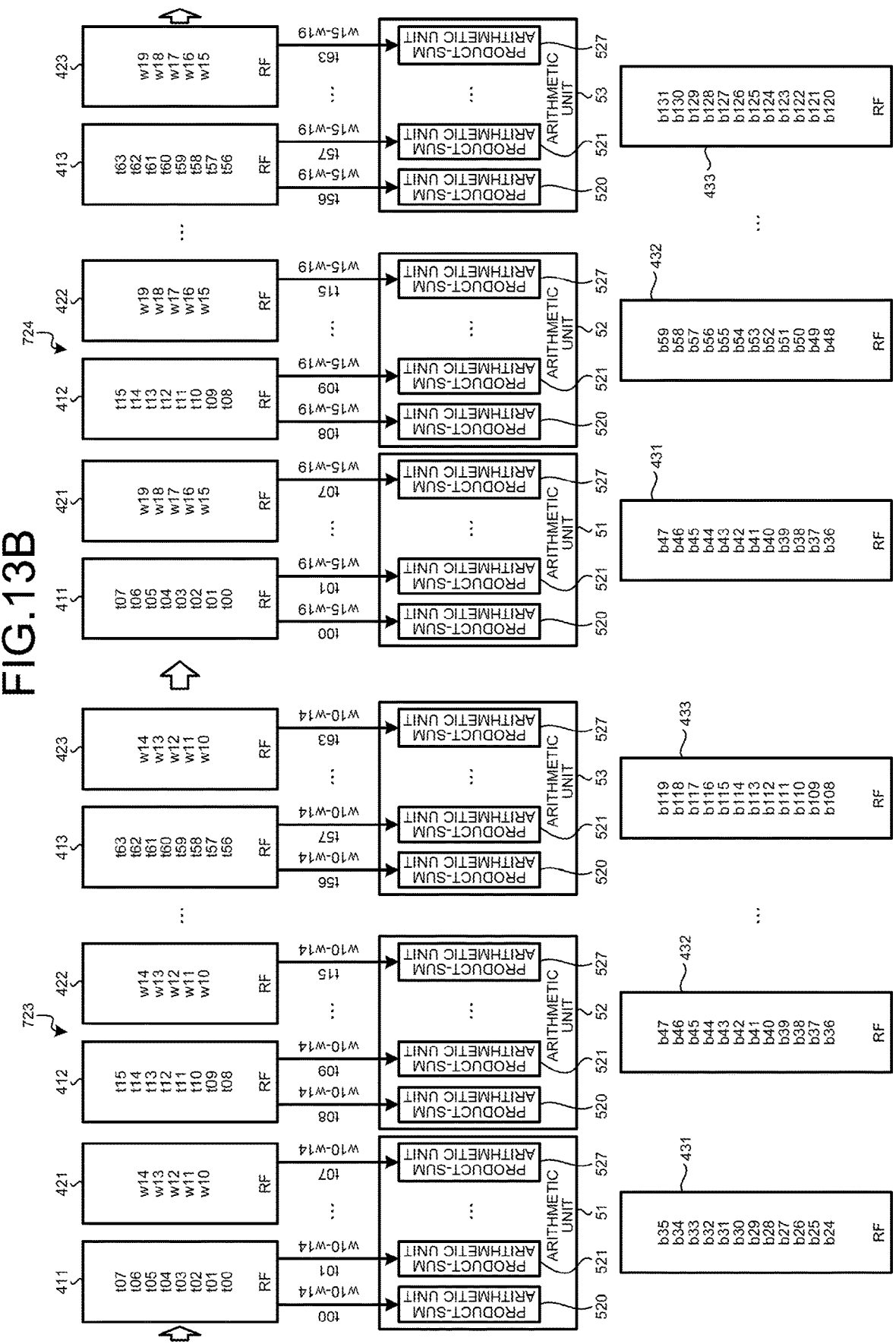
FIG. 13B is a schematic diagram illustrating the transition of element data stored when the number of strides in the convolution backward bottom difference operation is 1.

In the following, the transition of the element data stored in the register files 411 to 413, 421 to 423, and 431 to 433 will be described with reference to FIGS. 13A to 13C, 14A, and 14B. FIGS. 13A to 13C are schematic diagrams each illustrating the transition of the element data stored when the number of strides in the convolution backward bottom difference operation is 1. Furthermore, FIGS. 14A and 14B are schematic diagrams each illustrating the transition of the element data stored when the number of strides in the convolution backward bottom difference operation is 2. Here, a description will be given of a case, as an example, in which the top difference data 203 has eight rows and eight columns and the kernel size is 5.

If the number of strides is 1, the eight product-sum arithmetic units 520 to 527 are used for the operation based on the calculation obtained by multiplying 8 that is the top size by 1 that is the number of strides. Then, first, as indicated by the state 721 illustrated in FIG. 13A, the register file 411 stores therein the element data t00 to t07. Furthermore, the register file 412 stores therein the element data t08 to t15. Furthermore, the register file 413 stores therein the element data t56 to t63. Furthermore, the register files 421 to 423 store therein the element data w00 to w04.

The product-sum arithmetic units 520 to 527 in the arithmetic unit 51 sequentially read each of the pieces of the element data t00 to t07 from the top from the register file 411. Each of the product-sum arithmetic units 520 to 527 in the arithmetic units 52 and 53 also sequentially reads the element data from the associated register files 412 and 413. Furthermore, each of the product-sum arithmetic units 520 to 527 in the arithmetic units 51 to 53 sequentially reads, from the top for each calculation, the element data w00 to w04 from each of the associated register files 421 to 423. Then, each of the product-sum arithmetic units 520 to 526 in the arithmetic units 51 to 53 multiplies both the read element data. Then, each of the product-sum arithmetic units 520 to 527 adds the multiplication results to the calculation results that were obtained in the previous calculation by the product-sum arithmetic units 521 to 527 whose number is incremented by 1. This is the process in which each of the product-sum arithmetic units 520 to 527 sequentially adds the multiplication result to the value held by the register files 320 to 331 whose number is greater than that of the product-sum arithmetic units 520 to 527 by the value corresponding to the number of calculations. Consequently, the arithmetic unit 51 calculates the element data b00 to b11 in the bottom difference data 205 and the arithmetic units 52 and 53 calculate the temporary values of the element data b12 to b23, . . . , and b84 to b95 in the bottom difference data 205.

Then, if the operation in the state 721 has been ended, the process proceeds to the state 722 that is the subsequent calculation state. In this case, the register files 411 to 413 are in the same state as the state 721. Furthermore, in the register files 421 to 423, the element data w05 to w09 with an amount corresponding to a single row subsequent to the row in which the pieces of the element data were stored in the state 721 is stored. Then, similarly to the case in the state 721, each of the product-sum arithmetic units 520 to 527 in the arithmetic units 51 to 53 sequentially reads the element data and multiplies both the pieces of the read element data. Then, the product-sum arithmetic units 520 to 526 add the multiplication results to the calculation results that were obtained in the previous calculation by the product-sum arithmetic units 521 to 527 whose number is incremented by 1. Consequently, the arithmetic units 51 to 53 calculate the temporary values of the element data b12 to b23, b24 to b35, . . . , and b96 to b107 in the bottom difference data 205. Then, the arithmetic units 51 to 53 add the calculation results to the temporary values of the element data b12 to b23, b24 to b35, . . . , and b84 to b95 in the bottom difference data 205 calculated by the adjacent arithmetic units 52 and 53 in calculation in the state 721. However, because the arithmetic unit 53 does not have an adjacent arithmetic unit, the arithmetic unit 53 uses zero as the calculation result of the addition.

In this way, every time the operation is ended, the element data with an amount corresponding to a single row subsequent to the row in which the pieces of the element data were stored in the previous states 721 to 724 illustrated in FIGS. 13A to 13C is stored in the register files 411 to 413 and 421 to 423. Then, each of the product-sum arithmetic units 521 to 527 in the arithmetic units 51 to 53 sequentially reads the element data, performs the product-sum operation by using the read element data, and calculates the temporary values of the bottom difference data 205. Then, the arithmetic units 51 to 53 add the calculated temporary values to the temporary values of the bottom difference data 205 that were calculated by the adjacent arithmetic units 52 and 53 in the immediately previous states 721 to 724 and then store the results in the register files 431 to 433.

The arithmetic units 51 to 53 repeat this operation by the number of kernels. Then, in the states 721 to 725, the arithmetic unit 51 calculates the element data b00 to b11, b12 to b23, . . . , and b48 to b59 in the bottom difference data 205. Furthermore, the arithmetic units 52 and 53 decide the element data b60-b71, . . . , and b132 to b143 in the bottom difference data 205 that is in the state 725.

In this way, at the end of the operation in the states 721 to 724, the arithmetic units 51 to 53 ends the calculation of all of the pieces of the element data b00 to b143 in the bottom difference data 205 and the convolution backward weight difference operation has been completed.

If the number of strides is 2, the number of the product-sum arithmetic units 520 to 535 used for the operation is 16, which is obtained by multiplying 8 that corresponds to the top size by 2 that corresponds to the number of strides. First, as indicated by the state 731 illustrated in FIG. 14A, the element data t00 to t07 is stored in the register file 411. Furthermore, the element data t08 to t15 is stored in the register file 412. Furthermore, the element data t56 to t63 is stored in the register file 413. Furthermore, the element data w00 to w09 with an amount corresponding to the number of strides is stored in the register files 421 to 423.

Each of the product-sum arithmetic units 520, 522, . . . , and 534 in the arithmetic unit 51 sequentially reads the different element data t00 to t07 from the top of the register file 411. Furthermore, similarly, each of the product-sum arithmetic units 521, 523, . . . , and 535 in the arithmetic unit 51 also sequentially reads the different element data t00 to t07 from the top of the register file 411. Then, each of the product-sum arithmetic units 520, 522, . . . , and 534 in the arithmetic unit 51 sequentially reads, for each calculation, the element data w00, w02, and w04 from the register file 421. Furthermore, each of the product-sum arithmetic units 521, 523, . . . , and 535 in the arithmetic unit 51 sequentially reads, for each calculation, the element data w01 and w03 from the register file 421. Then, each of the product-sum arithmetic units 520 to 535 in the arithmetic unit 51 multiplies both the pieces of the read element data. Then, each of the product-sum arithmetic units 520 to 535 adds the multiplication results to the calculation results calculated by the product-sum arithmetic units 521 to 535 whose number is incremented by 2. This is the process in which each of the product-sum arithmetic units 520 to 534 sequentially adds the multiplication results to the value held by the register files 320 to 335, whose number is greater than that of the product-sum arithmetic units 520 to 534, the number of times corresponding to the value obtained by multiplying the number of ended calculations by 2.

Then, the product-sum arithmetic units 520 to 535 in the arithmetic unit 51 hold the value of the top difference data 203. Furthermore, each of the product-sum arithmetic unit 520, 522, . . . , and 534 in the arithmetic unit 51 sequentially reads, for each calculation from the register file 421, the element data w05, w07, and w09 that is present in the subsequent row. Furthermore, each of the product-sum arithmetic units 521, 523, . . . , and 535 in the arithmetic unit 51 reads, for each calculation from the register file 421, the element data w06 and w08 that is present in the subsequent row. Then, each of the product-sum arithmetic units 520 to 534 in the arithmetic unit 51 multiplies both the pieces of the read element data. Then, each of the product-sum arithmetic units 520 to 534 adds the multiplication results to the calculation results calculated by the product-sum arithmetic units 521 to 535 that have the number incremented by 2 and that have calculated in the last calculation.

Then, if the operation in the state 731 has been ended, the process proceeds to the state 732 that is the subsequent calculation state. In this case, the register files 411 to 413 are in the same state as the state 731. Furthermore, in the register files 421 to 423, the element data w10 to w19 with an amount corresponding to two rows subsequent to the row in which the pieces of the element data were stored in the state 731 is stored. Then, similarly to the state 731, each of the product-sum arithmetic units 520 to 535 in the arithmetic units 51 to 53 sequentially reads the element data and multiplies both the pieces of the read element data. Then, each of the product-sum arithmetic units 520 to 535 adds the multiplication result to the calculation result that is calculated by the product-sum arithmetic units 522 to 527 having the number incremented by 2 in the calculation performed last time.

Then, if the operation in the state 732 has been ended, the process proceeds to the state 733 that is illustrated in FIG. 14B and that is the subsequent calculation state. In this case, the register files 411 to 413 are in the same state as the state 732. Furthermore, in the register files 421 to 423, the element data w20 to w29 with an amount corresponding to the two rows subsequent to the row in which the pieces of the element data were stored in the state 732 is stored. Then, similarly to the state 731, each of the product-sum arithmetic units 520 to 535 in the arithmetic units 51 to 53 sequentially reads the element data and multiplies both the pieces of the read element data. Then, each of the product-sum arithmetic units 520 to 535 adds the multiplication result to the calculation result calculated by the product-sum arithmetic units 521 to 535 having the number incremented by 2 in the calculation performed last time.

In this way, every time the operation is ended, the element data with an amount corresponding to a single row subsequent to the row in which the pieces of the element data were stored in the previous states 731 to 732 is stored in the register files 411 to 413. Furthermore, every time the operation is ended, the element data with an amount corresponding to the number of subsequent strides in the row in which the pieces of the element data were stored in the previous states 721 to 724 is stored in the register files 421 to 423. Then, each of the product-sum arithmetic units 521 to 535 in the arithmetic units 51 to 53 sequentially reads the element data, performs the product-sum operation by using the read element data, and calculates the temporary values of the bottom difference data 205. Then, each of the arithmetic units 51 to 53 adds the calculated temporary values to the temporary values of the bottom difference data 205 calculated by the arithmetic units 52 and 53 having the number incremented by 2 in the states 731 to 732 that is the immediately previous state and then stores the results in the register files 431 to 433.

The arithmetic units 51 to 53 calculate the bottom difference data 205 by repeating the operation described above by the number of kernels, thereby the arithmetic units 51 to 53 completes the convolution backward weight difference operation.

Figure 15:
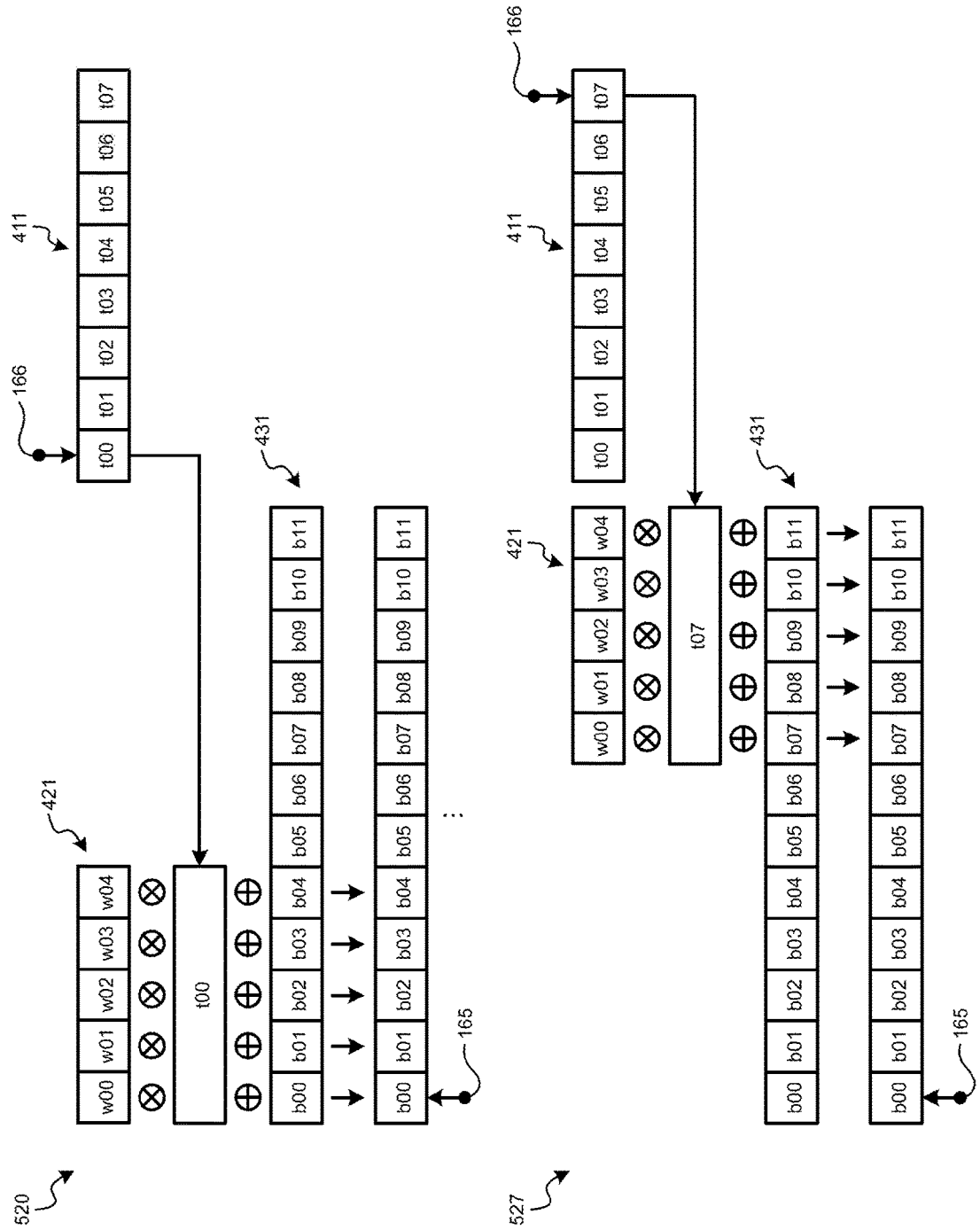
FIG. 15 is a schematic diagram illustrating the arithmetic unit at the time of first row calculation of the convolution backward bottom difference operation performed when the number of strides is 1.
Figure 16:
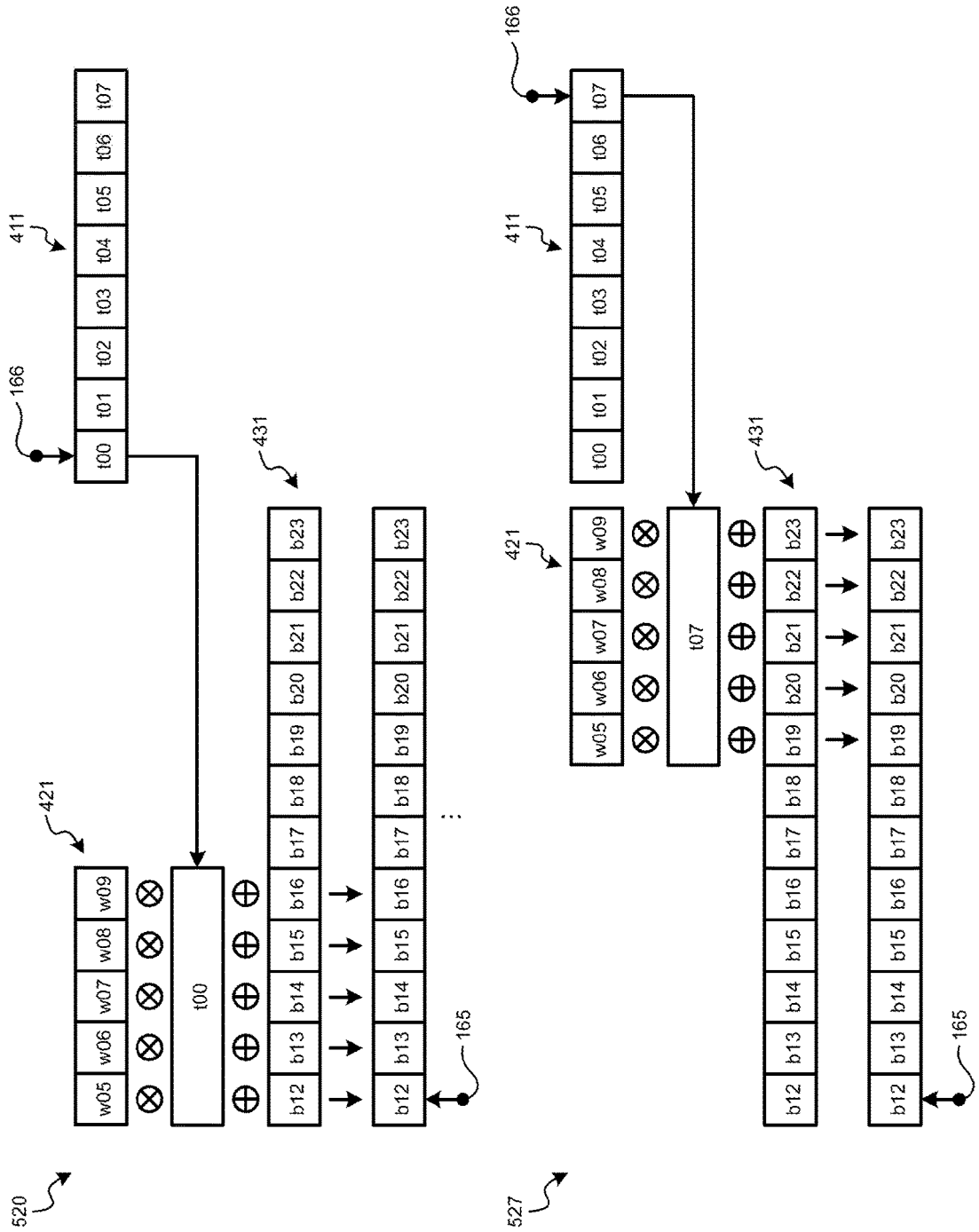
FIG. 16 is a schematic diagram illustrating the arithmetic unit at the time of second row calculation of the convolution backward weight difference operation performed when the number of strides is 1.

In the following, the transition of the element data stored in the register files 410 and 420 will be described with reference to FIGS. 15 and 16. FIG. 15 is a schematic diagram illustrating the arithmetic unit at the time of the first row calculation of the convolution backward bottom difference operation when the number of strides is 1. Furthermore, FIG. 16 is a schematic diagram illustrating the arithmetic unit at the time of the second row calculation of the convolution backward weight difference operation when the number of strides is 1. In this case, also, the top difference data 203 having eight rows and eight columns, the weight data 202 having five rows and five columns, the bottom data 201 having 12 rows and 12 columns are used.

First, if the convolution backward bottom difference product-sum operation is started, the element data t00 to t07 in the top difference data 203 is stored in the register file 411.

Furthermore, the element data w00 to w04 in the weight data 202 is stored in the register file 421.

The pointer control unit 16 sets a pointer 166 in the register file 411 to the first element data t00 that is stored in the register file 411. Then, the pointer control unit 16 moves the pointer 166 by one every time the reading is performed by the product-sum arithmetic units 520 to 527. Furthermore, the pointer control unit 16 firstly sets a top pointer 165 at the position of the element data b00 as the position of the reading and the storing of the data in the register file 431. Thereafter, the pointer control unit 16 moves the top pointer 165 by one every time the calculation performed by the product-sum arithmetic units 520 to 527 is ended.

The product-sum arithmetic unit 520 in the arithmetic unit 51 sequentially acquires the element data w00 to w04 that is present at the position moved forward by one for each calculation from the top of the register file 421. Furthermore, the product-sum arithmetic unit 520 in the arithmetic unit 51 acquires the element data t00 from the position indicated by the pointer 166 in the register file 411. Then, the product-sum arithmetic unit 520 in the arithmetic unit 51 multiplies each of the acquired pieces of the element data w00 to w04 by the element data t00. Then, the product-sum arithmetic unit 520 in the arithmetic unit 51 acquires the values of the element data b00 to b04 that is stored in the bottom difference data 205 at the position indicated by the top pointer 165 that is moved forward by one for each calculation of the register file 431. Here, the initial value of the element data b00 to b11 is zero. Then, the product-sum arithmetic unit 520 in the arithmetic unit 51 sums each of the multiplication results and the values of the element data b00 to b04 acquired from the register file 431 and stores the calculation result in the position indicated by the top pointer 165.

The product-sum arithmetic unit 527 in the arithmetic unit 51 acquires the element data t07 indicated by the pointer 166 in the register file 411. Furthermore, the product-sum arithmetic unit 527 in the arithmetic unit 51 sequentially acquires the element data w00 to w04 for each calculation from the top of the register file 421. Then, the product-sum arithmetic unit 527 in the arithmetic unit 51 multiplies the element data t07 by each of the pieces of the element data w00 to w04. Then, the product-sum arithmetic unit 527 in the arithmetic unit 51 acquires the values of the element data b07 to b11 in the bottom difference data 205 stored at the eighth position from the top pointer 165 that is moved by one for each calculation of the register file 431. Here, the initial value of the element data b07 to b11 is zero. Then, product-sum arithmetic unit 527 in the arithmetic unit 51 sums each of the multiplication results and the values of the element data b07 to b11 acquired from the register file 431 and stores the calculation result in the eighth position from the top pointer 165. Consequently, each of the product-sum arithmetic units 520 to 527 calculates the element data b00 to b11 in the bottom difference data 205.

Then, the pointer control unit 16 moves the top pointer 165 to the top in the row that is present immediately below. Then, the pointer control unit 16 sets the top pointer 165 to the element data b12 stored in the register file 431. Thereafter, every time a single calculation performed by the product-sum arithmetic units 520 to 527 is ended, the pointer control unit 16 moves the pointer by one. Furthermore, the element data t00 to t07 in the top difference data 203 stored in the register file 411 is maintained. Then, the pointer control unit 16 returns the pointer 166 to the position of the element data t00. Furthermore, the element data w05 to w09 that is present in the row subsequent to the row of the weight data 202 is stored in the register file 421. Consequently, the register files 411 to 413 become the state in which the calculation of the second row illustrated in FIG. 16 is to be performed.

Then, the product-sum arithmetic units 520 to 527 in the arithmetic unit 51 use the top pointer 165 and the pointer 166, perform the same operation as that performed on the first row, and calculate the element data b12 to b23 in the bottom difference data 205.

The product-sum arithmetic units 520 to 527 in the arithmetic units 52 and 53 also perform the same calculation as that performed by the arithmetic unit 51 by using the data stored in the register files 412 to 432 and the register files 413 to 433, the top pointer 165, and the pointer 166. Then, the arithmetic units 52 and 53 complete the calculation of the element data b00 to b143 in the bottom difference data 205 by repeating the same calculation as that described above.

Figure 17:
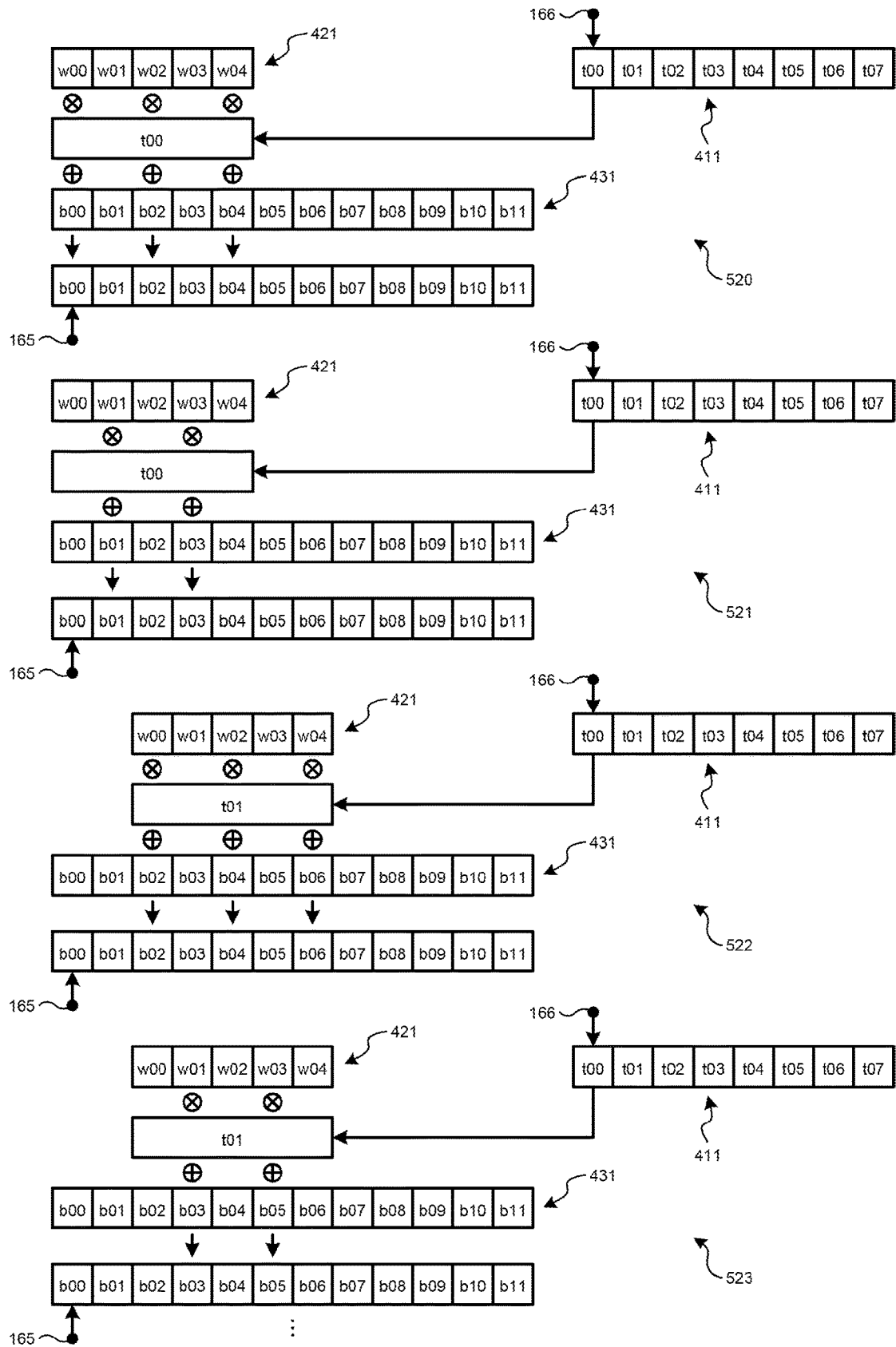
FIG. 17 is a schematic diagram illustrating the arithmetic unit at the time of first row calculation of the convolution backward bottom difference operation performed when the number of strides is 2.

Furthermore, a case in which the number of strides is 2 will be described with reference to FIG. 17. FIG. 17 is a schematic diagram illustrating the arithmetic unit at the time of the first row calculation of the convolution backward bottom difference operation when the number of strides is 2. In this case, also, the top difference data 203 having eight rows and eight columns, the weight data 202 having five rows and five columns, and the bottom data 201 having 12 rows and 12 columns are used.

First, if the convolution backward bottom difference product-sum operation is started, the element data t00 to t03 in the top difference data 203 is stored in the register file 411. Furthermore, the element data w00 to w04 in the weight data 202 is stored in the register file 421.

The pointer control unit 16 sets the pointer 166 in the register file 411 to the first element data t00 stored in the register file 411. Thereafter, the pointer control unit 16 moves the pointer 166 by one every time the reading is performed by the product-sum arithmetic units 520 and 521, 522 and 523, 524 and 525, and 526 and 527. Furthermore, first, the pointer control unit 16 sets the top pointer 165 to the position of the element data b00 as the position of the reading and the storing of the data performed by the register file 431. Then, the pointer control unit 16 moves the top pointer 165 by 2, which is the number of strides, for each end of the calculation performed by the product-sum arithmetic units 520 to 527.

The product-sum arithmetic unit 520 in the arithmetic unit 51 sequentially acquires the element data w00, w02, and w04 that is present at the position moved forward by two for each calculation from the top of the register file 421. Furthermore, the product-sum arithmetic unit 520 in the arithmetic unit 51 acquires the element data t00 indicated by the pointer 166 in the register file 411. Then, the product-sum arithmetic unit 520 in the arithmetic unit 51 multiplies each of the acquired pieces of the element data w00, w02, and w04 by the element data t00. Then, the product-sum arithmetic unit 520 in the arithmetic unit 51 sequentially acquires the values of the element data b00, b02, and b04 in the bottom difference data 205 stored in the position indicated by the top pointer 165 that is moved forward by two for each calculation performed by the register file 431. Here, the initial value of the element data b00 to b11 is zero. Then, the product-sum arithmetic unit 520 in the arithmetic unit 51 sums each of the multiplication results and the values of the element data b00, b02, and b04 acquired from the register file 431 and stores the calculation results in the associated positions indicated by the top pointer 165.

The product-sum arithmetic unit 521 in the arithmetic unit 51 acquires the element data t00 indicated by the pointer 166 in the register file 411. Furthermore, the product-sum arithmetic unit 521 in the arithmetic unit 51 sequentially acquires the element data w01 and w03 that is present at the position moved forward by two from the data subsequent to the top of the register file 421. Then, the product-sum arithmetic unit 521 in the arithmetic unit 51 multiplies the element data t00 by each of the pieces of the element data w01 and w03. Then, the product-sum arithmetic unit 521 in the arithmetic unit 51 sequentially acquires the values of the element data b01 and b03 in the bottom difference data 205 stored in the position subsequent to the top pointer 165 that is moved forward by two for each calculation of the register file 431. Then, the product-sum arithmetic unit 521 in the arithmetic unit 51 sums each of the multiplication results and the values of the element data b01 and b03 acquired from the register file 431 and stores the calculation results in the position subsequent to the top pointer 165.

Then, the pointer control unit 16 moves the pointer 166 in the register file 411 forward by one. Consequently, the pointer 166 is moved to the position indicating the element data t01.

The product-sum arithmetic unit 522 in the arithmetic unit 51 sequentially acquires the element data w00, w02, and w04 that is present at the position moved forward by two for each calculation from the top of the register file 421. Furthermore, the product-sum arithmetic unit 522 in the arithmetic unit 51 acquires the element data t01 indicated by the pointer 166 in the register file 411. Then, the product-sum arithmetic unit 522 in the arithmetic unit 51 multiplies the element data t00 by each of the acquired pieces of the element data w00, w02, and w04. Then, the product-sum arithmetic unit 522 in the arithmetic unit 51 sequentially acquires the values of each of the pieces of the element data b02, b04, and b06 that are stored in the bottom difference data 205 at the position moved by two, which is the number of strides, from the position indicated by the top pointer 165 that is moved by two for each calculation of the register file 431. Then, the product-sum arithmetic unit 522 in the arithmetic unit 51 sums each of the multiplication results and the values of the element data b02, b04, and b06 acquired from the register file 431 and stores the calculation results in the position indicated by the top pointer 165.

The product-sum arithmetic unit 523 in the arithmetic unit 51 acquires the element data t01 indicated by the pointer 166 in the register file 411. Furthermore, the product-sum arithmetic unit 523 in the arithmetic unit 51 sequentially acquires the element data w01 and w03 that is present at the position moved forward by two from the data subsequent to the top of the register file 421. Then, the product-sum arithmetic unit 521 in the arithmetic unit 51 multiplies the element data t01 by each of the pieces of the element data w01 and w03. Then, the product-sum arithmetic unit 521 in the arithmetic unit 51 acquires the values of the element data b03 and b05 in the bottom difference data 205 stored at the position adjacent by two from the adjacent position of the top pointer 165 that is moved forward by two for each calculation of the register file 431. Then, the product-sum arithmetic unit 521 in the arithmetic unit 51 sums each of the multiplication results and the values of the element data b03 and b05 acquired from the register file 431 and stores the calculation result in the position adjacent by two from the adjacent position of the top pointer 165.

The product-sum arithmetic units 524 to 527 in the arithmetic unit 51 also perform the same operation by using the pointer 166 and the top pointer 165 and calculate the element data b07 to b11 in the bottom difference data 205.

Figure 18:
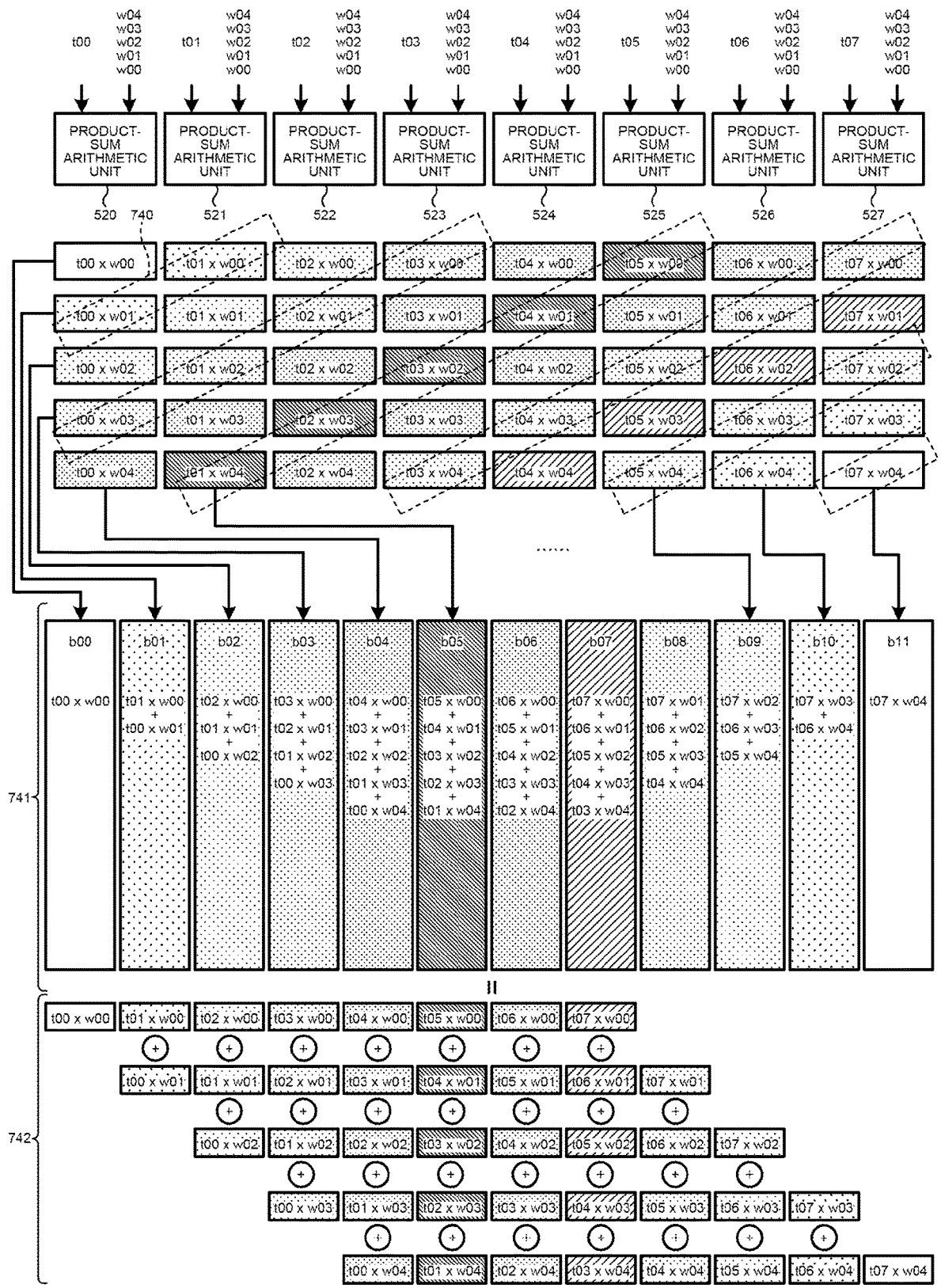
FIG. 18 is a schematic diagram illustrating the concept of the convolution backward bottom difference operation performed when the number of strides is 1.
Figure 19:
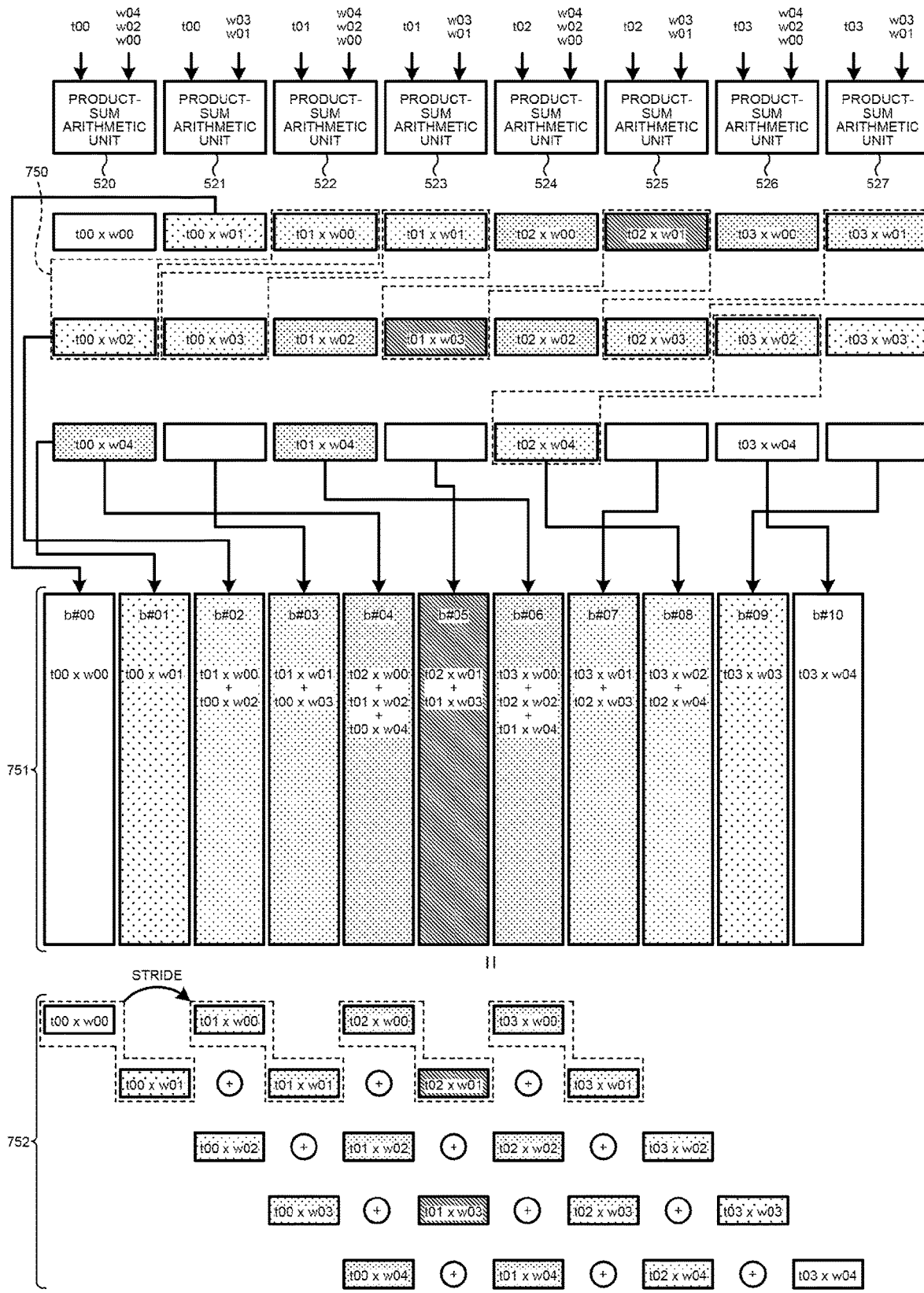
FIG. 19 is a schematic diagram illustrating the concept of the convolution backward bottom difference operation performed when the number of strides is 2.

Furthermore, the concept of the convolution backward bottom difference operation according to the embodiment will be described with reference to FIGS. 18 and 19. FIG. 18 is a schematic diagram illustrating the concept of the convolution backward bottom difference operation when the number of strides is 1. FIG. 19 is a schematic diagram illustrating the concept of the convolution backward bottom difference operation when the number of strides is 2.

In each of the product-sum arithmetic units 520 to 527, the data illustrated in the upper portion is input. Then, each of the product-sum arithmetic units 520 to 527 performs the multiplication illustrated in the lower portion. Then, each of the product-sum arithmetic units 520 to 527 sequentially adds the multiplication results to the element data b00 to b11 connected by the arrows.

If the number of strides is 1, for example, the product-sum arithmetic unit 520 sequentially performs the multiplication of t00×w00, t00×w01, t00×w02, t00×w03, and t00×w04. Then, the product-sum arithmetic unit 520 sequentially adds t00×w00 to the element data b00. Furthermore, the product-sum arithmetic unit 520 sequentially adds t00×w01 to the element data b01. Furthermore, the product-sum arithmetic unit 520 sequentially adds t00×w02 to the element data b02. Furthermore, the product-sum arithmetic unit 520 sequentially adds t00×w03 to the element data b03. Furthermore, the product-sum arithmetic unit 520 sequentially adds t00×w04 to the element data b04.

By performing the operation in this way, as indicated by dashed line frames 740, the multiplication results are added in an oblique direction. Consequently, as indicated by an operation result 741, the number of multiplication results to be added up to each of the pieces of the element data b00 to b05 is increased and then decreased in the direction toward b11. Namely, the element data b00 to b05 matches, as indicated by an operation result 742, the result obtained by sequentially adding the multiplication results of the element data w00 to w04 to the element data t00 to t07 by shifting the element data by one.

If the number of strides is 2, as illustrated in FIG. 19, each of the product-sum arithmetic units 520, 522, 524, and 526 acquires the element data t00 to t03 and sequentially multiplies the acquired element data t00 to t03 by the element data w02 and w04 that is every other element data from the element data w0. Furthermore, each of the product-sum arithmetic units 521, 523, 525, and 527 acquires the element data t00 to t03 and sequentially multiplies the acquired element data t00 to t03 by the element data w01 and w03 that is every other element data from the element data w01.

Namely, if the number of strides is 2, as indicated by dashed line frames 750, the multiplication results are added to at an interval of every other element data in an oblique direction. Consequently, as indicated by an operation result 751, the number of multiplication results to be added up to each of the pieces of the element data b00 to b05 is increased at an interval of every other element data and then decreased at an interval of every other element data in the direction toward b11. Namely, the element data b00 to b05 matches, as indicated by an operation result 752, the result obtained by sequentially adding the multiplication results obtained by shifting the element data w00 to w04 by an amount corresponding to the number of slides to the element data t00 to t07 by shifting one by one.

Figure 20:
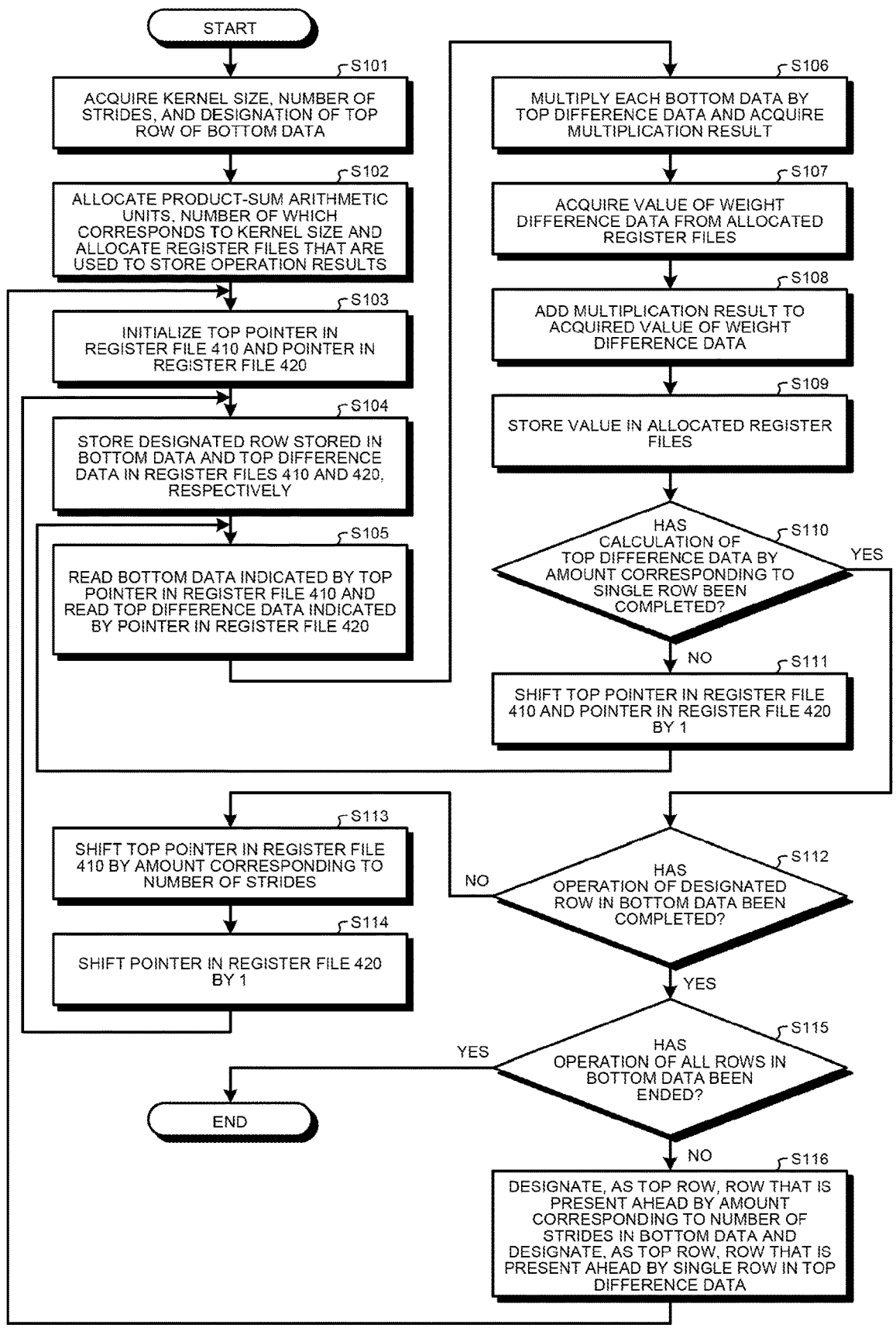
FIG. 20 is a flowchart illustrating the flow of the convolution backward weight difference operation.

In the following, the flow of the convolution backward weight difference operation process will be described in detail with reference to FIG. 20. FIG. 20 is a flowchart illustrating the flow of the convolution backward weight difference operation.

For example, when a description will be given by using the reference numerals illustrated in FIGS. 3 and 4, the first data control unit 12, the second data control unit 13, the arithmetic unit 50, and the pointer control unit 16 acquires the kernel size (or, the number of kernels), the number of strides, and the designation of the top row of the bottom data 201 (Step S101).

The number of computing units corresponding to the kernel size is allocated to the arithmetic unit 50 as the computing units to be used. Furthermore, each of the arithmetic units 50 allocates the product-sum arithmetic units 501 to 503, the number of which corresponds to the kernel size. Furthermore, the register file 430 allocates the register files 301 to 303, the number of which corresponds to the kernel size as the register files that are used to store the operation results (Step S102).

The pointer control unit 16 initializes the top pointer 163 in the register file 410 and the pointer in the register file 420 (Step S103).

The first data control unit 12 reads the element data that is stored in the bottom data 201 and that is present at the designated top row from the memory 11 and stores the read element data in the register file 410. Furthermore, the second data control unit 13 reads the element data that is stored in the top difference data 203 and that is present at the designated top row from the memory 11 and stores the read element data in the register file 420 (Step S104).

The product-sum arithmetic units 501 to 503 in the arithmetic unit 50 sequentially read the element data in the bottom data 201 one by one from the top pointer 163 in the register file 410. Furthermore, the product-sum arithmetic units 501 to 503 in the arithmetic unit 50 read a single piece of the element data that is stored in the top difference data 203 and that is indicated by the pointer in the register file 420 (Step S105).

Then, each of the product-sum arithmetic units 501 to 503 in the arithmetic unit 50 multiplies the top difference data 203 by the read element data in the bottom data 201 and acquires the multiplication result (Step S106).

Then, each of the product-sum arithmetic units 501 to 503 in the arithmetic unit 50 acquires the value of the weight difference data 204 from the allocated register files 301 to 303 in the register file 430 (Step S107).

Then, each of the product-sum arithmetic units 501 to 503 in the arithmetic unit 50 adds the multiplication result to the acquired weight difference data 204 (Step S108).

Then, each of the product-sum arithmetic units 501 to 503 in the arithmetic unit 50 again stores the addition result in the allocated register files 301 to 303 in the register file 430 and updates the result (Step S109).

Then, the arithmetic unit 50 determines whether the calculation of the top difference data 203 by an amount corresponding to a single row has been completed (Step S110). If the calculation of the top difference data 203 by an amount corresponding to a single row has not been completed (No at Step S110), the pointer control unit 16 shifts the top pointer 163 in the register file 410 and the pointer in the register file 420 by one (Step S111) and returns to Step S105.

In contrast, if the calculation of the top difference data 203 by an amount corresponding to a single row has been completed (Yes at Step S110), the arithmetic unit 50 determines whether the operation with respect to the designated row in the bottom data 201 has been completed (Step S112).

If the operation with respect to the designated row in the bottom data 201 has not been completed (No at Step S112), the pointer control unit 16 shifts the top pointer 163 in the register file 410 by an amount corresponding to the number of strides (Step S113).

Furthermore, the pointer control unit 16 shifts the pointer in the register file 420 by one (Step S114). Then, the process returns to Step S104.

In contrast, if the operation with respect to the designated row in the bottom data 201 has been completed (Yes at Step S112), the arithmetic unit 50 determines whether the operation of all of the rows in the bottom data 201 has been ended (Step S115).

If there is a row in which no operation is performed (No at Step S115), the arithmetic unit 50 notifies the first data control unit 12 and the second data control unit 13 the completion of the row portion operation. The first data control unit 12 designates, as the top row, the row that is present ahead by an amount corresponding to the number of strides from the current top row in the bottom data 201. Furthermore, the second data control unit 13 designates, as the top row, the row that is present ahead by a single row from the current top row in the top difference data 203 (Step S116). Then, the arithmetic unit 50 returns to Step S103.

In contrast, if the operation of all of the rows in the bottom data 201 has been ended (Yes at Step S115), the arithmetic unit 50 ends the convolution backward weight difference operation process.

Figure 21:
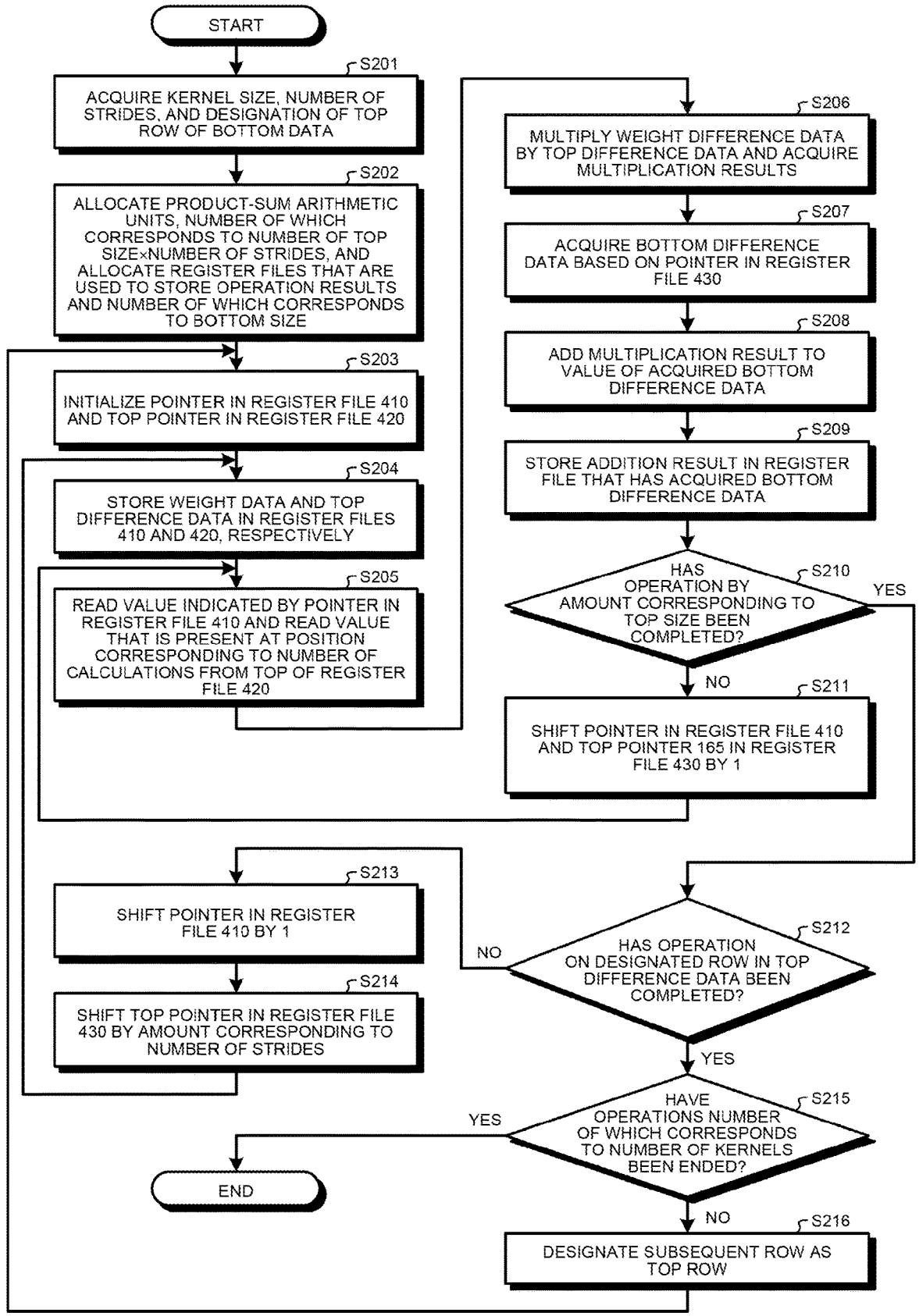
FIG. 21 is a flowchart illustrating the flow of the convolution backward bottom difference operation.

In the following, the convolution backward bottom difference operation process will be described in detail with reference to FIG. 21. FIG. 21 is a flowchart illustrating the flow of the convolution backward bottom difference operation.

For example, when a description will be given by using the reference numerals illustrated in FIGS. 4 and 5, the first data control unit 12, the second data control unit 13, the arithmetic unit 50, and the pointer control unit 16 acquire the kernel size (or, the number of kernels), the number of strides, and the designation of the top row of the bottom data 201 (Step S201).

The arithmetic unit 50 allocates, to the operation, the product-sum arithmetic units 501 to 503, the number of which corresponds to the number obtained by multiplying the number of strides by the top size that is the number of columns in the top difference data 203. Furthermore, the register file 430 allocates, to the operation, the register files 301 to 303, which are used to store the operation results and the number of which corresponds to the bottom size that is the number of columns in the bottom data 201 (Step S202).

The pointer control unit 16 initializes the pointer 166 in the register file 410 and the top pointer 165 in the register file 430 (Step S203).

The first data control unit 12 reads, from the memory 11, the element data that is stored in the top difference data 203 and that is present at the designated top row and then stores the read element data in the register file 410. Furthermore, the second data control unit 13 reads, from the designated top row from the memory 11, the element data with an amount corresponding to the number of strides in the weight data 202 and then stores the read element data in the register file 420 (Step S204).

Each of the product-sum arithmetic units 501 to 503 in the arithmetic unit 50 reads the element data in the top difference data 203 indicated by the pointer 166 in the register file 410. Furthermore, each of the product-sum arithmetic units 501 to 503 in the arithmetic unit 50 reads the element data that is stored in the weight difference data 204 and that is present at the position corresponding to the number of calculations from the top of the register file 420 (Step S205).

Then, each of the product-sum arithmetic units 501 to 503 in the arithmetic unit 50 multiplies the read top difference data 203 by the read element data in the weight difference data 204 and acquires the multiplication result (Step S206).

Then, each of the product-sum arithmetic units 501 to 503 in the arithmetic unit 50 acquires the value of the element data in the bottom difference data 205 at the position that is moved forward by an amount corresponding to the own number from the position indicated by the top pointer 165 in the register file 430 (Step S207). Here, the own number mentioned here indicates the number to which consecutive numbers are sequentially allocated to the product-sum arithmetic units 501 to 503 starting from 1.

Then, each of the product-sum arithmetic units 501 to 503 in the arithmetic unit 50 adds the multiplication result to the acquired bottom difference data 205 (Step S208).

Then, each of the product-sum arithmetic units 501 to 503 in the arithmetic unit 50 performs an update by storing the addition result in the register files 301 to 303 that have acquired the bottom difference data 205 (Step S209).

Then, the arithmetic unit 50 determines whether the operation by an amount corresponding to the top size has been completed (Step S210). If the operation by an amount corresponding to the top size has not been completed (No at Step S210), the pointer control unit 16 shifts the pointer 166 in the register file 410 and the top pointer 165 in the register file 430 by 1 (Step S211) and returns to Step S205.

In contrast, if the operation by an amount corresponding to the top size has been completed (Yes at Step S210), the arithmetic unit 50 determines whether the operation with respect to the designated row in the top difference data 203 has been completed (Step S212).

If the operation with respect to the designated row in the top difference data 203 has not been completed (No at Step S212), the pointer control unit 16 shifts the pointer 166 in the register file 410 by one (Step S213).

Furthermore, the pointer control unit 16 shifts the top pointer 165 in the register file 430 by an amount corresponding to the number of strides (Step S214). Then, the process returns to Step S204.

In contrast, if the operation with respect to the designated row in the top difference data 203 has been completed (Yes at Step S212), the arithmetic unit 50 determines whether the operation by an amount corresponding to the number of kernels has been ended (Step S215).

If the operation by an amount corresponding to the number of kernels has not been ended (No at Step S215), the arithmetic unit 50 notifies the first data control unit 12 and the second data control unit 13 of the completion of the row portion operation. The first data control unit 12 designates the row subsequent to the current top row in the bottom data 201 as the top row. Furthermore, the second data control unit 13 designates the row subsequent to the current top row in the top difference data 203 as the top row (Step S216). Then, the arithmetic unit 50 returns to Step S203.

In contrast, if the operation by an amount corresponding to the number of kernels has been ended (Yes at Step S215), the arithmetic unit 50 ends the convolution backward bottom difference operation process.

As described above, the arithmetic processing device according to the embodiment collectively performs an operation for each single row of the pieces of data that are arranged in a matrix used for the operation and performs, by using the operation results, an operation on both the pieces of data arranged in the matrix. In this case, because each of the arithmetic units performs the operation of a different row, the same data is not simultaneously used. Furthermore, in a case of the convolution backward weight difference operation, each of the product-sum arithmetic units arranged in each of the arithmetic units reads different bottom data and all of the product-sum arithmetic units read the same top data. Furthermore, in a case of the convolution backward bottom difference operation, each of the product-sum arithmetic units arranged in each of the arithmetic units reads different top difference data and all of the product-sum arithmetic units read the same weight data. Consequently, it is possible to suppress the number of times reading of the data, reduce the occurrence of conflict of the reading, and efficiently perform a backward operation. Accordingly, it is possible to speed up the arithmetic operation process while suppressing an increase in cost.

Figure 22:
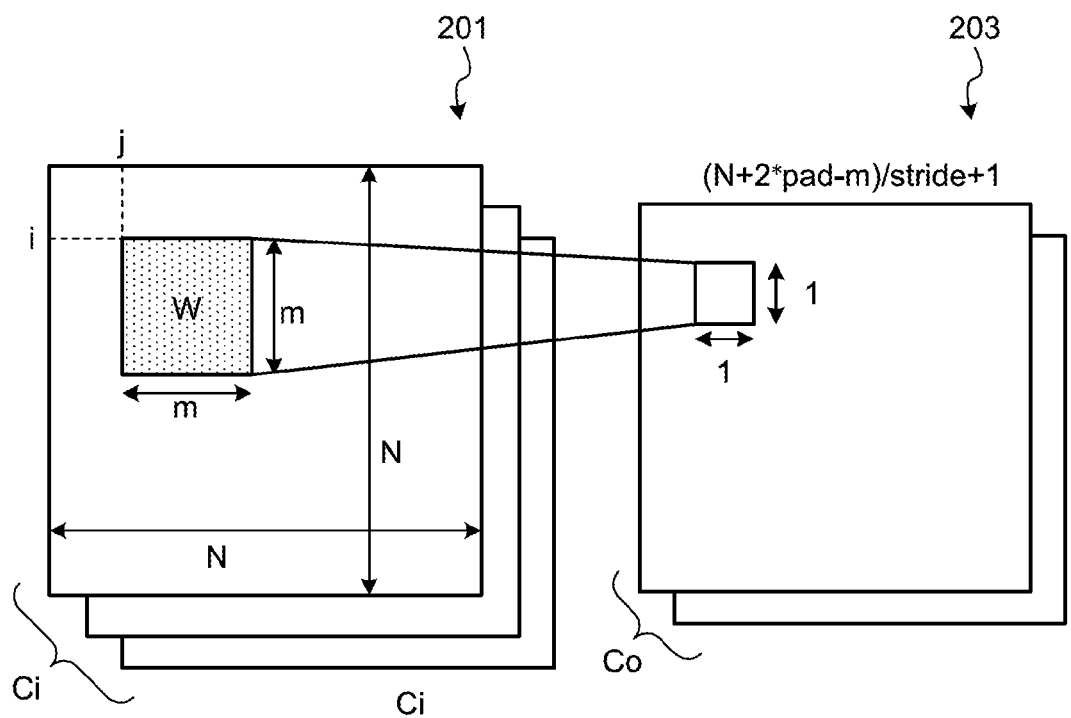
FIG. 22 is a schematic diagram illustrating designation of bottom data and top data performed by a plurality of arithmetic units.

FIG. 22 is a schematic diagram illustrating the designation of bottom data and top data performed by a plurality of arithmetic units. In the following, a description will be given of a method of designating the bottom data 201 and the top difference data 203 performed by the plurality of the arithmetic units 50.

For example, in image data with a size of N×N having N pixels that are vertically and horizontally arranged, the arithmetic unit 50 obtains a coordinate point (i, j) at the destination of the movement based on the designated row from the upper left of the image data and the designated number of strides. Then, the arithmetic unit 50 reads the bottom data 201 as the rectangular area that is defined based on the subject coordinate point and the designated kernel size m. The arithmetic unit 50 performs the convolution operation based on the read bottom data 201, adjusts the data to the size of 1×1, and stores the bottom data 201. Consequently, the size (hereinafter, referred to as a top size) of the top difference data 203 that corresponds to the operation result thereof is adjusted to the size of (N+2*pad−m)/number of strides+1 by using the previously set number of pads. Furthermore, if there is a plurality of pieces of the bottom data 201 or the top difference data 203, in order to consecutively perform the operation of all of the pieces of data, the arithmetic unit 50 also performs the operation by designating Ci that is the number of sheets of the bottom data 201 that uses the subject amount of data or by designating Co that is the number of pieces of the calculated top difference data 203.

Figure 23:
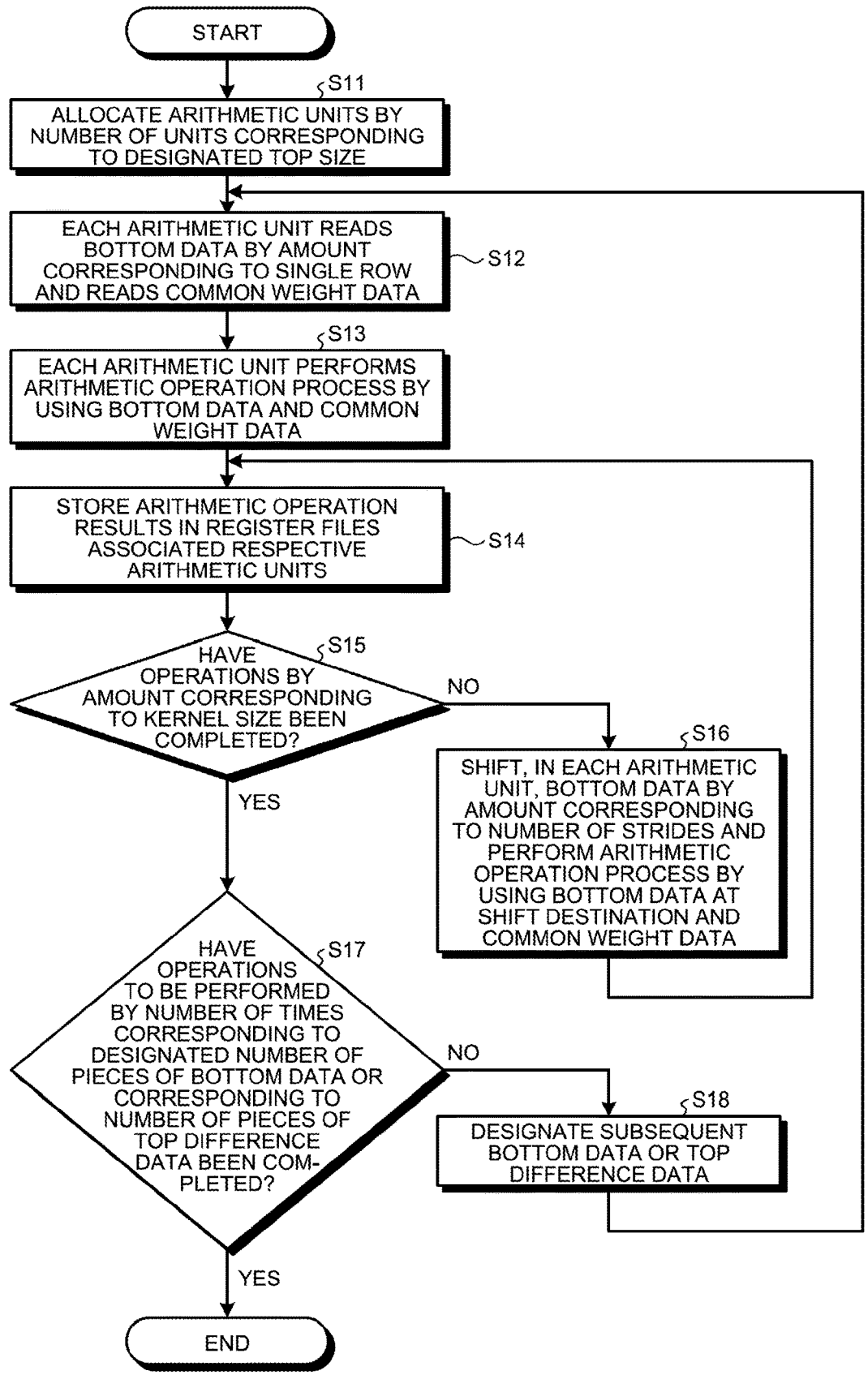
FIG. 23 is a flowchart illustrating the flow of the overall convolution operation performed when a plurality of arithmetic units is used.

FIG. 23 is a flowchart illustrating the flow of the overall convolution operation when the plurality of arithmetic units is used. First, for the arithmetic unit 50, an amount corresponding to the top size designated in FIG. 23, for example, an amount corresponding to (N+2*pad−m)/number of strides+1 is allocated to be used in the operation (Step S11).

The arithmetic operation process performed by the single arithmetic unit 50 is the same as that described in the embodiment. Each of the arithmetic units 50 reads the bottom data 201 in units of rows and the common weight data 202 (Step S12). For example, in a case where the top size is 8 and the number of strides is 1, b00 to b11 are read in the first arithmetic unit 50, b12 to b23 are read in the subsequent arithmetic unit 50, and b84 to b95 are read in the eighth and the last arithmetic unit 50. In this way, the pieces of the bottom data 201 are read per row in each of the arithmetic units 50 per row. Furthermore, if the number of strides is equal to or greater than 2, regarding the bottom data 201 given to each of the arithmetic units 50, an amount corresponding to the number of rows designated by the number of strides is prepared. The weight data is added by an amount corresponding to a single row at a time and is given as the data common to all of the arithmetic units 50.

Then, by using the bottom data 201 and the common weight data 202 with an amount corresponding to a single row, each of the arithmetic units 50 performs the arithmetic operation process (Step S13). Then, each of the arithmetic units 50 stores the result of the subject arithmetic operation process in the associated register files 430 (Step S14).

Then, the arithmetic unit 50 determines whether the operation with an amount corresponding to the kernel size has been ended (Step S15). If the operation with an amount corresponding to the kernel size has not been ended (No at Step S15), the arithmetic unit 50 shifts the row in the bottom data 201 by an amount corresponding to the number of slides. Then, the arithmetic unit 50 performs the arithmetic operation process by using the element data in the bottom data 201 at the destination and by using the weight data 202 common to each other (Step S16) and returns to Step S14. For example, b12 to b23 are added to the first arithmetic unit 5, b24 to b35 are added to the subsequent arithmetic unit 50, and b96 to b107 are added to the eighth and the last arithmetic unit 50. Namely, in each of the arithmetic units 50, the bottom data 201 is read in units of rows. The arithmetic unit 50 reads the element data in the subsequent row in the weight data 202, similarly performs the arithmetic operation process, adds the result of the subject arithmetic operation process to the operation result obtained the last time (first time in a case of the second operation) regarding the second and the subsequent operation, and stores the addition result. For example, if the number of kernels is five, by performing the calculation five times, the arithmetic unit 50 completes the operation performed on the value of the top difference data 203 and acquires the subject operation result. Furthermore, in particular, regarding Steps S11 to S16 corresponding to the arithmetic operation process performed by each of the arithmetic units 50, the flow of the process in a case of the convolution backward weight difference operation is the same as that illustrated in FIG. 20 and the flow of the process in a case of the convolution backward bottom difference operation is the same as that illustrated in FIG. 21.

Furthermore, if there is a plurality of sheets of Ci of the bottom data 201, the arithmetic unit 50 determines whether the operations to be performed by the number of times corresponding to the designated number of pieces of the bottom data 201 or the operations to be performed by the number of times corresponding to the number of sheets of the top difference data 203 have been completed (Step S17).

If the operations on the designated number of pieces of the bottom data 201 or the number of pieces of the top difference data 203 have not been completed (No at Step S17), the arithmetic unit 50 designates the subsequent bottom data 201 or the top difference data 203 (Step S18). Then, the process returns to Step S12.

In contrast, if the operations on the designated number of pieces of the bottom data 201 or the number of pieces of the top difference data 203 have been completed (Yes at Step S17), the arithmetic unit 50 ends the arithmetic operation process. For example, if the Ci is 20, by repeating the same calculation 20 times, the arithmetic unit 50 similarly completes the calculation performed on the value of the top difference data 203 and can acquire the operation results.

Figure 24:
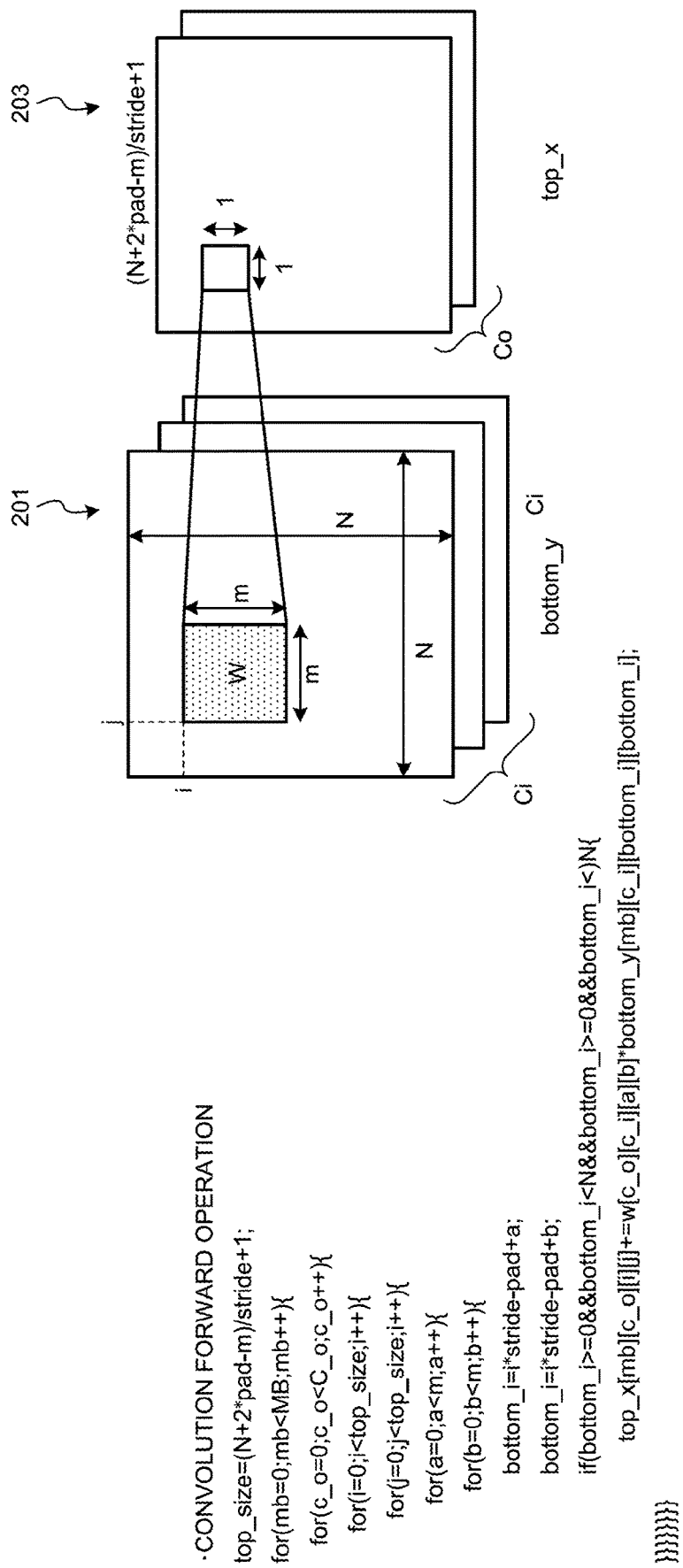
FIG. 24 is a schematic diagram illustrating a description example of a program of the convolution forward operation performed by using a plurality of the arithmetic units.

FIG. 24 is a schematic diagram illustrating a description example of a program of the convolution forward operation performed by using the plurality of the arithmetic units. In the convolution forward operation, as illustrated in FIG. 24, the operation performed by using the bottom data 201 (bottom_y) and the top difference data 203 (top_x) can be represented by the multiplication and the addition. The convolution forward operation is performed by designating the number of pieces of data Ci in the bottom data 201, the number of pieces of data Co in the top difference data 203, the number of batches mb, the number of strides W, and the number of pads of pad that corresponds to the parameter for adjusting the top size. Here, the adjustment of the top size corresponds to the padding to the top size.

Figure 25:
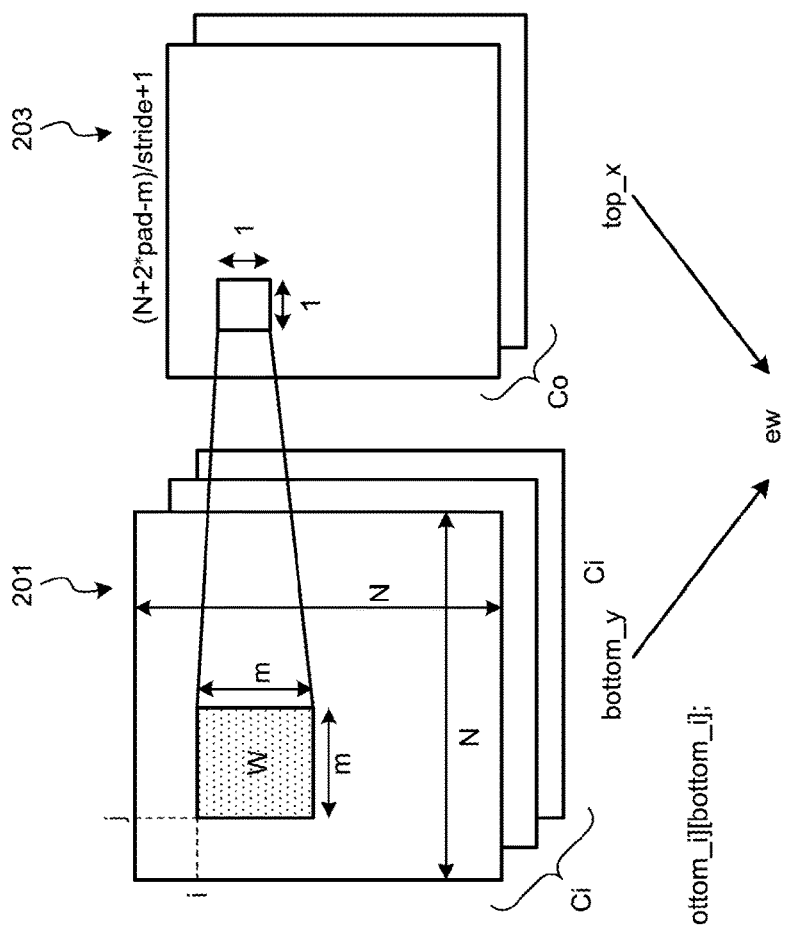
FIG. 25 is a schematic diagram illustrating a description example of a program of a convolution backward weight difference operation in a case of using the plurality of the arithmetic units.

FIG. 25 is a schematic diagram illustrating a description example of a program of the convolution backward weight difference operation in a case of using the plurality of the arithmetic units. In the convolution backward weight difference operation, as illustrated in FIG. 25, the operation performed by using the bottom data 201 (bottom_y) and the top difference data 203 (top_x) can be represented by the multiplication and the addition. In this case, the weight difference data (ew) is calculated. The convolution backward weight difference operation is performed by designating the number of pieces of data Ci in the bottom data 201, the number of pieces of data Co in the top difference data 203, the number of batches mb, the number of strides W, and the number of pads of pad that corresponds to the parameter for adjusting the top size. Here, the adjustment of the top size corresponds to the padding to the top size.

Figure 26:
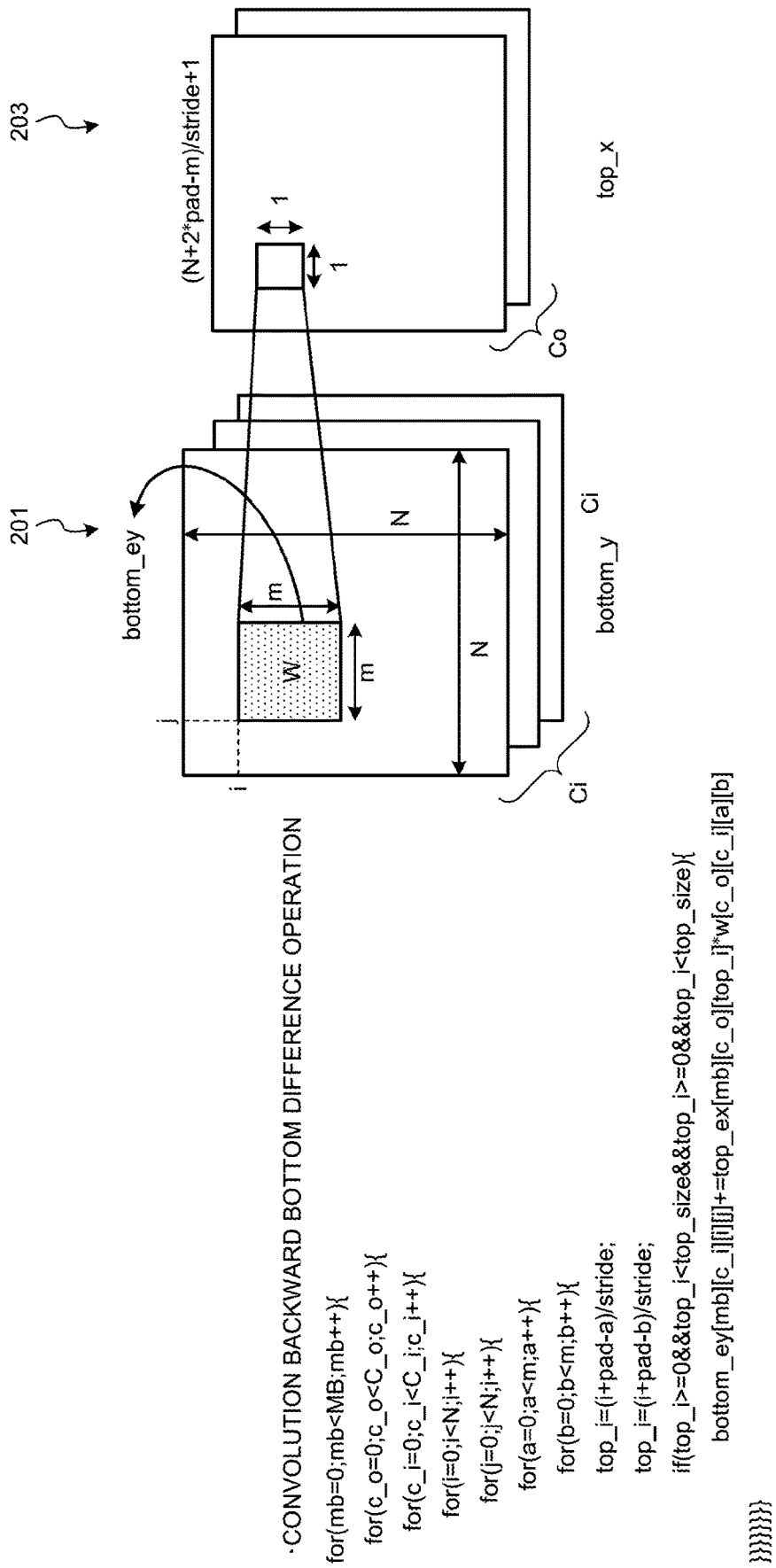
FIG. 26 is a schematic diagram illustrating a description example of a program of the convolution backward bottom difference operation in a case of using the plurality of the arithmetic units.

FIG. 26 is a schematic diagram illustrating a description example of a program of the convolution backward bottom difference operation in a case of using the plurality of the arithmetic units. In the convolution backward bottom difference operation, as illustrated in FIG. 26, the operation performed by using the bottom data 201 (bottom_y) and the top difference data 203 (top_x) can be represented by the multiplication and the addition. In this case, the bottom difference data 205 (bottom_ey) is calculated. The convolution backward bottom difference operation is performed by designating the number of pieces of data Ci in the bottom data 201, the number of pieces of data Co in the top difference data 203, the number of batches mb, the number of strides W, and the number of pads represented by pad corresponding to the parameter that is used to adjust the top size. Here, the adjustment of the top size corresponds to the padding to the top size.

Hardware Configuration

Figure 27:
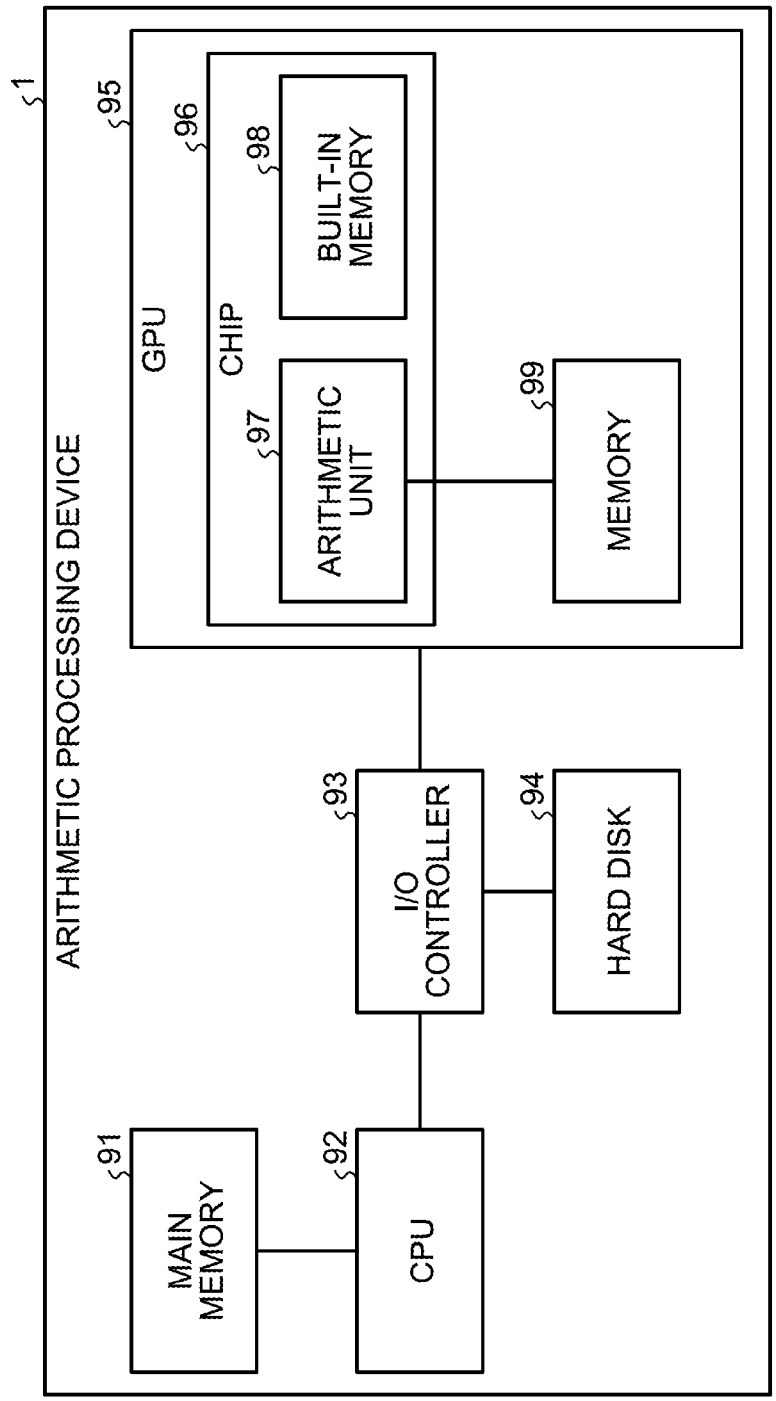
FIG. 27 is a block diagram illustrating the hardware configuration of the arithmetic processing device.

FIG. 27 is a block diagram illustrating the hardware configuration of the arithmetic processing device. As illustrated in FIG. 27, the arithmetic processing device 1 includes a main memory 91, a central processing unit (CPU) 92, an input/output (I/O) controller 93, a hard disk 94, and a GPU 95. Furthermore, the GPU 95 includes a chip 96 and a memory 99. Furthermore, and a built-in memory 98 are mounted on the chip 96.

As an example, in the CPU 92, software that manages a neural network is operated and the bottom data 201 and the weight data 202 used by the software are stored in the main memory 91. Then, the software that manages the neural network requests the GPU 95 to perform the operation. At this time, in order to perform the operation by using the resources on the GPU 95, the bottom data 201 and the weight data 202 are moved to the memory 99.

An arithmetic unit 97 implements the function of the arithmetic units 50. Furthermore, the memory 99 implements the function of the memory 11. Then, the built-in memory 98 implements the function of the register files 410, 420, and 430. In this case, the arithmetic unit 97 implements the function of the first data control unit 12, the second data control unit 13, and the pointer control unit 16. For example, the memory 99 stores therein various kinds of programs including the programs for implementing the function of the arithmetic units 50, the first data control unit 12, the second data control unit 13, and the pointer control unit 16. Then, by reading various kinds of programs from the memory 99 and executing the programs, the arithmetic unit 97 can implement the function of the arithmetic units 50, the first data control unit 12, the second data control unit 13, and the pointer control unit 16. In this way, each of the functions described in the embodiment above can be implemented by the GPU 95.

Furthermore, as another example, the software that manages the neural network running on the CPU 92 may also request another core in the CPU 92 to perform the operation. In this case, the CPU 92 implements the function of the arithmetic units 50. Furthermore, the hard disk 94 implements the function of the memory 11. Then, the main memory 91 implements the function of the register files 410 to 430. The hard disk 94 sends and receives data to and from the CPU 92 via the I/O controller 93. In this case, the CPU 92 implements the function of the first data control unit 12, the second data control unit 13, and the pointer control unit 16. For example, the hard disk 94 stores therein various kinds of programs including the programs for implementing the function of the arithmetic units 50, the first data control unit 12, the second data control unit 13, and the pointer control unit 16. Then, by reading the various kinds of programs from the hard disk 94 and executing the programs, the CPU 92 can implement the function of the arithmetic units 50, the first data control unit 12, the second data control unit 13, and the pointer control unit 16. In this way, each of the functions described in the embodiment can be implemented by using the CPU 92 other than the GPU 95 included in the arithmetic processing device 1.

According to an aspect of an embodiment, the present invention can speed up the arithmetic operation process while suppressing an increase in cost.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
a memory, a plurality of first register files, a plurality of second register files, and a plurality of arithmetic units, wherein each arithmetic unit has a plurality of product sum arithmetic circuits, and each product sum arithmetic circuit has an adder and a multiplier;
the memory stores first data which has pieces of element data included in a first matrix and second data which has pieces of element data included in a second matrix;
a first register file of the plurality of first register files is arranged for each of the arithmetic units and stores a first respective predetermined row of the first data that is stored in the memory, a second register file of the plurality of second register files is arranged for each of the arithmetic units and stores a second predetermined row of the second data that is stored in the memory;
a pointer control circuit sets a position of a pointer that designates data that is stored in the first register files and the second register files;
and each product-sum arithmetic circuit
performs a first operation which includes first acquiring different pieces of first element data that is designated by the pointer whose position is set by the pointer control circuit from a top row location of its first respective predetermined row, second acquiring same pieces of second element data that is designated by the pointer whose position is set by the pointer control circuit from a top row location of the second predetermined row, and performing a first multiply operation by using the first acquired first element data and the second acquired second element data, and performing a first add operation based on a result of the first multiply operation and a result of the previous first multiply operation,
performs a second operation which includes repeat acquiring different pieces of first element data which is next sequential different data that is designated by the pointer that is moved by one from the first acquiring by the pointer control circuit in a row direction of its first respective predetermined row, repeat acquiring same pieces of second element data which is next sequential different data that is designated by the pointer that is moved by one from the first acquiring by the pointer control circuit in a row direction of the second predetermined row, performing a repeat multiply operation by using the repeat acquired first element data and the repeat acquired second element data, and performing a repeat add operation based on a result of the repeat multiply operation and a result of the previous repeat multiply operation,
and repeats the second operation for each of the first element data in its first respective predetermined row of the first matrix and each of the second element data in the second predetermined row of the second matrix.

2. The arithmetic processing device according to claim 1, wherein each of the plurality of arithmetic units determines, based on the size of the first data or the second data, the number of the arithmetic units that are used to perform the operation and determines the number of second arithmetic units included in the arithmetic units based on the size of one of the first data and the second data and based on an amount of movement of the second data.

3. The arithmetic processing device according to claim 1, each of the product-sum arithmetic circuit acquires the first element data that is moved forward by an amount corresponding to the number of strides for each operation starting from the first element data, as the top position, having a number incremented by 1 from the top in the first predetermined row, sequentially acquires, in numerical order for each operation, the second element data arrayed with consecutive numbers included in the second predetermined row, and performs the row portion operation by repeating an operation of adding a value obtained by multiplying the acquired first element data by the second element data to the last operation result.

4. The arithmetic processing device according to claim 1, wherein each of the product-sum arithmetic circuit acquires, from among the pieces of the first element data arrayed with consecutive numbers included in the first predetermined row, the different pieces of the first element data in numerical order, acquires, for each operation in numerical order, the second element data arrayed with consecutive numbers included in the second predetermined row, and performs the row portion operation by repeating an operation of adding a value obtained by multiplying the acquired first element data by the second element data to the operation result that is calculated in the last operation by the product-sum arithmetic circuit located at the position ahead by an amount corresponding to the number of strides.

5. A control method of an arithmetic processing device connected to a memory that stores first data which has pieces of element data included in a first matrix and second data which has pieces of element data that form a second matrix, the control method comprising:

storing, in each of a plurality of first register files arranged for each of a plurality of computing units, a first respective predetermined row of the first data stored in the memory, wherein each computing unit has a plurality of product-sum computing circuits;

storing, in each of a plurality of second register files arranged for each of the plurality of computing units, a second predetermined row of the second data stored in the memory;

setting, by a pointer control circuit, a position of a pointer that designates data that is stored in the first register file and the second register file;

causing each of the product-sum computing circuits to perform a first operation which includes first acquiring different pieces of first element data that is designated by the pointer whose position is set by the pointer control circuit from a top row location of its first respective predetermined row, second acquiring same pieces of second element data that is designated by the pointer whose position is set by the pointer control circuit from a top row location of the second predetermined row, and performing a first multiply operation by using the first acquired first element data and the second acquired second element data, and performing a first add operation based on a result of the first multiply operation and a result of the previous first multiply operation, causing each of the product-sum computing circuits to perform a second operation which includes repeat acquiring different pieces of first element data which is next sequential different data designated by the pointer that is moved by one from the first acquiring in a row direction of its first respective predetermined row, repeat acquiring same pieces of second element data which is next sequential different data that is designated by the pointer that is moved by one from the first acquiring in a row direction of the second predetermined row, performing a repeat multiply operation by using the repeat acquired first element data and the repeat acquired second element data, and performing a repeat add operation based on a result of the repeat multiply operation and a result of the previous repeat multiply operation;

and causing each of the product-sum computing circuits to perform repeating the second operation for each of the first element data in its first respective predetermined row of the first matrix and each of the second element data in the second predetermined row of the second matrix.

* * * * *